United States Patent
Natu et al.

(10) Patent No.: US 12,498,985 B2
(45) Date of Patent: Dec. 16, 2025

(54) TECHNIQUES FOR PATH SELECTION IN AN EQUIDISTANT UNIFORM METRO REPLICATION CONFIGURATION

(71) Applicant: Dell Products L.P., Hopkinton, MA (US)

(72) Inventors: Gajanan S. Natu, Cary, NC (US); Vasudevan Subramanian, Chapel Hill, NC (US); Dmitry Tylik, Westborough, MA (US); Vamsi K. Vankamamidi, Hopkinton, MA (US)

(73) Assignee: Dell Products L.P., Hopkinton, MA (US)

( * ) Notice: Subject to any disclaimer, the term of this patent is extended or adjusted under 35 U.S.C. 154(b) by 430 days.

(21) Appl. No.: 18/200,147

(22) Filed: May 22, 2023

(65) Prior Publication Data

US 2024/0394111 A1    Nov. 28, 2024

(51) Int. Cl.
*G06F 9/50* (2006.01)
*G06F 16/27* (2019.01)

(52) U.S. Cl.
CPC ............ *G06F 9/505* (2013.01); *G06F 16/275* (2019.01)

(58) Field of Classification Search
None
See application file for complete search history.

(56) References Cited

U.S. PATENT DOCUMENTS

| | | | |
|---|---|---|---|
| 9,384,227 B1 * | 7/2016 | Xiao | G06F 16/278 |
| 11,561,700 B2 | 1/2023 | Dar et al. | |
| 2021/0328886 A1 * | 10/2021 | Guim Bernat | H04L 41/5022 |
| 2022/0137855 A1 * | 5/2022 | Irwin | G06F 3/0613 |
| | | | 711/154 |
| 2022/0229591 A1 * | 7/2022 | Tylik | G06F 3/0659 |
| 2022/0342548 A1 * | 10/2022 | Tylik | G06F 3/0647 |

* cited by examiner

*Primary Examiner* — Taelor Kim
(74) *Attorney, Agent, or Firm* — BainwoodHuang

(57) ABSTRACT

In at least one embodiment, a method can include: establishing a bi-directional synchronous replication configuration for a stretched resource configured across first and second sites; determining a first difference between a first maximum normalized total I/O workload of the first site and a first current normalized total I/O workload of the first site without including read I/O workload of the stretched resource; determining a second difference between a second maximum normalized total I/O workload of the second site and a second current normalized total I/O workload of the second site without including read I/O workload of the stretched resource; and selecting, in accordance with the first difference and the second difference, only one of the first site and the second site to receive and service subsequent read and write I/Os directed to the stretched resource. The configuration can be equidistant with respect to a host and the stretched resource.

20 Claims, 14 Drawing Sheets

Table 1: Volume read/write IOPS 510

| Volume | Appliance, system or site ID | Affinity | Read IOPS | Writes IOPS |
|---|---|---|---|---|
| A (V1) | A1 | N1 | v1_r | v1_w |
| Z | A1 | N1 | z_r | z_w |
| A (V2) | A2 | N3 | v2_r | v2_w |
| X | A2 | N3 | x_r | x_w |
| Y | A2 | N4 | y_r | y_w |

Table 2: Node read/write IOPS 520

| Node | Appliance, system or site ID | Read IOPS | Write IOPS |
|---|---|---|---|
| N1 | A1 | n1_r | n1_w |
| N2 | A1 | n2_r | n2_w |
| N3 | A2 | n3_r | n3_w |
| N4 | A2 | n4_r | n4_w |

Table 3: Appliance, system or site read/write IOPS 530

| Appliance, system or site ID | Reads | Writes |
|---|---|---|
| A1 | a1_r | a1_w |
| A2 | a2_r | a2_w |

FIG. 8

TECHNIQUES FOR PATH SELECTION IN AN EQUIDISTANT UNIFORM METRO REPLICATION CONFIGURATION

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: establishing a synchronous replication configuration for a stretched resource, wherein the first resource is configured from a first local resource of the first site and a second local resource of the second site, wherein the first local resource of the first site and the second local resource of the second site are configured to have a same first resource identity as presented to a host, wherein the stretched resource is exposed to the host over a first path and a second path, wherein the first path is between the host and the first site, and the second path is between the host and the second site, wherein the host issues write I/Os directed to the stretched resource over the first path which are replicated by the first site to the second site in accordance with the synchronous replication configuration, wherein the host issues write I/Os directed to the stretched resource over the second path which are replicated by the second site to the first site in accordance with the synchronous replication configuration, and wherein the host issues read I/Os directed to the stretched resource over both the first path to the first site and the second path; calculating a first current normalized total I/O workload of the first site without including a first portion of a read I/O workload of the stretched resource received at, and serviced by, the first site; calculating a first maximum normalized total I/O workload of which the first site is capable of performing; determining a first difference between the first maximum normalized total I/O workload of the first site and the first current normalized total I/O workload of the first site; calculating a second current normalized total I/O workload of the second site without including a second portion of the read I/O workload of the stretched resource received at, and service by, the second site; calculating a second maximum normalized total I/O workload of which the second site is capable of performing; determining a second difference between the second maximum normalized total I/O workload of the second site and the second current normalized total I/O workload of the second site; and selecting, in accordance with the first difference and the second difference, only one of the first site and the second site to receive and service subsequent read and write I/Os directed to the stretched resource.

In at least one embodiment, said selecting can include: determining whether the first difference is more than the second difference; and responsive to determining the first difference is more than the second difference, selecting the first site but not the second site to receive subsequent read and write I/Os directed to the stretched resource, and otherwise selecting the second site but not the first site to receive subsequent read and write I/Os directed to the stretched resource. The first path can have a first path state of preferred prior to performing said selecting, and wherein the second path can have a second path state of preferred prior to performing said selecting. The can host issue I/Os directed to the stretched resource over paths to the first site and the second site having an associated path state of preferred and wherein the host may not issue I/Os to the stretched resource over paths to the first site and the second site having an associated path state of non-preferred unless there is no path with a preferred path state available for sending I/Os to the stretched resource.

In at least one embodiment, the second site can be selected by said selecting, and processing can include, responsive to said selecting, changing the first path state of the first path between the host and the first site from preferred to non-preferred.

In at least one embodiment, the first site can be selected by said selecting, and processing can include, responsive to said selecting, changing the second path state of the second path between the host and the second site from preferred to non-preferred.

In at least one embodiment, calculating the first current normalized total I/O workload of the first site without including the first portion of the read I/O workload can further include: determining a revised current read I/O workload of the first site by subtracting the first portion of the read I/O workload from a current read I/O workload of the first site; and determining a normalized read I/O workload of the first site for the revised current read I/O workload of the first site based, at least in part, on: a selected normal or standard I/O size; a first hardware type, model, platform or configuration of the first site; and a read coefficient or constant for the first hardware type, model, platform or configuration of the first site. A current write I/O workload of the first site can include a first write I/O workload directed to the stretched resource for write I/Os collectively received at the first site and the second site.

In at least one embodiment, calculating the first current normalized total I/O workload of the first site without including the first portion of the read I/O workload can include determining a normalized write I/O workload of the first site for the current write I/O workload of the first site based, at least in part, on: the selected normal or standard I/O size; the first hardware type, model, platform or configuration of the first site; and a write coefficient or constant for the first hardware type, model, platform or configuration of the first site. Calculating the first current normalized total I/O workload of the first site without including the first portion of the read I/O workload of the stretched resource can include: determining a first normalized workload read ratio in accordance with the normalized read I/O workload of the first site and in accordance with the normalized write I/O workload of the first site; and calculating the first current normalized total I/O workload of the first site in accordance with the normalized read I/O workload of the first site, the normalized write I/O workload of the first site, the first normalized workload read ratio, and a cost factor denoting a relative cost of a read I/O relative to a write I/O.

In at least one embodiment, calculating the first maximum normalized total I/O workload of which the first site is capable of performing can include: receiving a first read maximum RMAX1 denoting a maximum throughput or rate of read I/Os of the selected normal or standard I/O size which the first site is capable of supporting; receiving a first write maximum WMAX1 denoting a maximum throughput or rate of write I/Os of the selected normal or standard I/O size which the first site is capable of supporting; calculating S1, the average service time per I/O on the first site, in accordance with the first normalized workload read ratio, RMAX1, and WMAX1; calculating M1, denoting a maximum supported I/O rate for a given workload, as a multiplicative inverse of S1; and calculating the first maximum normalized total I/O workload of the first site in accordance with M1, the first normalized workload read ratio, and the cost factor.

In at least one embodiment, calculating the second current normalized total I/O workload of the second site without including the second portion of the read I/O workload of the stretched resource can include: determining a revised current read I/O workload of the second site by subtracting the second portion of the read I/O workload from a current read I/O workload of the first site; and determining a normalized read I/O workload of the second site for the revised current read I/O workload of the second site based, at least in part, on: a selected normal or standard I/O size; a second hardware type, model, platform or configuration of the second site; and a read coefficient or constant for the second hardware type, model, platform or configuration of the second site. A current write I/O workload of the second site can include a first write I/O workload directed to the stretched resource for write I/Os collectively received at the first site and the second site. Calculating the second current normalized total I/O workload of the second site without including the second portion of the read I/O workload of the stretched resource further can include determining a normalized write I/O workload of the second site for the current write I/O workload of the second site based, at least in part, on: the selected normal or standard I/O size; the second hardware type, model, platform or configuration of the second site; and a write coefficient or constant for the second hardware type, model, platform or configuration of the second site. Calculating the second current normalized total I/O workload of the second site without including the second portion of the read I/O workload of the stretched resource can include: determining a first normalized workload read ratio in accordance with the normalized read I/O workload of the second site and in accordance with the normalized write I/O workload of the second site; and calculating the second current normalized total I/O workload of the second site in accordance with the normalized read I/O workload of the second site, the normalized write I/O workload of the second site, the first normalized workload read ratio, and a cost factor denoting a relative cost of a read I/O relative to a write I/O.

In at least one embodiment, calculating the second maximum normalized total I/O workload of which the second site is capable of performing can include: receiving a second read maximum RMAX2 denoting a maximum throughput or rate of read I/Os of the selected normal or standard I/O size which the second site is capable of supporting; receiving a second write maximum WMAX2 denoting a maximum throughput or rate of write I/Os of the selected normal or standard I/O size which the second site is capable of supporting; calculating S2, the average service time per I/O on the second site, in accordance with the first normalized workload read ratio, RMAX2, and WMAX2; calculating M2, denoting a maximum supported I/O rate for a given workload, as a multiplicative inverse of S2; and calculating the second maximum normalized total I/O workload of in accordance with M2, the first normalized workload read ratio, and the cost factor.

In at least one embodiment, the stretched resource can be one of a plurality of defined resource types including one or more of: a volume, a logical device; a file; a file system; a sub-volume portion; a virtual volume used by a virtual machine; a portion of a virtual volume used by a virtual machine; and a portion of a file system.

In at least one embodiment, the selected one of the first site and the second site selected by said selecting can include a plurality of processing nodes. Processing can include selecting one or more of the plurality of processing nodes to receive and service I/Os directed to the stretched resource in accordance with workload balancing among nodes of the selected one site.

In at least one embodiment, the synchronous replication configuration for the stretched resource can be equidistant with respect to the host where a first I/O response time and a second response time can be determined to be within a specified threshold or tolerance of one another. The first I/O response time can denote an average I/O response time for the stretched resource between the first site and the host, and wherein the second I/O response time can denote an average I/O response time for the stretched resource between the second site and the host.

BRIEF DESCRIPTION OF THE DRAWINGS

Features and advantages of the present disclosure will become more apparent from the following detailed description of exemplary embodiments thereof taken in conjunction with the accompanying drawings in which:

FIG. 8 is an example of metrics that can be used in at least one embodiment in accordance with the techniques of the present disclosure.

DETAILED DESCRIPTION OF EMBODIMENT(S)

Figure 1:
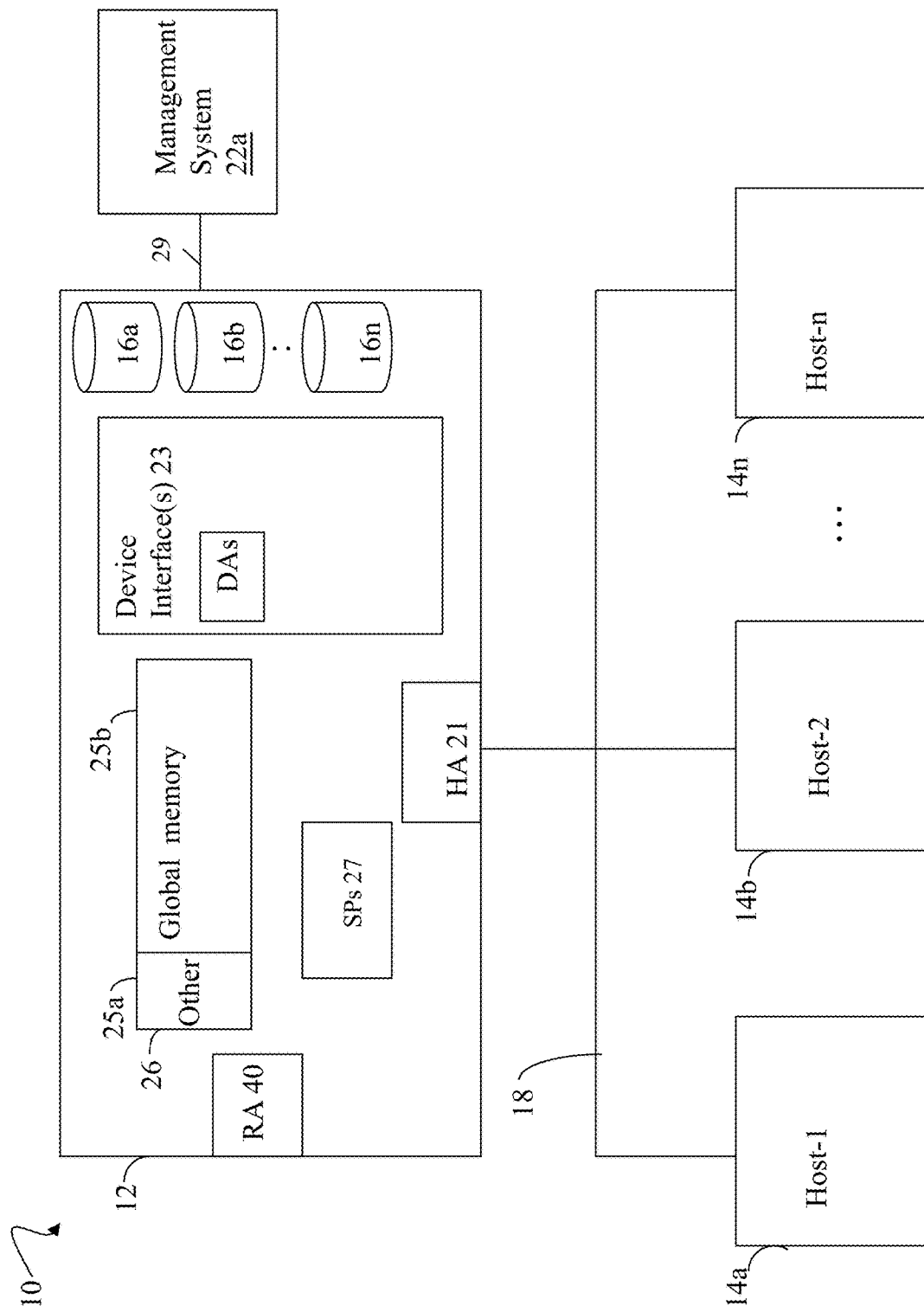
FIG. 1 is an example of components that can be included in a system in accordance with the techniques of the present disclosure.

Two data storage systems, sites or appliances, such as "site or system A" and "site or system B", can present a single data storage resource or object, such as a volume or logical device, to a client, such as a host. The volume can be configured as a stretched volume or resource where a first volume V1 on site A and a second volume V2 on site B are both configured to have the same identity from the perspective of the external host. The stretched volume can be exposed over paths going to both sites A and B. In a metro replication configuration (sometimes simply referred to as a metro configuration), the host can issue writes to the stretched volume over paths to both site A and site B, where writes to the stretched volume on each of the sites A and B are automatically synchronously replicated to the other peer site. In this manner with the metro replication configuration, the two data storage systems or sites can be configured for two-way or bi-directional synchronous replication for the configured stretched volume.

The stretched volume can provide data protection due to the synchronous mirroring of data maintained on V1 of site A and V2 of site B. For example, if site A experiences a disaster or is otherwise unavailable, the V2 copy of the stretched volume on site B can be used by the storage clients rather than have the storage clients undesirably experience data unavailability of the stretched volume. Alternatively, if site B experiences a disaster or is otherwise unavailable, the copy of the stretched volume V1 on site A can be used by the storage clients rather than have the storage clients undesirably experience data unavailability of the stretched volume. Thus, the various resources, including computing, networking and storage resources, on the two sites A and B can provide the needed redundancy for a user's application, such as an application executing on a host which reads data from and/writes data to the stretched volume.

Other uses of a stretched volume or LUN can include, for example, resource balancing across sites A and B; and storage migration such as migration of data from V1 of site A to V2 of site B, where V1 and V2 are configured as the same stretched LUN or volume.

A stretched volume or LUN can generally denote a single stretched storage resource or object configured from two local storage resources, objects or copies, respectively, on the two different storage systems A and B, where the local two storage resources are configured to have the same identity as presented to a host or other external client. Sometimes, a stretched volume or LUN can also be referred to herein as a metro volume or LUN. More generally, sometimes a stretched storage resource or object can be referred to herein as a metro storage object or resource.

In some configurations, the metro replication configuration can also be characterized as uniform in that the host is connected to both sites or systems A and B and can issue I/Os to the stretched volume at both sites or systems A and B. Additionally in some configurations, the metro replication configuration can be characterized as equidistant with respect to the host and the sites A and B, where the host has the same average I/O response time (e.g., within specified limits or tolerances) with respect to I/Os that are issued by the host and directed to the stretched volume on both sites A and B.

In such a scenario with a metro replication configuration that is both uniform and equidistant with respect to the stretched volume, write I/Os directed to the stretched volume received at either site A or B are automatically replicated to the other peer site. In this manner due to the two-way or bi-directional synchronous write replication, both sites A and B can have the same write I/O workload with respect to the stretched volume even if all write I/Os are received by a single one of the sites A or B.

In such a scenario with a metro replication configuration that is both uniform and equidistant with respect to the stretched volume, read I/O requests that are sent from the host and that are directed to the stretched volume can also be serviced by both sites or systems A and B. In particular, the read I/O request directed to the stretched volume can be serviced by the particular one of the systems or sites A or B which receives the read I/O. As a result, both sites A and B can cache the same metadata (MD) pages relevant to the stretched volume and thereby can lead to various undesirable inefficiencies. For example, a read I/O request can request to read content stored at a logical address LA1 of the stretched volume. The read I/O request can be received by one of the sites or systems, such as site A, and can result in a read cache miss if the requested content for LA1 is not stored in site A's cache. To service the read cache miss, the requested read data or content of LA1 can be read from back-end (BE) non-volatile storage. In at least one existing system, mapping information can be used to map LA1 to its corresponding physical storage location on BE non-volatile storage. The mapping information can include multiple MD pages which are accessed and traversed at runtime to service the read cache miss. For the site A to service the read I/O request directed to LA1 of the stretched volume, the MD pages relevant for LA1 and the stretched volume also need to be cached in site A. In a similar manner, when site B receives a read I/O request to read the content of LA1 of the stretched volume, where the read I/O results in a read cache miss, site B also needs to cache and utilize the same multiple MD pages relevant for LA1 in order to obtain the content of LA1 from BE non-volatile storage. As a result, both sites or systems A and B can cache the same MD pages related to the stretched volume. The foregoing may be undesirable and not optimal for multiple reasons. For example, caching the same MD pages on both sites or systems A and B can result in inefficiencies. One inefficiency is inefficient cache utilization due to the caching of duplicate MD pages on both systems. Additionally, such an inefficient use of cache by caching duplicate MD pages on both systems can result in performance inefficiencies in that additional performance overhead can be incurred in connection with other regular or non-stretched volumes. Such additional performance overhead can be due, for example, to thrashing of cached MD pages of the stretched volume. For example, reading content from another regular volume can also require that regular volume's MD pages be stored in cache. It may be necessary to evict the stretched volume MD pages from the cache in order to cache the regular volume's MD pages. Subsequently, the stretched volume MD pages may need to again be stored in cache to service a subsequent read request directed to the stretched volume. The foregoing repeated process of evicting the stretched volume MD pages from the cache and then reloading into the cache the stretched volume MD pages can result in thrashing and incur additional performance overhead. Furthermore, the foregoing inefficiencies and drawbacks greatly increase when scaling the system for general practical usage scenarios use with many stretched volumes and many regular or non-stretched volumes.

To resolve the foregoing and possibly other inefficiencies, the host can be restricted to send read requests directed to a stretched volume at only a single one of the sites A or B even though both sites can be capable of receiving and servicing such read requests. In at least one configuration, the foregoing can be provided by setting path states for the stretched volume so that the host only sends I/Os, both read and writes, directed to the stretched volume to a single one of the sites. Furthermore, in a multiple node site or system, each node can have sufficient computing and other resources to service all I/Os directed to the stretched volume from a single host. In this case, the host can be further restricted to send all I/Os directed to the stretched volume to a single node of the selected multiple node system or site. In at least one configuration, the foregoing can be provided by setting path states for the stretched volume so that the host only sends I/Os, both read and writes, directed to the stretched volume to a single node of a selected one of the multi-node sites.

To achieve the foregoing, described are techniques of the present disclosure which include a methodology to select an optimal site, system or appliance for receiving and servicing host read I/Os directed to a stretched volume in an equidistant uniform metro configuration by taking into consideration I/O resource utilization on candidate appliances, systems or sites.

In at least one embodiment, the techniques of the present disclosure provide for continuously monitoring all candidate appliances, sites or systems to select a single optimal appliance, site or system that receives and services read I/Os directed to stretched volumes and further adjust path states of all stretched volumes to ensure fairness in resource utilization. The selected single appliance, site or system can receive all I/Os, both reads and writes directed to the stretched volume, where the reads are serviced by the selected single appliance receiving the reads, where the writes received by the selected single appliance are written to the local resource configured as the stretched volume on the receiving appliance, system or site, and where the writes also replicated to the peer appliance, site or system in the configuration. The peer appliance, site or system can write the replicated writes to another local resource configured as the stretched volume on the peer. In such an embodiment in one aspect, the bi-direction synchronous replication configuration includes both sites or systems collectively servicing the write I/O and its corresponding replicated write to the stretched volume, and the single receiving site servicing all read I/Os directed to the stretched volume.

In at least one embodiment, the techniques of the present disclosure provide for selecting a single optimized path to the selected optimal appliance, system or site. The selected optimal appliance, system or site can include multiple nodes where the selected single path is to a selected single one of the multiple nodes which receives all I/Os directed to the stretched volume. More generally, there can be multiple nodes paths from the host to the single selected node. The selected single node can receive I/Os, both reads and writes directed to the stretched volume, where the reads are serviced by the selected single node receiving the reads, and where the writes received by the selected single node are serviced on the receiving appliance system or site and also replicated to the peer appliance, site or system in the configuration. In at least one embodiment, the techniques of the present disclosure provide for selecting the single path for a stretched volume on an appliance, system or site such that node resources utilized to process all I/Os from all volumes (both stretched and non-stretched) are fairly balanced.

The foregoing and other aspects of the techniques of the present disclosure are described in more detail in the following paragraphs.

Referring to the FIG. 1, shown is an example of an embodiment of a system 10 that can be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n can access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host systems 14a-14n can access and communicate with the data storage system 12, and can also communicate with other components included in the system 10.

Each of the host systems 14a-14n and the data storage system 12 included in the system 10 are connected to the communication medium 18 by any one of a variety of connections in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software that can be included in the data storage system 12 are described herein in more detail, and can vary with each particular embodiment. Each of the hosts 14a-14n and the data storage system 12 can all be located at the same physical site, or, alternatively, can also be located in different physical locations. The communication medium 18 used for communication between the host systems 14a-14n and the data storage system 12 of the system 10 can use a variety of different communication protocols such as block-based protocols (e.g., SCSI (Small Computer System Interface), Fibre Channel (FC), iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n can issue a data request to the data storage system 12 to perform a data operation. For example, an application executing on one of the host computers 14a-14n can perform a read or write operation resulting in one or more data requests to the data storage system 12.

It should be noted that although the element 12 is illustrated as a single data storage system, such as a single data storage array, the element 12 can also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment can include data storage arrays or other components from one or more vendors. In subsequent examples illustrating the techniques herein, reference can be made to a single data storage array by a vendor. However, as will be appreciated by those skilled in the art, the techniques herein are applicable for use with other data storage arrays by other vendors and with other components than as described herein for purposes of example.

The data storage system 12 can be a data storage appliance or a data storage array including a plurality of data storage devices (PDs) 16a-16n. The data storage devices 16a-16n can include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contain no moving mechanical parts. The flash devices can be constructed using nonvolatile semiconductor NAND flash memory. The flash devices can include, for example, one or more SLC (single level cell) devices and/or MLC (multi level cell) devices.

The data storage array can also include different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs can be used to manage communications and data operations between one or more host systems and the global memory (GM). In an embodiment, the HA can be a Fibre Channel Adapter (FA) or other adapter which facilitates host communication. The HA 21 can be characterized as a front end component of the data storage system which receives a request from one of the hosts 14a-n. The data storage array can include one or more RAs used, for example, to facilitate communications between data storage arrays. The data storage array can also include one or more device interfaces 23 for facilitating data transfers to/from the data storage devices 16a-16n. The data storage device interfaces 23 can include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths can exist between the device interfaces 23, the RAs 40, the HAs 21, and the memory 26. An embodiment, for example, can use one or more internal busses and/or communication modules. For example, the global memory portion 25b can be used to facilitate data transfers and other communications between the device interfaces, the HAs and/or the RAs in a data storage array. In one embodiment, the device interfaces 23 can perform data operations using a system cache included in the global memory 25b, for example, when communicating with other device interfaces and other components of the data storage array. The other portion 25a is that portion of the memory that can be used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n through the channels. The host systems 14a-n do not address the drives or devices 16a-16n of the storage systems directly, but rather access to data can be provided to one or more host systems from what the host systems view as a plurality of logical devices, logical volumes (LVs) which are sometimes referred to herein as logical units (e.g., LUNs). A logical unit (LUN) can be characterized as a disk array or data storage system reference to an amount of storage space that has been formatted and allocated for use to one or more hosts. A logical unit can have a logical unit number that is an I/O address for the logical unit. As used herein, a LUN or LUNs can refer to the different logical units of storage which can be referenced by such logical unit numbers. In some embodiments, at least some of the LUNs do not correspond to the actual or physical disk drives or more generally physical storage devices. For example, one or more LUNs can reside on a single physical disk drive, data of a single LUN can reside on multiple different physical devices, and the like. Data in a single data storage system, such as a single data storage array, can be accessed by multiple hosts allowing the hosts to share the data residing therein. The HAs can be used in connection with communications between a data storage array and a host system. The RAs can be used in facilitating communications between two data storage arrays. The DAs can include one or more type of device interface used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein can be made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that can be used to manage and monitor the data storage system 12. In one embodiment, the management system 22a can be a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration can be stored in any suitable data container, such as a database. The data storage system configuration information stored in the database can generally describe the various physical and logical entities in the current data storage system configuration. The data storage system configuration information can describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN can be accessed by the device interface following a data request in connection with I/O operations. For example, a host can issue an I/O operation which is received by the HA 21. The I/O operation can identify a target location from which data is read from, or written to, depending on whether the I/O operation is, respectively, a read or a write operation request. The target location of the received I/O operation can include a logical address expressed in terms of a LUN and logical offset or location (e.g., LBA or logical block address) on the LUN. Processing can be performed on the data storage system to further map the target location of the received I/O operation, expressed in terms of a LUN and logical offset or location on the LUN, to its corresponding physical storage device (PD) and address or location on the PD. The DA which services the particular PD can further perform processing to either read data from, or write data to, the corresponding physical device location for the I/O operation.

In at least one embodiment, a logical address LA1, such as expressed using a logical device or LUN and LBA, can be mapped on the data storage system to a physical address or location PA1, where the physical address or location PA1 contains the content or data stored at the corresponding logical address LA1. Generally, mapping information or a mapper layer can be used to map the logical address LA1 to its corresponding physical address or location PA1 containing the content stored at the logical address LA1. In some embodiments, the mapping information or mapper layer of the data storage system used to map logical addresses to physical addresses can be characterized as metadata managed by the data storage system. In at least one embodiment, the mapping information or mapper layer can be a hierarchical arrangement of multiple mapper layers. Mapping LA1 to PA1 using the mapper layer can include traversing a chain of metadata pages in different mapping layers of the hierarchy, where a page in the chain can reference a next page, if any, in the chain. In some embodiments, the hierarchy of mapping layers can form a tree-like structure with the chain of metadata pages denoting a path in the hierarchy from a root or top level page to a leaf or bottom level page.

It should be noted that an embodiment of a data storage system can include components having different names from that described herein but which perform functions similar to components as described herein. Additionally, components within a single data storage system, and also between data storage systems, can communicate using any suitable technique that can differ from that as described herein for exemplary purposes. For example, element 12 of the FIG. 1 can be a data storage system, such as a data storage array, that includes multiple storage processors (SPs). Each of the SPs 27 can be a CPU including one or more "cores" or processors and each having their own memory used for communication between the different front end and back end components rather than utilize a global memory accessible to all storage processors. In such embodiments, the memory 26 can represent memory of each such storage processor.

Generally, the techniques herein can be used in connection with any suitable storage system, appliance, device, and the like, in which data is stored. For example, an embodiment can implement the techniques herein using a midrange data storage system as well as a high end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path can be the logical flow through hardware and software components or layers in connection with issuing data storage management command to and/or from a data storage system, and also receiving responses (possibly including requested data) to such control or management commands. For example, with reference to the FIG. 1, the control commands can be issued from data storage management software executing on the management system 22a to the data storage system 12. Such commands can be, for example, to establish or modify data services, provision storage, perform user account management, and the like.

The data path and control path define two sets of different logical flow paths. In at least some of the data storage system configurations, at least part of the hardware and network connections used for each of the data path and control path can differ. For example, although both control path and data path can generally use a network for communications, some of the hardware and software used can differ. For example, with reference to the FIG. 1, a data storage system can have a separate physical connection 29 from a management system 22a to the data storage system 12 being managed whereby control commands can be issued over such a physical connection 29. However in at least one embodiment, user I/O commands are never issued over such a physical connection 29 provided solely for purposes of connecting the management system to the data storage system. In any case, the data path and control path each define two separate logical flow paths.

Figure 2:
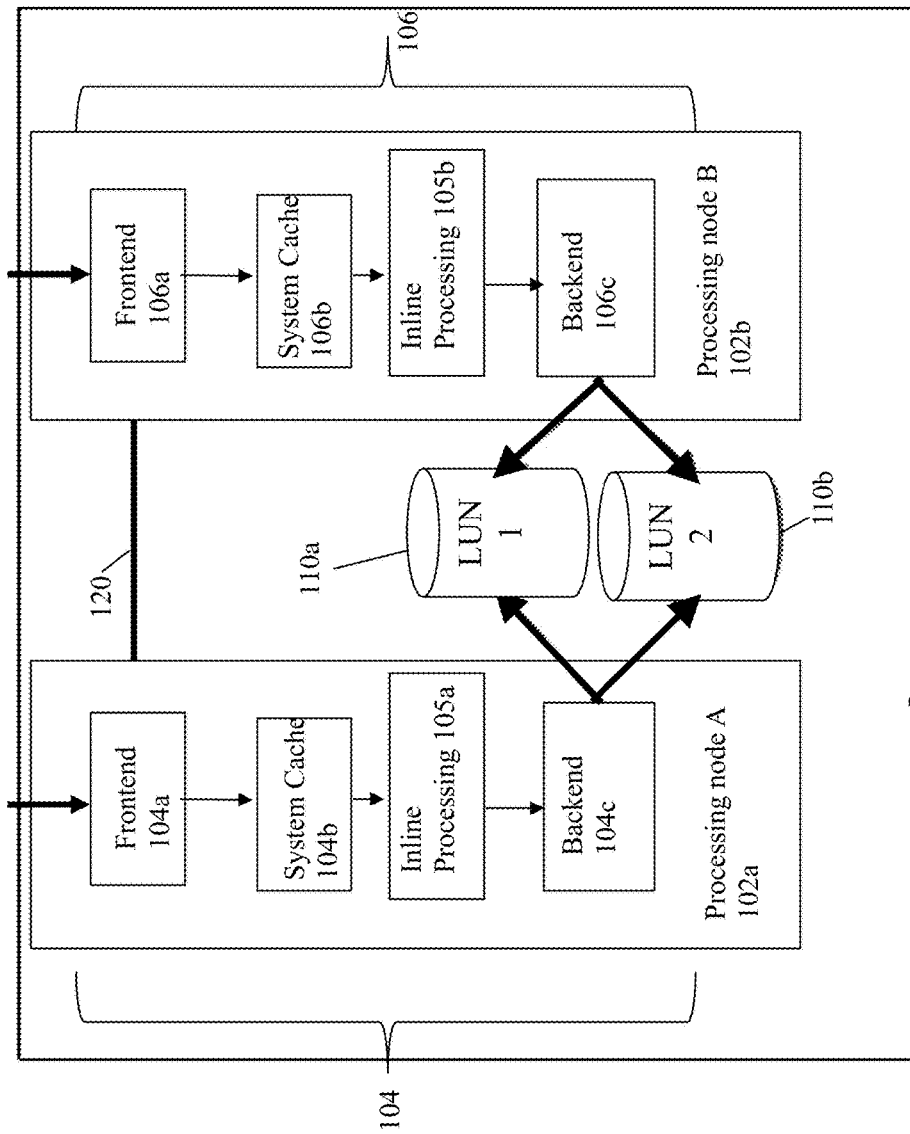
FIG. 2 is an example illustrating the I/O path or data path in connection with processing data in an embodiment in accordance with the techniques of the present disclosure.

With reference to the FIG. 2, shown is an example 100 illustrating components that can be included in the data path in at least one existing data storage system in accordance with the techniques herein. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes directed to the LUNs 110a, 110b can be received for processing by either of the nodes 102a and 102b, the example 100 illustrates what is also referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 can be used for internode communication between the nodes 102a, 102b.

In connection with at least one embodiment in accordance with the techniques herein, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM which can used as main memory. The processor cache can be substantially faster than the system RAM such as used as main memory and contains information that the processor will be immediately and repeatedly accessing. The faster memory of the CPU cache can, for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be described and represented as the nodes 102a-b in the FIG. 2. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes is not be shared with other pairs of nodes. A host can access data stored on a BE PD through the node pair associated with or attached to the PD.

In at least one embodiment, each pair of nodes provides a dual node architecture where both nodes of the pair can be identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Data replication is one of the data services that can be performed on a data storage system in an embodiment in accordance with the techniques herein. In at least one data storage system, remote replication is one technique that can be used in connection with providing for disaster recovery (DR) of an application's data set. The application, such as executing on a host, can write to a production or primary data set of one or more LUNs on a primary data storage system. Remote replication can be used to remotely replicate the primary data set of LUNs to a second remote data storage system. In the event that the primary data set on the primary data storage system is destroyed or more generally unavailable for use by the application, the replicated copy of the data set on the second remote data storage system can be utilized by the host. For example, the host can directly access the copy of the data set on the second remote system. As an alternative, the primary data set of the primary data storage system can be restored using the replicated copy of the data set, whereby the host can subsequently access the restored data set on the primary data storage system. A remote data replication service or facility can provide for automatically replicating data of the primary data set on a first data storage system to a second remote data storage system in an ongoing manner in accordance with a particular replication mode, such as a synchronous mode described elsewhere herein.

Figure 3:
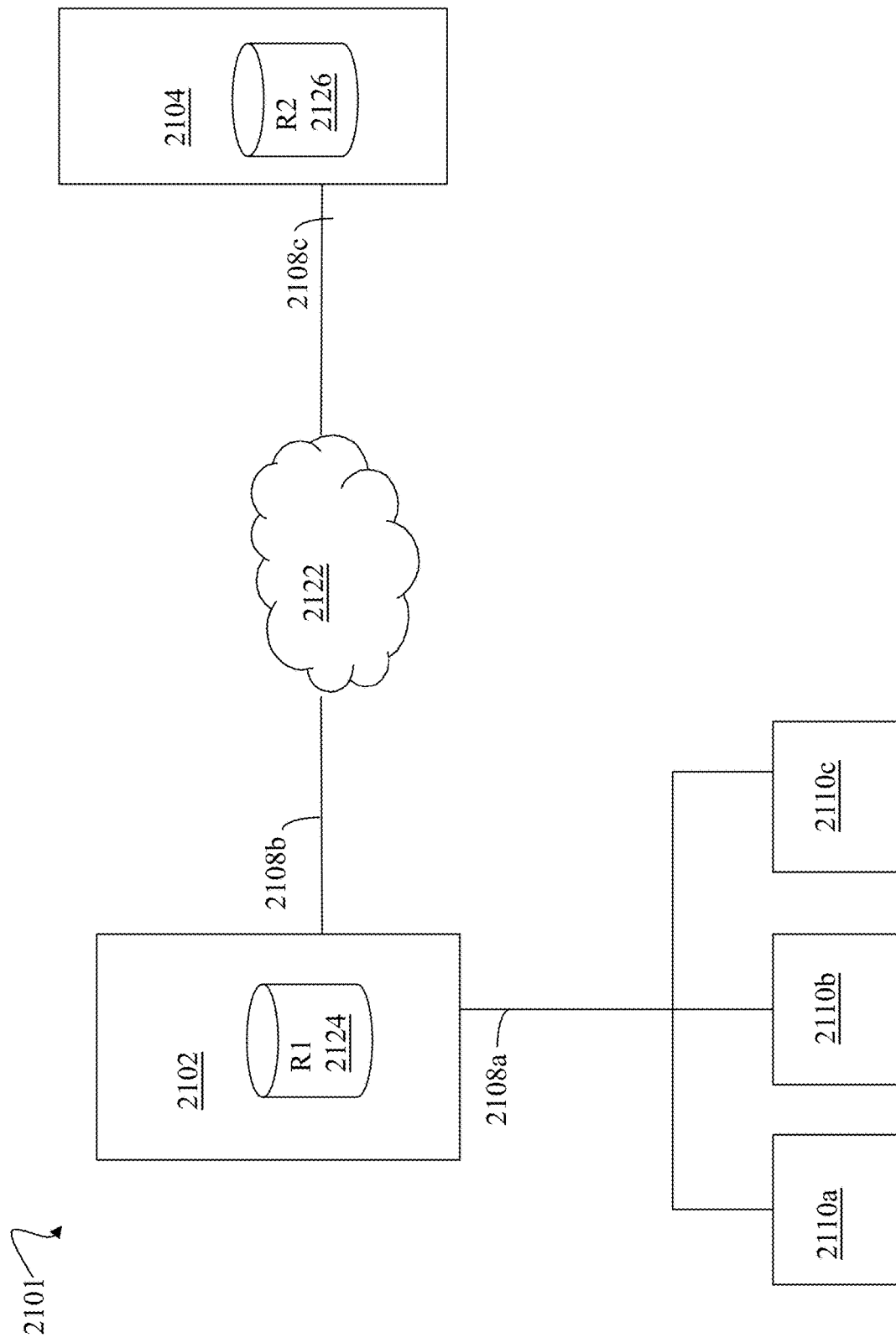
FIG. 3 is an example of an arrangement of systems that can be used in performing data replication.

Referring to FIG. 3, shown is an example 2101 illustrating remote data replication. It should be noted that the embodiment illustrated in FIG. 3 presents a simplified view of some of the components illustrated in FIGS. 1 and 2, for example, including only some detail of the data storage systems 12 for the sake of illustration.

Included in the example 2101 are the data storage systems 2102 and 2104 and the hosts 2110a, 2110b and 1210c. The data storage systems 2102, 2104 can be remotely connected and communicate over the network 2122, such as the Internet or other private network, and facilitate communications with the components connected thereto. The hosts 2110a, 2110b and 2110c can issue I/Os and other operations, commands, or requests to the data storage system 2102 over the connection 2108a. The hosts 2110a, 2110b and 2110c can be connected to the data storage system 2102 through the connection 2108a which can be, for example, a network or other type of communication connection.

The data storage systems 2102 and 2104 can include one or more devices. In this example, the data storage system 2102 includes the storage device R1 2124, and the data storage system 2104 includes the storage device R2 2126. Both of the data storage systems 2102, 2104 can include one or more other logical and/or physical devices. The data storage system 2102 can be characterized as local with respect to the hosts 2110a, 2110b and 2110c. The data storage system 2104 can be characterized as remote with respect to the hosts 2110a, 2110b and 2110c. The R1 and R2 devices can be configured as LUNs.

The host 2110a can issue a command, such as to write data to the device R1 of the data storage system 2102. In some instances, it can be desirable to copy data from the storage device R1 to another second storage device, such as R2, provided in a different location so that if a disaster occurs that renders R1 inoperable, the host (or another host) can resume operation using the data of R2. With remote replication, a user can denote a first storage device, such as R1, as a primary storage device and a second storage device, such as R2, as a secondary storage device. In this example, the host 2110a interacts directly with the device R1 of the data storage system 2102, and any data changes made are automatically provided to the R2 device of the data storage system 2104 by a remote replication facility (RRF). In operation, the host 2110a can read and write data using the R1 volume in 2102, and the RRF can handle the automatic copying and updating of data from R1 to R2 in the data storage system 2104. Communications between the storage systems 2102 and 2104 can be made over connections 2108b, 2108c to the network 2122.

An RRF can be configured to operate in one or more different supported replication modes. For example, such modes can include synchronous mode and asynchronous mode, and possibly other supported modes. When operating in the synchronous mode, the host does not consider a write I/O operation to be complete until the write I/O has been completed or committed on both the first and second data storage systems. Thus, in the synchronous mode, the first or source storage system will not provide an indication to the host that the write operation is committed or complete until the first storage system receives an acknowledgement from the second data storage system regarding completion or commitment of the write by the second data storage system. In contrast, in connection with the asynchronous mode, the host receives an acknowledgement from the first data storage system as soon as the information is committed to the first data storage system without waiting for an acknowledgement from the second data storage system. It should be noted that completion or commitment of a write by a system can vary with embodiment. For example, in at least one embodiment, a write can be committed by a system once the write request (sometimes including the content or data written) has been recorded in a cache. In at least one embodiment, a write can be committed by a system once the write request (sometimes including the content or data written) has been recorded in a persistent transaction log.

With synchronous mode remote data replication in at least one embodiment, a host 2110a can issue a write to the R1 device 2124. The primary or R1 data storage system 2102 can store the write data in its cache at a cache location and mark the cache location as including write pending (WP) data as mentioned elsewhere herein. At a later point in time, the write data is destaged from the cache of the R1 system 2102 to physical storage provisioned for the R1 device 2124 configured as the LUN A. Additionally, the RRF operating in the synchronous mode can propagate the write data across an established connection or link (more generally referred to as a the remote replication link or link) such as over 2108b, 2122, and 2108c, to the secondary or R2 data storage system 2104 where the write data is stored in the cache of the system 2104 at a cache location that is marked as WP. Subsequently, the write data is destaged from the cache of the R2 system 2104 to physical storage provisioned for the R2 device 2126 configured as the LUN A. Once the write data is stored in the cache of the system 2104 as described, the R2 data storage system 2104 can return an acknowledgement to the R1 data storage system 2102 that it has received the write data. Responsive to receiving this acknowledgement from the R2 data storage system 2104, the R1 data storage system 2102 can return an acknowledgement to the host 2110a that the write has been received and completed. Thus, generally, R1 device 2124 and R2 device 2126 can be logical devices, such as LUNs, configured as synchronized data mirrors of one another. R1 and R2 devices can be, for example, fully provisioned LUNs, such as thick LUNs, or can be LUNs that are thin or virtually provisioned logical devices.

Figure 4:
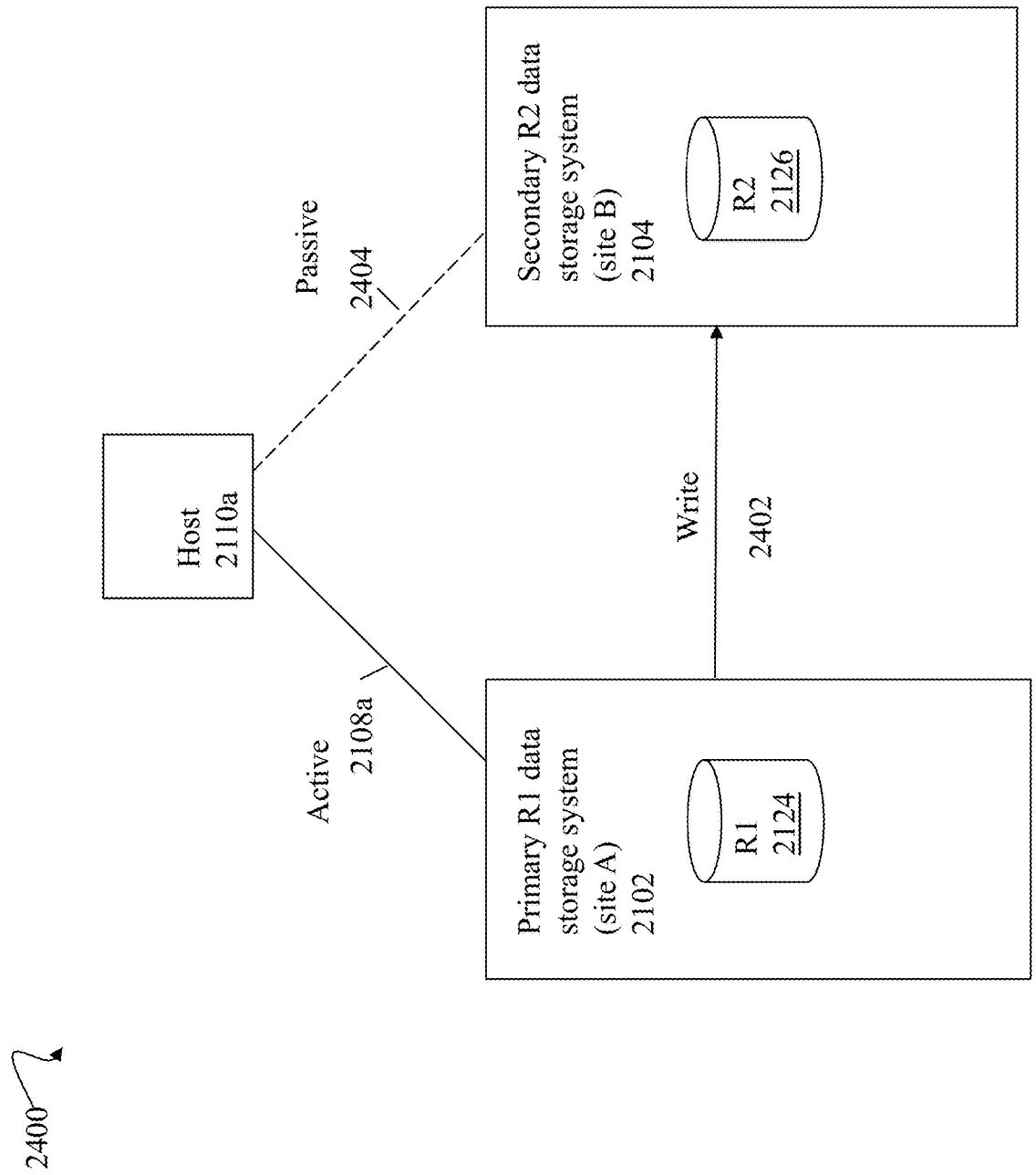
FIG. 4 is an example illustrating an active-passive replication configuration of a stretched volume using one-way synchronous replication in at least one embodiment.

With reference to FIG. 4, shown is a further simplified illustration of components that can be used in in connection with remote replication. The example 2400 is simplified illustration of components as described in connection with FIG. 2. The element 2402 generally represents the replication link used in connection with sending write data from the primary R1 data storage system 2102 to the secondary R2 data storage system 2104. The link 2402, more generally, can also be used in connection with other information and communications exchanged between the systems 2102 and 2104 for replication. As mentioned above, when operating in synchronous replication mode, host 2110a issues a write, or more generally, all I/Os including reads and writes, over a path to only the primary R1 data storage system 2102. The host 2110a does not issue I/Os directly to the R2 data storage system 2104. The configuration of FIG. 4 can also be referred to herein as an active-passive configuration with synchronous replication performed from the R1 data storage system 2102 to the secondary R2 system 2104. With the active-passive configuration of FIG. 4, the host 2110a has an active connection or path 2108a over which all I/Os are issued to only the R1 data storage system. The host 2110a can have a passive connection or path 2404 to the R2 data storage system 2104. Writes issued over path 2108a to the R1 system 2102 can be synchronously replicated to the R2 system 2104.

In the configuration of 2400, the R1 device 2124 and R2 device 2126 can be configured and identified as the same LUN, such as LUN A, to the host 2110a. Thus, the host 2110a can view 2108a and 2404 as two paths to the same LUN A, where path 2108a is active (over which I/Os can be issued to LUN A) and where path 2404 is passive (over which no I/Os to the LUN A can be issued whereby the host is not permitted to access the LUN A over path 2404). For example, in a SCSI-based environment, the devices 2124 and 2126 can be configured to have the same logical device identifier such as the same world-wide name (WWN) or other identifier as well as having other attributes or properties that are the same. Should the connection 2108a and/or the R1 data storage system 2102 experience a failure or disaster whereby access to R1 2124 configured as LUN A is unavailable, processing can be performed on the host 2110a to modify the state of path 2404 to active and commence issuing I/Os to the R2 device configured as LUN A. In this manner, the R2 device 2126 configured as LUN A can be used as a backup accessible to the host 2110a for servicing I/Os upon failure of the R1 device 2124 configured as LUN A.

The pair of devices or volumes including the R1 device 2124 and the R2 device 2126 can be configured as the same single volume or LUN, such as LUN A. In connection with discussion herein, the LUN A configured and exposed to the host can also be referred to as a stretched volume or device, where the pair of devices or volumes (R1 device 2124, R2 device 2126) is configured to expose the two different devices or volumes on two different data storage systems to a host as the same single volume or LUN. Thus, from the view of the host 2110a, the same LUN A is exposed over the two paths 2108a and 2404.

It should be noted although only a single replication link 2402 is illustrated, more generally any number of replication links can be used in connection with replicating data from systems 2102 to system 2104.

Figure 5:
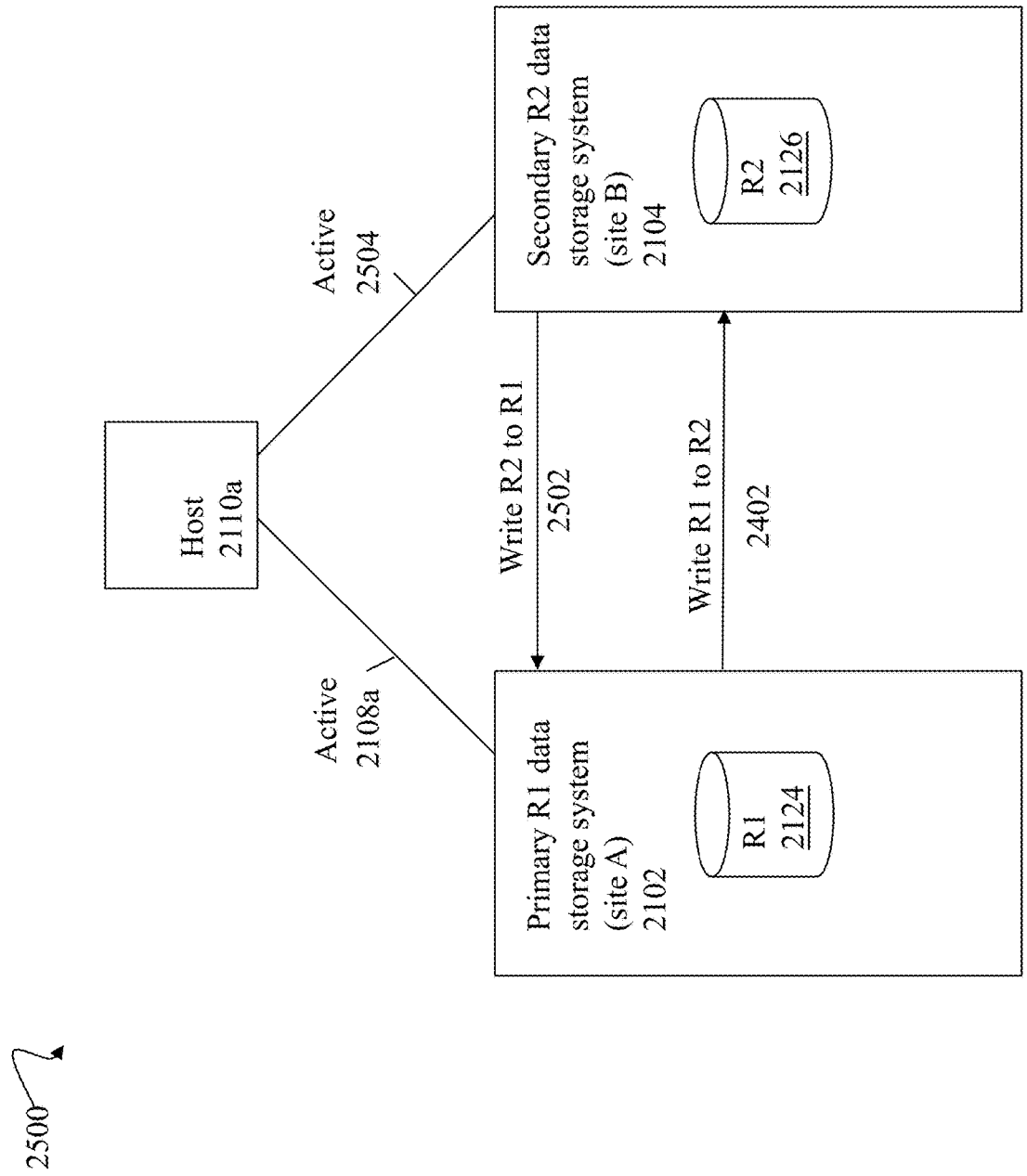
FIG. 5 is an example illustrating an active-active replication configuration of a stretched volume using two-way or bidirectional synchronous replication in at least one embodiment in accordance with the techniques of the present disclosure.

Referring to FIG. 5, shown is an example configuration of components that can be used in an embodiment. The example 2500 illustrates an active-active configuration as can be used in connection with synchronous replication in at least one embodiment. In the active-active configuration or state with synchronous replication, the host 2110a can have a first active path 2108a to the R1 data storage system and R1 device 2124 configured as LUN A. Additionally, the host 2110a can have a second active path 2504 to the R2 data storage system and the R2 device 2126 configured as the same LUN A. From the view of the host 2110a, the paths 2108a and 2504 appear as 2 paths to the same LUN A as described in connection with FIG. 4 with the difference that the host in the example 2500 configuration can issue I/Os, both reads and/or writes, over both of the paths 2108a and 2504 at the same time.

In at least one embodiment in a replication configuration of FIG. 5 with an active-active configuration where writes can be received by both systems or sites 2124 and 2126, a predetermined or designated one of the systems or sites 2124 and 2126 can be assigned as the preferred system or site, with the other remaining system or site assigned as the non-preferred system or site. In such an embodiment with a configuration as in FIG. 5, assume for purposes of illustration that system or site R1/A is preferred and the system or site R2/B is the non-preferred.

The host 2110a can send a first write over the path 2108a which is received by the preferred R1 system 2102 and written to the cache of the R1 system 2102 where, at a later point in time, the first write is destaged from the cache of the R1 system 2102 to physical storage provisioned for the R1 device 2124 configured as the LUN A. The R1 system 2102 also sends the first write to the R2 system 2104 over the link 2402 where the first write is written to the cache of the R2 system 2104, where, at a later point in time, the first write is destaged from the cache of the R2 system 2104 to physical storage provisioned for the R2 device 2126 configured as the LUN A. Once the first write is written to the cache of the R2 system 2104, the R2 system 2104 sends an acknowledgement over the link 2402 to the R1 system 2102 that it has completed the first write. The R1 system 2102 receives the acknowledgement from the R2 system 2104 and then returns an acknowledgement to the host 2110a over the path 2108a, where the acknowledgement indicates to the host that the first write has completed.

The first write request can be directly received by the preferred system or site R1 2102 from the host 2110a as noted above. Alternatively in a configuration of FIG. 5 in at least one embodiment, a write request, such as the second write request discussed below, can be initially received by the non-preferred system or site R2 2104 and then forwarded to the preferred system or site 2102 for servicing. In this manner in at least one embodiment, the preferred system or site R1 2102 can always commit the write locally before the same write is committed by the non-preferred system or site R2 2104. In particular, the host 2110a can send the second write over the path 2504 which is received by the R2 system 2104. The second write can be forwarded, from the R2 system 2104 to the R1 system 2102, over the link 2502 where the second write is written to the cache of the R1 system 2102, and where, at a later point in time, the second write is destaged from the cache of the R1 system 2102 to physical storage provisioned for the R1 device 2124 configured as the LUN A. Once the second write is written to the cache of the preferred R1 system 2102 (e.g., indicating that the second write is committed by the R1 system 2102), the R1 system 2102 sends an acknowledgement over the link 2502 to the R2 system 2104 where the acknowledgment indicates that the preferred R1 system 2102 has locally committed or locally completed the second write on the R1 system 2102. Once the R2 system 2104 receives the acknowledgement from the R1 system, the R2 system 2104 performs processing to locally complete or commit the second write on the R2 system 2104. In at least one embodiment, committing or completing the second write on the non-preferred R2 system 2104 can include the second write being written to the cache of the R2 system 2104 where, at a later point in time, the second write is destaged from the cache of the R2 system 2104 to physical storage provisioned for the R2 device 2126 configured as the LUN A. Once the second write is written to the cache of the R2 system 2104, the R2 system 2104 then returns an acknowledgement to the host 2110a over the path 2504 that the second write has completed.

As discussed in connection with FIG. 4, the FIG. 5 also includes the pair of devices or volumes—the R1 device 2124 and the R2 device 2126—configured as the same single stretched volume, the LUN A. From the view of the host 2110a, the same stretched LUN A is exposed over the two active paths 2504 and 2108a.

In the example 2500, the illustrated active-active configuration includes the stretched LUN A configured from the device or volume pair (R1 2124, R2 2126), where the device or object pair (R1 2124, R2, 2126) is further configured for synchronous replication from the system 2102 to the system 2104, and also configured for synchronous replication from the system 2104 to the system 2102. In particular, the stretched LUN A is configured for dual, bi-directional or two way synchronous remote replication: synchronous remote replication of writes from R1 2124 to R2 2126, and synchronous remote replication of writes from R2 2126 to R1 2124. To further illustrate synchronous remote replication from the system 2102 to the system 2104 for the stretched LUN A, a write to the stretched LUN A sent over 2108a to the system 2102 is stored on the R1 device 2124 and also transmitted to the system 2104 over 2402. The write sent over 2402 to system 2104 is stored on the R2 device 2126. Such replication is performed synchronously in that the received host write sent over 2108a to the data storage system 2102 is not acknowledged as successfully completed to the host 2110a unless and until the write data has been stored in caches of both the systems 2102 and 2104.

In a similar manner, the illustrated active-active configuration of the example 2500 provides for synchronous replication from the system 2104 to the system 2102, where writes to the LUN A sent over the path 2504 to system 2104 are stored on the device 2126 and also transmitted to the system 2102 over the connection 2502. The write sent over 2502 is stored on the R2 device 2124. Such replication is performed synchronously in that the acknowledgement to the host write sent over 2504 is not acknowledged as successfully completed unless and until the write data has been stored in the caches of both the systems 2102 and 2104.

It should be noted that FIG. 5 illustrates a configuration with only a single host connected to both systems 2102, 2104 of the metro cluster. More generally, a configuration such as illustrated in FIG. 5 can include multiple hosts where one or more of the hosts are connected to both systems 2102, 2104 and/or one or more of the hosts are connected to only a single of the systems 2102, 2104.

Although only a single link 2402 is illustrated in connection with replicating data from systems 2102 to system 2104, more generally any number of links can be used. Although only a single link 2502 is illustrated in connection with replicating data from systems 2104 to system 2102, more generally any number of links can be used. Furthermore, although 2 links 2402 and 2502 are illustrated, in at least one embodiment, a single link can be used in connection with sending data from system 2102 to 2104, and also from 2104 to 2102.

FIG. 5 illustrates an active-active remote replication configuration for the stretched LUN A. The stretched LUN A is exposed to the host 2110a by having each volume or device of the device pair (R1 device 2124, R2 device 2126) configured and presented to the host 2110a as the same volume or LUN A. Additionally, the stretched LUN A is configured for two way synchronous remote replication between the systems 2102 and 2104 respectively including the two devices or volumes of the device pair, (R1 device 2124, R2 device 2126).

In the following paragraphs, sometimes the configuration of FIG. 5 can be referred to as a metro configuration or a metro replication configuration. The configurations of FIGS. 4 and 5 include two data storage systems 2102 and 2104 which can more generally be referred to as sites. In the following paragraphs, the two systems or sites 2102 and 2104 can be referred to respectively as site A and site B.

In an embodiment in accordance with the techniques of the present disclosure, the data storage systems can be SCSI-based systems such as SCSI-based data storage arrays. An embodiment in accordance with the techniques herein can include hosts and data storage systems which operate in accordance with the standard SCSI Asymmetrical Logical Unit Access (ALUA). The ALUA standard specifies a mechanism for asymmetric or symmetric access of a logical unit or LUN as used herein. ALUA allows the data storage system to set a LUN's access state with respect to a particular initiator port and the target port. Thus, in accordance with the ALUA standard, various access states can be associated with a path with respect to a particular device, such as a LUN. In particular, the ALUA standard defines such access states including the active-optimized, active-non optimized, and unavailable states as described herein. The ALUA standard also defines other access states, such as standby and in-transition or transitioning (i.e., denoting that a particular path is in the process of transitioning between states for a particular LUN). A recognized path (such as recognized by a host as a result of discovery processing) over which I/Os (e.g., read and write I/Os) can be issued to access data of a LUN can have an "active" state, such as active-optimized or active-non-optimized. Active-optimized is an active path to a LUN that is preferred over any other path for the LUN having an "active-non optimized" state. A path for a particular LUN having the active-optimized path state can also be referred to herein as an optimized or preferred path for the particular LUN. Thus active-optimized denotes a preferred path state for the particular LUN. A path for a particular LUN having the active-non optimized (or unoptimized) path state can also be referred to herein as a non-optimized or non-preferred path for the particular LUN. Thus active-non-optimized denotes a non-preferred path state with respect to the particular LUN. Generally, I/Os directed to a LUN that are sent by the host to the data storage system over active-optimized and active-non optimized paths are processed by the data storage system. However, the host may select to send I/Os to a LUN from those paths having an active-optimized state for the LUN. The host can proceed to use a path having an active non-optimized state for the LUN only if there is no active-optimized path for the LUN. A recognized path over which I/Os may not be issued to access data of a LUN may have an "unavailable" state. When a path to a LUN is in the unavailable state, a limited set of non-I/O-based commands (e.g. other than read and write commands to, respectively, read and write user data), such as the SCSI INQUIRY, may be issued. It should be noted that such limited set of non I/O based commands can also be issued over an active (e.g., active optimized and active non-optimized) path as well.

Figure 6:
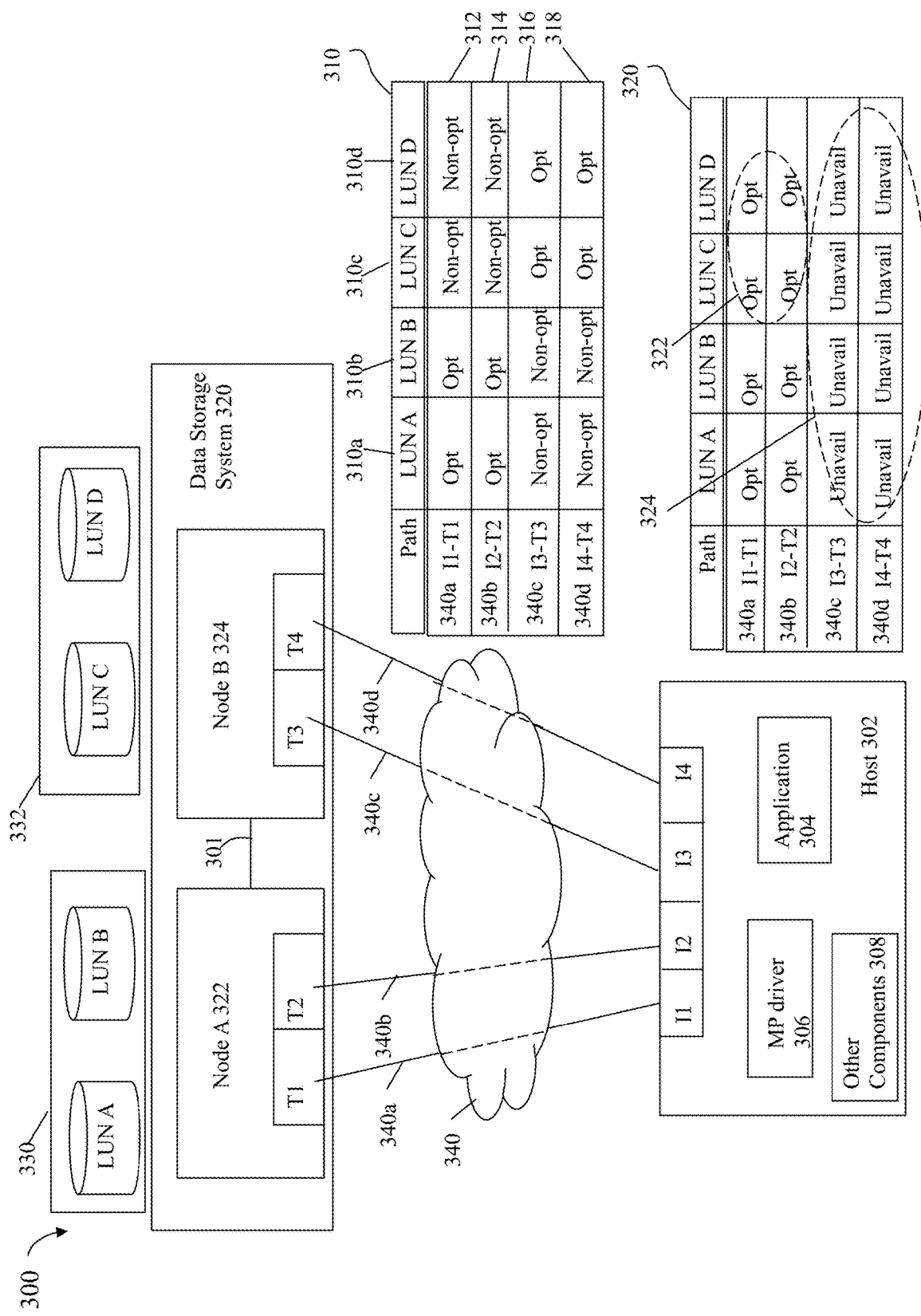
FIG. 6 is an example illustrating path states for paths between a host and a data storage system that can be used in an embodiment in accordance with the techniques of the present disclosure.

Referring to FIG. 6, shown is an example of an embodiment of a system that can be utilized in connection with the techniques herein. The example 300 includes a host 302, a network 340 and a data storage system 320. The host 302 and the data storage system 320 can communicate over one or more paths 340a-d through the network 340. The paths 340a-d are described in more detail below. The LUNs A and B are included in the set 330, and the LUNs C and D are included in the set 332. The LUNs of the sets 330 and 332 are configured from non-volatile BE storage PDs of the data storage system 320. The data storage system includes two nodes—node A 322 and node B 324. The nodes 322, 324 can be as described elsewhere herein. The element 301 denotes an internode communication connection similar, for example, to the connection 120 of FIG. 2. Consistent with other discussion herein such as in connection with FIG. 2, the BE PDs from which storage is provisioned for the LUNs of 330, 332 are accessible to both the nodes 322, 324.

The host 202 can include an application 304, a multi-path (MP) driver 306 and other components 308. The other components 308 can include, for example, one or more other device drivers, an operating system, and other code and components of the host. An I/O operation from the application 304 can be communicated to the data storage system 320 using the MP driver 306 and one or more other components of the data path or I/O path. The application 304 can be a database or other application which issues data operations, such as I/O operations, to the data storage system 320. Each of the I/O operations can be directed to a LUN, such as one of the LUNs of 330, 332, configured to be accessible to the host 302 over multiple physical paths. As such, each of the I/O operations can be forwarded from the application 304 to the data storage system 320 over one of the possible multiple paths.

The MP driver 306 can include functionality to perform any one or more different types of processing such as related to multipathing. For example, the MP driver 306 can include multipathing functionality for management and use of multiple paths. For example, the MP driver 306 can perform path selection to select one of the possible multiple paths based on one or more criteria such as load balancing to distribute I/O requests for the target device across available active-optimized or preferred paths. Host side load balancing can be performed by the MP driver to provide for better resource utilization and increased performance of the host, data storage system, and network or other connection infrastructure. The host 302 can also include other components 308 such as one or more other layers of software used in connection with communicating the I/O operation from the host to the data storage system 120. For example, element 108 can include Fibre Channel (FC), SCSI and NVMe (Non-Volatile Memory Express) drivers, a logical volume manager (LVM), and the like. It should be noted that element 308 can include software or other components used when sending an I/O operation from the application 304 where such components include those invoked in the call stack of the data path above the MP driver 306 and also below the MP driver 306. For example, application 304 can issue an I/O operation which is communicated in the call stack including an LVM, the MP driver 306, and a SCSI driver.

The data storage system 320 can include one or more BE PDs configured to store data of one or more LUNs. Each of the LUNs 330, 332 can be configured to be accessible to the host 302 through multiple paths. The node A 322 in this example has two data storage system target ports T1 and T2. The node B 324 in this example has two data storage system target ports T3 and T4. The host 302 includes 4 host initiator ports I1, I2, I3 and I4. The path 340a is formed using the endpoints I1 and T1 and may be denoted as I1-T1. The path 340b is formed using the endpoints I2 and T2 and may be denoted as I2-T2. The path 340c is formed using the endpoints I3 and T3 and may be denoted as I3-T3. The path 340d is formed using the endpoints I4 and T4 and may be denoted as I4-T4.

In this example, all of the LUNs A, B C and D can be accessible or exposed over all the data storage system target ports T1, T2, T3 and T4 over the paths 340a-d. As described in more detail below, a first set of paths to the node A 322 can be specified as active-optimized or preferred for the LUNs of the set 330 and a second set of paths to the node B 324 can be specified as active-optimized or preferred for the LUNs of the set 332. Additionally the first set of paths to the node A 322 can be specified as active-non optimized or non-preferred for the LUNs of the set 332 and the second set of paths to the node B 324 can be specified as active-non optimized or non-preferred for the LUNs of the set 330.

The multiple active paths allow the application I/Os to the LUNs A, B C and D to be routed over the multiple paths 340a-d and, more generally, allow the LUNs A, B C and D to be accessed over the multiple paths 340a-d. In the event that there is a component failure in one of the active-optimized multiple paths for a particular LUN, application I/Os directed to the particular LUN can be easily routed over other alternate preferred paths unaffected by the component failure. Additionally, in the event there are no preferred paths available for issuing I/Os to the particular LUN, non-preferred paths for the particular LUN can be used to send the I/Os to the particular LUN. Thus, an embodiment of the MP driver 306 can also perform other processing in addition to load balancing in connection with path selection. The MP driver 106 can be aware of, and can monitor, all paths between the host and the LUNs A, B C and D in order to determine that particular state of such paths with respect to the various LUNs. In this manner, the MP driver can determine which of the multiple paths over which a LUN is visible can be used for issuing I/O operations successfully. Additionally, the MP driver can use such information to select a path for host-data storage system communications issued to the particular LUN.

In the example 300, each of the LUNs A, B C and D can be exposed through the 4 paths 340a-d. As described in more detail below, each of the paths 340a-d may have an associated ALUA state also used by the host when issuing I/O operations. Each path 340a-d can be represented by two path endpoints—a first endpoint on the host 302 and a second endpoint on the data storage system 320. The first endpoint can correspond to a port of a host component, such as a host bus adapter (HBA) of the host 302, and the second endpoint can correspond to a target port of a data storage system component, such as a target port of a node of the data storage system 320. In the example 300, the elements I1, I2, I3 and I4 each denote a port of the host 302 (e.g. such as a port of an HBA), and the elements T1, T2 T3 and T4 each denote a target port of a node of the data storage system 320.

The MP driver 306, as well as other components of the host 302, can execute in kernel mode or other privileged execution mode. In one embodiment using a Unix-based operating system, the MP driver 306 can execute in kernel mode. In contrast, the application 304 can typically execute in user mode, or more generally, a non-privileged execution mode. Furthermore, it will be appreciated by those skilled in the art that the techniques herein can be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, the application 304 can issue one or more I/O operations (e.g., read and write commands or operations) directed to the LUNs 330, 332 of the data storage system. Such I/O operations from the application 304 can be directed to the MP driver 306 after passing through any intervening layers of the data or I/O path.

In connection with the SCSI standard, a path can be defined between two ports as described above. A command can be sent from the host (as well as a component thereof such as a HBA) and can be characterized as an initiator, originator or source with respect to the foregoing path. The host, as the initiator, sends requests to a data storage system (as well as a particular component thereof such as node having a port with a network address) characterized as a target, destination, receiver, or responder. Each physical connection of a path can be between a first endpoint which is an initiator port (e.g., I1) of the host and a second endpoint (e.g., T1) which is a target port of node in the data storage system. Over each such path, one or more LUNs can be visible or exposed to the host initiator through the target port of the data storage system.

In connection with some protocols such as the SCSI protocol, each path as related to sending and receiving of I/O commands can include 2 endpoints. As discussed herein, the host, or port thereof, can be an initiator with respect to I/Os issued from the host to a target port of the data storage system. In this case, the host and data storage system ports are examples of such endpoints. In the SCSI protocol, communication can be unidirectional in that one of the endpoints, such as the host HBA port, is the initiator and the other endpoint, such as the data storage system target port, is the target receiving the commands from the initiator.

An I/O command or operation, such as a read or write operation, from the host to the data storage system can be directed to a LUN and a logical address or location in the LUN's logical address space. The logical address or location of the LUN can be characterized as the target logical address of the I/O operation. The target logical address or location of the I/O operation can identify an LBA within the defined logical address space of the LUN. The I/O command can include various information such as identify the particular type of I/O command as read or write, identify the target logical address (e.g., LUN and LUN logical address) of the I/O command, and other information. In connection with servicing the I/O operation, the data storage system can map the target logical address to a physical storage location on a PD of the data storage system. The physical storage location can denote the physical storage allocated or provisioned and also mapped to the target logical address.

In an embodiment described herein, the data storage system 320 can be a SCSI-based system such as SCSI-based data storage array operating in accordance with the ALUA standard. As described herein, a data storage system in accordance with techniques herein can set an access path state for a particular LUN over a particular path from an initiator to a target of the data storage system. For example, the data storage system can set an access path state for a particular LUN on a particular path to active-optimized (also referred to herein as simply "optimized" or "preferred") to denote the path as a preferred path for sending I/Os directed to the LUN. The data storage system can set an access path state for a particular LUN on a particular path to active-non optimized (also referred to herein as simply "non-optimized" or "non-preferred") to denote a non-preferred path for sending I/Os directed to the LUN sent. The data storage system can also set the access path state for a particular LUN on a particular path to other suitable access states.

In accordance with the techniques herein, the data storage system can set the path state for a particular LUN to preferred or non-preferred for any suitable purpose. In at least one embodiment, multipathing software, such as the MP driver, on the host can monitor the particular access path state as may be set by the data storage system with respect to a particular LUN to determine which path to select for sending I/Os to the LUN. Thus, when the LUN is exposed to a host initiator over multiple paths (e.g., where the same LUN is accessible through multiple different target ports of the data storage system), the data storage system can vary the associated access state of each such path in order to vary and control the particular ones of the multiple paths over which the host may issue I/Os to the LUN.

The element 330 indicates that the LUN A and the LUN B are exposed to the host 302 over preferred paths to the node A 322 and non-preferred paths to the node B 324. The element 332 indicates that the LUN C and the LUN D are exposed to the host 302 over preferred paths to the node B 324 and non-preferred paths to the node A 322. Thus, the paths 340c-d to the target ports T3 and T4 of node B 324 are set to optimized or preferred for the LUNs C and D and set to non-optimized or non-preferred for the remaining LUNs A and B; and the paths 340a-b to the target ports T1 and T2 of node A 322 are set to preferred or optimized for the LUNs A and B and set to non-optimized or non-preferred for the remaining LUNs C and D.

In at least one embodiment, target ports are given identifiers and may be organized into target port groups (TPGs). In at least one embodiment, a TPG can be defined as a logical grouping or collection of one or more target port identifiers that share the same access characteristics for a particular LUN. For example, target ports T1 and T2 can be included in a first TPG and target ports T3 and T4 can be included in a second TPG. With ALUA in at least one embodiment, a LUN can be visible with respect to the entire TPG rather than on a port level basis. In other words, a LUN can be exposed or visible on a TPG level. If the LUN is visible or accessible on a first target port in the first TPG including that first target port, then the LUN is also accessible or visible on all targets ports of the first TPG. Each TPG can take on a state (e.g., preferred or non-preferred). For a given LUN, the LUN is visible on the TPG level basis (e.g. with respect to all target ports of a TPG). Thus the LUN has the same path state or access characteristic with respect to all target ports of the same TPG. For example, the first TPG noted above can include all target ports of one of the nodes such as node A 322 over which the LUNs A, B, C and D are exposed; and the second TPG noted above may include all target ports of one of the nodes such as node B 324 over which the LUNs A, B, C and D are exposed.

The table 310 denotes the different path states for each of the 4 paths for the 4 LUNs A, B, C and D. The table 310 reflects the path states as discussed above. The row 312 indicates that path I1-T1 including the target port T1 of node A 322 is active optimized (opt) or preferred for the LUNs A and B and active non-optimized (non-opt) or non-preferred for the LUNs C and D. The row 314 indicates that path I2-T2 including the target port T2 of node A 322 is optimized (opt) or preferred for the LUNs A and B and non-optimized (non-opt) or non-preferred for the LUNs C and D. The row 316 indicates that path I3-T3 including the target port T3 of node B 324 is optimized (opt) or preferred for the LUNs C and D and non-optimized (non-opt) or non-preferred for the LUNs A and B. The row 318 indicates that path I4-T4 including the target port T4 of node B 324 is optimized (opt) or preferred for the LUNs C and D and non-optimized (non-opt) or non-preferred for the LUNs A and B.

Assume further, for example, the node B 324 of the data storage system 320 now experiences a failure so that the target ports T3 and T4 and thus the paths 340c, 340d are unavailable. In response to the failure of the node B 324 and the target ports T3 and T4, the path states can be updated from the states of the table 310 to the revised path states of the table 320. In the table 320, due to the failure and unavailability of the paths 340c-d, 1) the path states of 322 indicate that the path 340a I1-T1 and the path 340b I2-T2 have transitioned from the non-optimized to the optimized or preferred path state for the LUNs C and D; and 2) the path states of 324 indicate that the path I3-T3 340c and the path 340d I4-T4 for the LUNs A, B, C and D have transitioned to the unavailable state.

It is noted that other embodiments can have different path state changes than as denoted by the table 320. FIG. 6 illustrates one way in which ALUA path states can be changed or modified to direct host I/Os over particular paths designated as preferred or active optimized.

A metro cluster configuration can be used herein to refer to a configuration including two data storage systems respectively configured with two devices or volumes with the same identity that cooperate to expose a stretched volume or LUN, such as in the FIGS. 4 and 5, to one or more hosts. In the metro cluster configuration, the hosts and applications running on the hosts perceive the two devices or volumes configured to have the same identity as the single stretched volume, device or LUN.

In a metro cluster configuration, hosts can be configured with uniform host connectivity as illustrated in FIGS. 4 and 5, where a host can be connected to both data storage systems, appliances or sites exposing the pair of devices or volumes configured as the same stretched volume or LUN, such as the LUN A described in connection with FIG. 5. In contrast to uniform host connectivity is non-uniform host connectivity, where the host is only connected to one of the systems, or sites of the metro cluster configuration.

In addition to some metro configurations being characterized as uniform or providing uniform host connectivity as noted above, some metro configurations which provide uniform host connectivity can also be characterized as equidistant with respect to a host and a stretched volume or LUN. A uniform metro configuration with respect to a host can be further characterized as equidistant with respect to a stretched LUN or volume exposed over paths from both systems or sites in that the host can experiences approximately the same I/O response time (RT) (e.g., within specified tolerances, limits or thresholds) when issuing I/Os to the stretched LUN or volume over paths to both sites or systems. For example with reference to FIG. 5, the host 2110a can experience a first I/O RT when sending I/Os directed to the stretched volume or LUN over path 2108a to site A, and the host can experience a second I/O RT when sending I/Os directed to the stretched volume or LUN over path 2504 to site B. With FIG. 5 as an equidistant uniform metro configuration, the first I/O RT and the second I/O RT can be the same (e.g., within acceptable tolerances or differences). In at least one embodiment, the equidistant uniform metro configuration can provide the host a minimum of 4 paths to the stretched volume or LUN where 2 of the 4 paths are between the host and the system or site A, and the remaining 2 paths are between the host and the system or site B. As will be discussed below in more detail in connection with FIG. 7A, ALUA active optimized or preferred paths to the stretched volume can exist between host and both systems or sites.

Figure 7A:
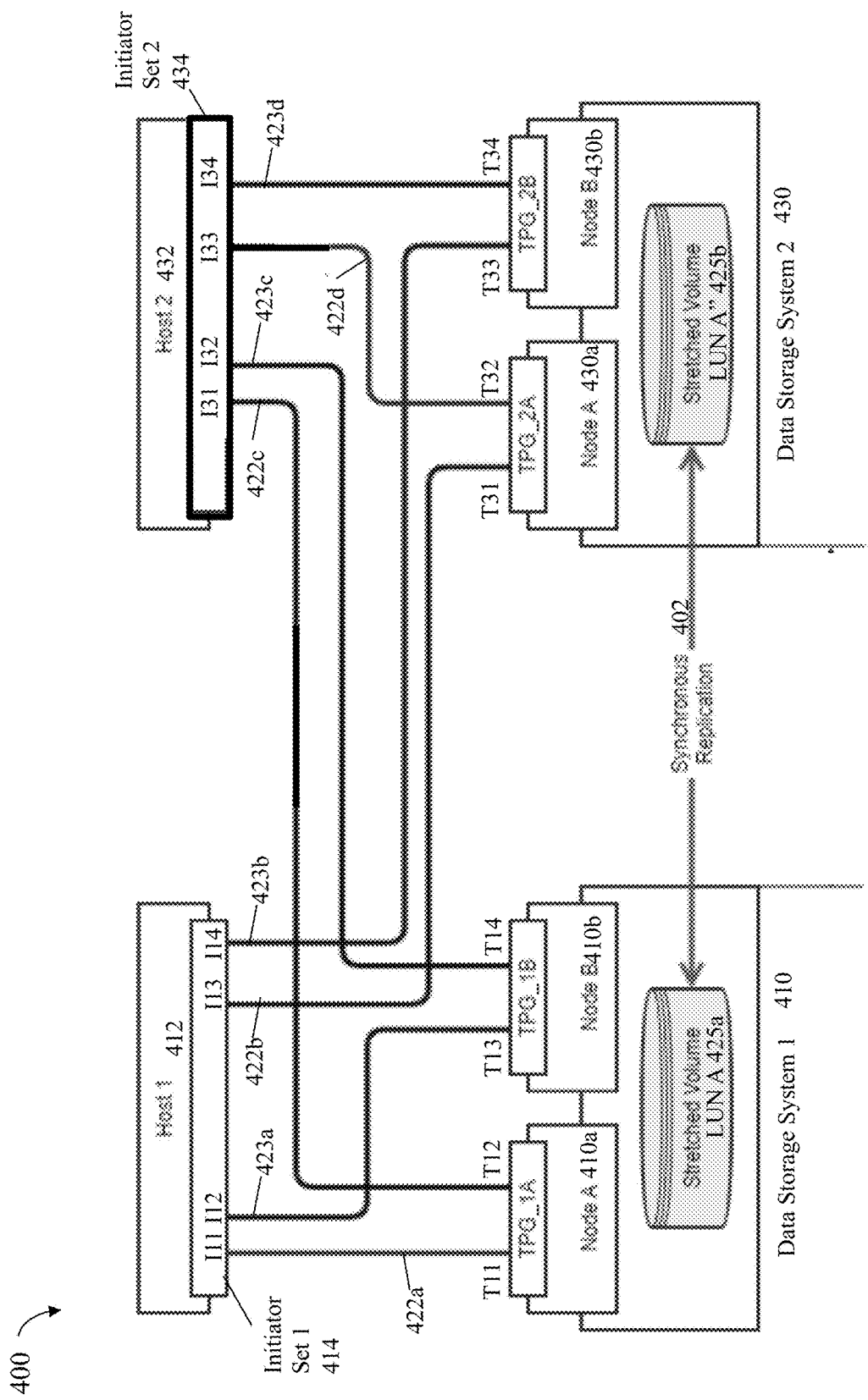
FIGS. 7A and 7B are examples illustrating path states of paths between multiple data storage systems and multiple hosts in a metro cluster configuration with a stretched volume in embodiments in accordance with the techniques of the present disclosure.

Referring to FIG. 7A, shown is a more detailed illustration of an equidistant uniform metro cluster configuration in at least one embodiment in accordance with the techniques of the present disclosure. The example 400 includes a stretched volume or LUN A and two hosts configured 412, 414 with uniform host connectivity in at least one embodiment in accordance with the techniques herein.

In the FIG. 7A, the host 1 412 includes the initiators I11-I14; and the host 432 includes the initiators I31-I34. The data storage systems 410, 430 may be dual node data storage systems such as described elsewhere herein (e.g., FIG. 2). The data storage system 410 includes the node A 410a with the target ports T11-T12, and the node B 410b with the target ports T13-T14. The data storage system 430 includes the node A 430a with the target ports T31-T32, and the node B 430b with the target ports T33-T34. From the perspective of host 1 412, the data storage system 1 410 and the data storage system 2 430 and the data center 2 420b may be characterized as equidistant with respect to the stretched volume or LUN A as discussed elsewhere herein.

As illustrated in the FIG. 7A, the stretched volume or LUN A is configured from the device or volume pair LUN A 425a and LUN A" 425b, where both the LUNs or volumes 425a-b are local resources of their respective systems or sites configured to have the same identity from the perspective of the hosts 412, 432. The LUN A 425a and the LUN A" 425b are configured for two way synchronous remote replication 402 which, consistent with other description herein, provides for automated synchronous replication of writes of the LUN A 425a to the LUN A" 425b, and also automated synchronous replication of writes of the LUN A" 425b to the LUN A 425a. The LUN A 425a can be exposed to the hosts 412, 432 over the target ports T11-T14 of the system 410, and the LUN A" 425b can be exposed to the hosts 412, 432 over the target ports T31-T34.

In at least one embodiment in which the arrangement of FIG. 7A is in accordance with the ALUA protocol, the paths 422a-d can be configured with the path state of active optimized, and the paths 423a-d may be configured with the path state of active non-optimized.

The host 412 has equidistant uniform host connectivity to the stretched volume or LUN A by the active connections or paths 422a (I11-T11), 423a (I12-T13) to the data storage system 410 exposing the LUN A 425a, and the active connections or paths 422b (I13-T31), 423b (I14-T33) to the data storage system 430 exposing the LUN A" 425b. In particular, the host 412 has active optimized paths 422a-b to both systems or sites 410, 430 over which to access the stretched volume or LUN A. For example, the host 412 can issue read and write I/Os directed to the stretched LUN or volume over active optimized path 422a to system 410, and the host 412 can issue read and write I/Os directed to the stretched LUN or volume over active optimized path 422b.

The host 432 has equidistant uniform host connectivity to the stretched volume or LUN A by the active connections or paths 422c (I31-T12), 423c (I32-T14) to the data storage system 410 exposing the LUN A 425a, and the active connections or paths 422d (I33-T32), 423d (I34-T34) to the data storage system 430 exposing the LUN A" 425b. In particular, the host 432 has active optimized paths 422c-d to both systems or sites 410, 430 over which to access the stretched volume or LUN A. For example, the host 432 can issue read and write I/Os directed to the stretched LUN or volume over active optimized path 422c to system 410, and the host 432 can issue read and write I/Os directed to the stretched LUN or volume over active optimized path 422d.

In such an arrangement as in FIG. 7A, each of the hosts 412, 432 can issue read I/Os to the stretched LUN or volume configured from the volumes 425a-b to both systems or sites 410, 430, whereby such host read I/Os can be serviced by both sites or systems 410, 430. In at least one embodiment, a chain of metadata (MD) pages can be used to read requested user data from BE non-volatile storage such as when the requested read data is not stored in a system's or site's cache and results in a read cache miss. The chain of MD pages can be included in mapping information used to map a logical address, such as a target logical address of a read I/O operation, to a corresponding physical storage location including content stored at the logical address. It may not be optimal or desired to have such read I/Os of the same stretched volume or LUN serviced by both sites or systems 410, 430. For example, both systems or sites 410, 430 will need to cache the mapper or mapping MD pages related to the stretched volume or LUN in order to service the read I/Os directed to the stretched volume or LUN resulting in consumption of cache on both systems. The foregoing can be undesirable in that cache can be a limited resource also used in connection with storing other MD pages of other volumes whose I/Os are also serviced by the systems or sites. Thus, there can be thrashing of cached MD pages on the sites resulting in performance overhead. For example, MD pages for another volume or LUN K may not be stored in cache due to the consumption of cache in storing MD pages for stretched volumes. As a result, servicing a read directed to LUN K can result in additional processing overhead to service the cache misses with respect to MD pages needed for LUN K.

One way to alleviate or resolve the foregoing drawback of having both sites or systems cache the same MD pages of stretched volumes is to have the host send read requests to only a single one of the two sites, systems or appliances 410, 430 even though both sites 410, 430 can be capable of accepting and servicing read requests directed to the same stretched volume or LUN. In systems operating in accordance with the ALUA standard and path states, the foregoing can be achieved by setting the ALUA active optimized or preferred path state for only a single system, appliance or site exposing a stretched volume or LUN. For example with respect to the host 412, rather than have the paths 422a and 422b both be set to active optimized with respect to the stretched volume or LUN, only one of the paths 422a or 422b can be set to active optimized with the other remaining path set to active non-optimized (along with the other active non-optimized paths 423a-b between the host 412 and the systems 410, 430). In this manner, reads, as well as all I/Os, from the host 412 which are directed to the stretched volume or LUN can be serviced by only a single one of the systems 410, 430 rather than both. In a similar manner with respect to the host 432, only one of the paths 422c or 422d can be set to active optimized with the other remaining path set to active non-optimized (along with the other active non-optimized paths 423c-d). In this manner, reads, as well as all I/Os, from the host 432 which are directed to the stretched volume or LUN can be serviced by received by only a single one of the systems 410, 430 rather than both. The reads can be completely serviced by the receiving systems, and the writes are serviced by the receiving system, and then replicated to the peer system for servicing on the peer system in accordance with the bi-directional synchronous replication configuration in at least one embodiment.

Accordingly described in the following paragraphs are techniques of the present disclosure which provide for selection of an optimal one of the sites, systems or appliances to service read I/Os directed to a stretched volume or LUN. In at least one embodiment, the techniques can be used to select such an optimal site, system or appliance for receiving all I/Os directed to a stretched volume or LUN in an equidistant uniform metro configuration. Furthermore, the techniques of the present disclosure in at least one embodiment can provide for selecting a single node of the selected optimal site, system or appliance. The selected single node can be the sole node of the configuration to receive all I/Os of the stretched volume or LUN over an active-optimized path such as between a host and the system that includes the selected single node. The selected single node can be the sole node of the configuration to receive and service read I/Os of the stretched volume or LUN. The selected single node of one appliance can be the sole node of the configuration to receive write I/Os directed to the stretched volume or LUN where such write I/Os are also replicated to the peer site, system or appliance for servicing on the peer site.

The foregoing and other aspects of the techniques of the present disclosure are described in more detail in the following paragraphs.

Figure 7B:
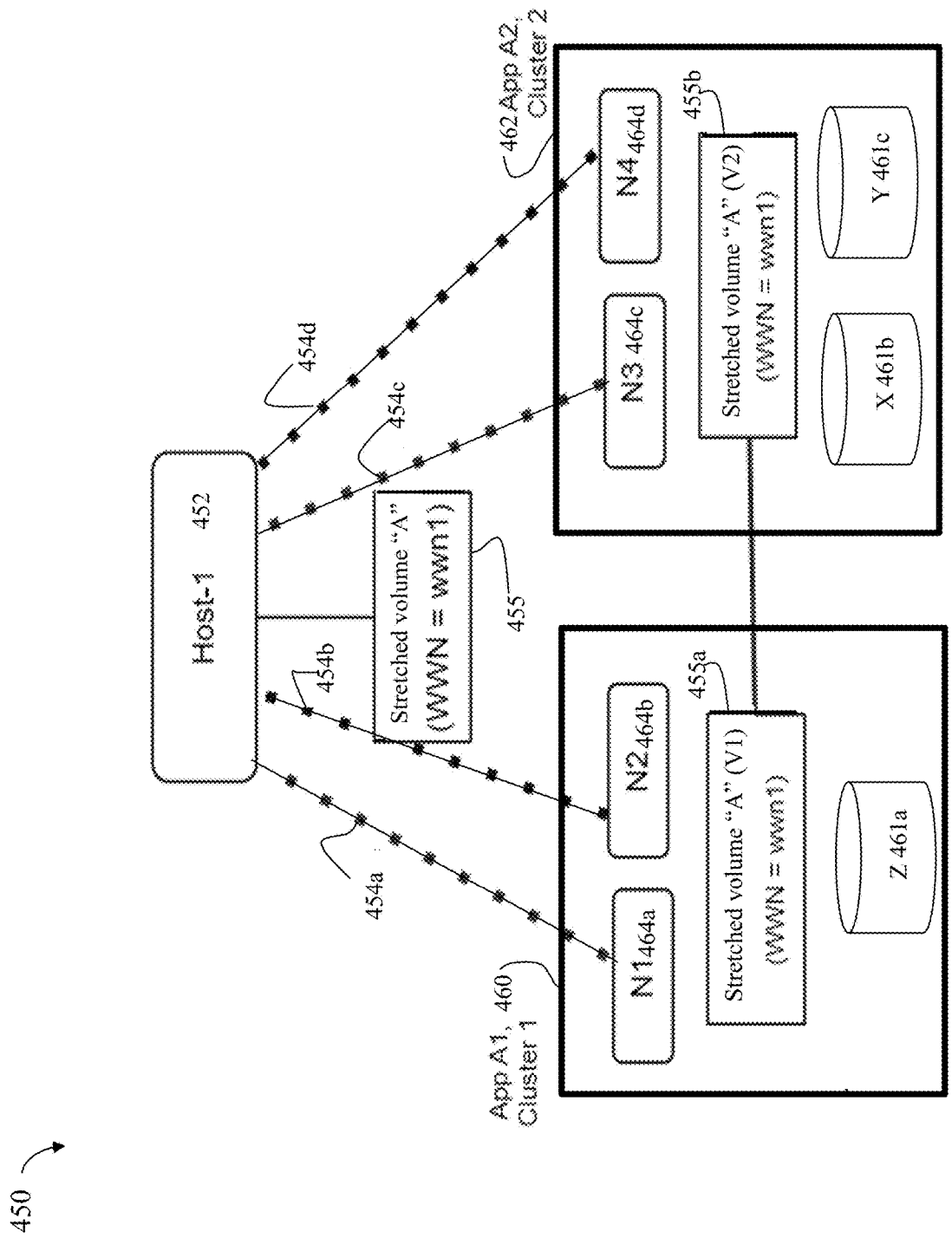

Referring to FIG. 7B, shown is an example 450 illustrating a simplified view of an equidistant uniform metro configuration in at least one embodiment in accordance with the techniques of the present disclosure.

The example 450 includes a host 452; site, appliance or system A1 460; and site, appliance or system A2. The site, appliance or system A1 460 can be included in a first cluster, cluster 1, and the site, appliance or system A2 462 can be included in a second cluster, cluster 2. The host 452 can be similar, for example, to any of the hosts 412, 432, 2110a described elsewhere herein. The site A1 460 can be similar, for example, to any of the sites or systems 410, 2102 described elsewhere herein. The site A2 463 can be similar, for example, to any of the sites or systems 430, 2104 described elsewhere herein. The element 455 denotes the stretched volume or LUN A having an identifier of a world wide name (WWN) of "wwn1". The stretched volume or LUN A 455 can be configured from the V1, V2 volume pair, where V1 is represented as 455a on site A1 460 and V2 is represented as 455b on site A2 462, and where both V1 455a and V2 455b are configured with the same identity of "wwn1". Consistent with other discussion herein such as in connection with FIG. 7A, the stretched volume or LUN A 455 can be configured for two way or bi-directional synchronous replication between V1 455a and V2 455b. The site A1 460 includes two nodes—N1 464a and N2 464b. The site A2 462 includes two nodes—N3 464c and N4 464d.

The paths 454a-b are paths between site A1 460 and the host 452 over which V1 455a configured as the stretched volume or LUN A 455 is exposed to the host 452. The paths 454c-d are paths between site A2 463 and the host 452 over which V2 455b configured as the stretched volume or LUN A 455 is exposed to the host 452. From the perspective of the host 452, the host 452 views the 4 paths 454a-d as 4 paths to the same volume or LUN 455. In this example 450, there are two active-optimized (AO) paths 454a and 454c, respectively, to the sites A1 460 and A2 462 with respect to the stretched LUN A 455. The remaining paths 454b and 454d can be configured as active non-optimized (ANO) with respect to the stretched LUN A 455.

Sites A1 460 and A2 462 can have additional stretched volumes and/or other non-stretched or regular block volumes attached to the host 452 and/or additional hosts (not illustrated). Thus, sites A1 460 and A2 462 can have I/O workload from both one or more stretched volumes and/or one or more regular volumes.

In the example configuration of FIG. 7B, the site A1 460 can also include a regular or non-stretched volume Z 461a; and the site A2 462 can also include regular or non-stretched volumes X 461b and Y 461c.

In the configuration of FIG. 7B consistent with other discussion herein, since read I/Os directed to stretched LUN or volume A from the host 452 can be received and serviced by both sites 460, 462, nodes on both sites 460, 462 will need to cache the MD pages related to the stretched volume or LUN A 455. This can result into inefficient cache usage and performance overheads for other volumes due to thrashing of MD pages associated with the stretched volume A 455. To resolve this problem in at least one embodiment, the ALUA path state with respect to the stretched volume A 455 can be set to AO for a single one of the paths 454a-d from only one of the sites A1 460 or A2 462. All remaining ones of the paths 454a-d can be set to ANO with respect to the stretched volume A 455. Thus in at least one embodiment, selecting one optimized ALUA path for the stretched volume or LUN A 455 can include selection of an optimal one of the appliances, systems or sites 460, 462; and then selection of one of the multiple nodes within the selected optimal one of the appliances, systems or sites 460, 462.

When selecting an optimal appliance, site or system, and node thereof, consideration can be given to overall I/O resource utilization of an appliance, site or system since the selected one will be handling all read I/Os for stretched volume or LUN A 455. In at least one embodiment, the selection of one of the appliances, systems or sites 460, 462 can utilize a model described herein that can qualitatively compare I/O resource utilization of the two appliances, systems or sites 460, 462 and identify the single appliance, system or site of 460, 462 with the greater available resources. In at least one embodiment, the model described herein can provide for such comparison of the two appliances, systems or sites 460, 462 each having different hardware configurations and each with different workloads. The workloads of each site 460, 462 can be I/O workloads that vary, for example, in terms of read/write mix or ratio. Furthermore, such I/O workloads can include one or more different I/O sizes for read and/or write I/Os. Thus the model described herein in at least one embodiment can accommodate such varying I/O workloads in terms of read/write ratios and/or various combinations of read and/or write I/O sizes.

In at least one embodiment, the model to select an optimal one of the appliances, systems or sites 460, 462 can be utilized as in a multiple step process described below. Such processing to select one of the appliances, systems or sites 460, 462 can be performed on the particular one of 460, 462 designated as the preferred appliance, system or site. In at least one embodiment, the preferred appliance, system or site included in one cluster can use one or more APIs (application programming interfaces) to communicate with a peer cluster to obtain any metrics about the non-preferred appliance, system or site as needed to perform calculations described herein.

What will now be described is processing that can be performed in at least one embodiment in accordance with the techniques herein to determine AO path selection of a single path to a single node of a single appliance, system or site for the stretched volume or LUN A 455. More generally, the following processing also describes AO path selection (of a single path to a single node of a single system, site or appliance) for each of any remaining other stretched volumes and/or non-stretched volumes.

In the following paragraphs, a simplified example configuration is presumed consistent with FIG. 7B where there is a single stretched volume along with one or more other non-stretched volumes. It is assumed that all I/Os are normalized to the same I/O size so that associated metrics can be added and/or subtracted directly.

The following example illustrating use of the techniques of the present disclosure presume an equidistant uniform metro configuration as in FIG. 7B as a starting point or starting state with additional items of the starting configuration noted below. It should be noted that the term node affinity can be used sometimes herein to refer to a particular node configured to receive and service I/Os with respect to a particular volume or LUN, where the particular volume or LUN is exposed over at least one path between the affined node (of a particular site, system or appliance) and the host 452, and where the at least one path to the affined node can be configured as AO with respect to the particular volume or LUN. Other paths (that are associated with other unaffined nodes of the same site, system or appliance) that may expose the particular volume or LUN to the host can be configured as ANO in the starting point or starting configuration.

Consistent with discussion above, FIG. 7B configuration 450 includes site A1 460 comprising local resource V1 455*a* configured as the stretched volume A, and comprising regular volume Z 461*a*. The local resource V1 455*a* (e.g., configured as stretched volume A on site A1 460) has a node affinity for N1 464*a* whereby V1 455*a* is exposed over path 454*a* to the host 452, and the path 454*a* is AO with respect to V1 455*a* configured as the stretched volume A. The local resource V1 455*a* can also be exposed to the host 452 over the path 454*b* which can be ANO with respect to the local resource V1 455*a*. The volume Z 461*a* has a node affinity for N1 whereby Z is exposed over path 454*a* to the host 452, and where the path 454*a* is AO with respect to the volume Z 461*a*. The volume Z 461*a* can be exposed to the host 452 over path 454*b* whereby the path 454*b* can be set to ANO with respect to the volume Z 461*a*.

The configuration 450 further includes site A2 462 comprising local resource V2 455*a* configured as the stretched volume A, and comprising regular volumes X 461*b* and Y 461*c*. The local resource V2 455*b* (e.g., configured as stretched volume A on site A2 462) has a node affinity for N3 464*c* whereby V2 455*b* is exposed over path 454*c* to the host 452, and the path 454*c* is AO with respect to V2 455*b* configured as the stretched volume A. The local resource V2 455*b* can also be exposed to the host 452 over the path 454*d* which can be ANO with respect to the local resource V2 455*b*. The volume X 461*b* has a node affinity for N3 whereby X is exposed over path 454*c* to the host 452, and where the path 454*c* is AO with respect to the volume Z 461*b*. The volume X 461*b* can be exposed to the host 452 over path 454*d* whereby the path 454*d* is set to ANO with respect to the volume X 461*b*. The volume Y 461*c* has a node affinity for N4 whereby Y is exposed over path 454*d* to the host 452, and where the path 454*d* is AO with respect to the volume Y 461*c*. The volume Y 461*c* can be exposed to the host 452 over path 454*c* whereby the path 454*c* can be set to ANO with respect to the volume Y 461*c*.

Referring to FIG. 8, shown is an example 500 of tables of metrics and related information that can be used in at least one embodiment in accordance with the techniques of the present disclosure. The example 500 includes metrics and other information in accordance with the example configuration described above and illustrated in connection with FIG. 7B.

The table 1 510 specifies per volume or LUN I/O workload in read IOPS (I/Os per second) and write IOPS. Additionally the table 510 summarizes configuration information regarding the volumes of FIG. 7B. The read and write IOPS denoted in table 510 and also tables 520 and 530 are represented in the table using variables rather than exemplary numerical values. Additionally, the read IOPS of the tables 510, 520 and 530 can be normalized to the same I/O size so that read IOPS can be added and subtracted, or generally operated upon in combination, in connection with various subsequent equations, formulas and operations described herein. In a similar manner, the write IOPS of the tables 510, 520 and 530 can be normalized to the same I/O size so that write IOPS can be added and subtracted, or generally operated upon in combination, in connection with various subsequent equations, formulas and operations described herein.

The table 510 includes the following columns: volume 512*a*, appliance, system or site ID (identifier) 512*b*, affinity 512*c*, read IOPS 512*d*, and write IOPS 512*e*. Each row 514*a-e* of the table 510 denotes information relevant for a different one of the volumes or local resources discussed above. The row 514a indicates that the local resource V1 configured as the stretched volume A (512a) on the site A1 (512b) has node affinity N1 (512c), read IOPS v1_r (512d), and write IOPS v1_w (512e). The row 514b indicates that the local resource configured as volume Z (512a) on the site A1 (512b) has node affinity N1 (512c), read IOPS z_r (512d), and write IOPS z_w (512e). The row 514c indicates that the local resource V2 configured as stretched volume A (512a) on the site A2 (512b) has node affinity N3 (512c), read IOPS v2_r (512d), and write IOPS v2_w (512e). The row 514d indicates that the local resource configured as volume X (512a) on the site A2 (512b) has node affinity N3 (512c), read IOPS x_r (512d), and write IOPS x_w (512e). The row 514e indicates that the local resource configured as volume Y (512a) on the site A2 (512b) has node affinity N4 (512c), read IOPS y_r (512d), and write IOPS y_w (512e).

The table 520 specifies per node level I/O workload in read and write IOPS and associated site information. The table 520 includes the following columns: node 522a; appliance, system or site 522b; read IOPS 522c; and write IOPS 522d. Each row 524a-d describes IOPS information for a different one of the four nodes 464a-d of FIG. 7B. The row 524a indicates that node N1 (522a) of site A1 (522b) has read IOPS n1_r (522c) and has write IOPS n1_w (522d). The row 524b indicates that node N2 (522a) of site A1 (522b) has read IOPS n2_r (522c) and has write IOPS n2_w (522d). The row 524c indicates that node N3 (522a) of site A2 (522b) has read IOPS n3_r (522c) and has write IOPS n3_w (522d). The row 524d indicates that node N4 (522a) of site A2 (522b) has read IOPS n4_r (522c) and has write IOPS n4_w (522d).

The table 530 specifies per appliance, site or system level I/O workload including read IOPS and write IOPS. The table 530 includes the following columns: appliance, system or site 532a; read IOPS 532b; and write IOPS 532c. Each row 534a-b describes IOPS information for a appliance, site or system 460, 462 of FIG. 7B. The row 534a indicates that site A1 (532a) has read IOPS a1_r (532b) and has write IOPS a1_w (532c). The row 534b indicates that site A2 (532a) has read IOPS a2_r (532b) and has write IOPS a2_w (532c).

Based on the example configuration of FIG. 7B and the metrics of FIG. 8: On appliance system or site A1 460:

The read I/O workload expressed as read IOPS for node N1 (n1_r as in row 524a, column 522c of table 520) is the summation of read IOPS of volumes affined to node N1. In this example configuration of FIG. 7B, the volumes V1 (configured as stretched volume A) and Z of site A1 are affined to node N1 such that path 454a for volumes V1 and Z is AO, and such that n1_r can be expressed as follows in EQUATION 1:

$$n1\_r = v1\_r + z\_r \qquad \text{EQUATION 1}$$

where v1_r denotes the read IOPS of V1 (table 510, entry located in row 514a in column 512d); and z_r denotes the read IOPS of volume Z (table 510 entry located in row 514b in column 512d).

The read I/O workload expressed as read IOPS for node N2 (n2_r as in row 524b, column 522c of table 520) is 0 as in EQUATION 2 below since no volumes are affined to N2. Also, the path 454b is ANO for all exposed volumes V2 455a and Z 461a.

$$n2\_r = 0 \qquad \text{EQUATION 2}$$

On appliance, system or site A2 462:

The read workload expressed as IOPS for node N3 (n3_r as in row 524c, column 522c of table 520) is the summation of read IOPS of volumes affined to node N3. In this example configuration of FIG. 7B, the volume V2 (configured as stretched volume A) and the volume X of site A2 are affined to node N3 such that path 454c for volumes V2 and X is AO, and such that n3_r can be expressed as follows in EQUATION 3:

$$n3\_r = v2\_r + x\_r \qquad \text{EQUATION 3}$$

where v2_r denotes the read IOPS of V2 (table 510, entry located in row 514c in column 512d); and x_r denotes the read IOPS of volume X (table 510 entry located in row 514d in column 512d).

The read workload expressed as read IOPS for node N4 (n4_r as in row 524d, column 522c of table 520) is the summation of read IOPS of volumes affined to node N4. In this example configuration of FIG. 7B, the volume Y of site A2 is affined to node N4 such that path 454d for volume Y is AO and such that n4_r can be expressed as follows in EQUATION 4:

$$n4\_r = y\_r \qquad \text{EQUATION 4}$$

where y_r denotes the read IOPS of volume Y (table 510, entry located in row 514e in column 512d).

The read workload expressed as IOPS for the site, system or appliance A1 460 (a1_r as in row 534a of column 532b of table 530) can be expressed as the sum of all node level read IOPS for those nodes N1 464a and N2 464b of appliance A1 as in EQUATION 5 below:

$$a1\_r = n1\_r + n2\_r \qquad \text{EQUATION 5}$$

where:

n1_r denotes the read IOPS of node N1 (table 520, entry located in row 524a of column 522c); and n2_r denotes the read IOP of node N2 (table 520, entry located in row 524b of column 522c).

The read workload expressed as read IOPS for the site, system or appliance A2 463 (a2_r as in row 534b of column 532b of table 530) can be expressed as the sum of all node level read IOPS for those nodes N3 464c and N4 464d of appliance A2 as in EQUATION 6 below:

$$a2\_r = n3\_r + n4\_r \qquad \text{EQUATION 6}$$

where:
n3_r denotes the read IOPS of node N3 (table 520, entry located in row 524c of column 522c); and
n4_r denotes the read IOP of node N4 (table 520, entry located in row 524d of column 522c).

Based on the above information as described in connection with FIGS. 7B and 8, what will now be described are processing steps that can be performed in at least one embodiment in accordance with the techniques of the present disclosure to select a single site system or appliance, and affined node thereof, for each stretched volume. In particular, at least one embodiment of the techniques of the present disclosure can include selecting a single AO path to a single node of a single site, system or appliance for each stretched volume. In at least one embodiment in accordance with the techniques of the present disclosure can also include selecting a single site system or appliance, and affined node thereof, for each non-stretched volume. In particular, at least one embodiment of the techniques of the present disclosure can include selecting a single AO path to a single node of a single site, system or appliance for each regular or non-stretched stretched volume.

Consistent with the example above and configuration of FIG. 7B, there is a single stretched volume A along with other non-stretched or regular volumes X, Y and Z. In at least one embodiment as discussed below in more detail, for the stretched volume A, processing can include first selecting a single one of the sites A1 or A2 to receive and service read I/Os directed to the stretched volume A (where the selected single site will also receive generally all I/Os, both reads and writes, directed to the volume A, and no I/Os directed to the volume A are sent by the host to the unselected remaining site). Subsequently, processing can then select a single node of the selected site to receive all I/Os directed to volume A, and thus where the selected single node affined to volume A receives and services all read I/Os directed to volume A. Consistent with the bi-directional synchronous replication configuration, writes directed to volume A received at the selected site, and affined node thereof, can service the write locally and can also replicated the write to the peer system or site for servicing on the peer system or site.

In a first step S1, processing can be performed to identify the one or more stretched volumes each configured from a pair of volumes (V1, V2) where V1 is a local resource of site A1 and where V2 is a local resource of site A2. In this example, the step S1 identifies the single stretched volume A 455 configured from V1 455a of site A1 and V2 455b of site A2. Following the step S1 is a step S2.

In the step S2, processing can be performed to determine the number of read IOPS for each stretched volume. In this example, the step S2 can include determining the number of read IOPS for the stretched volume A. The step S2 can include determining the number of read IOPS for V1 455a configured as volume A and determining the number of read IOPS for V2 455b also configured as volume A. With reference back to FIG. 8, the number of read IOPS for V1 455a is denoted as v1_r (e.g., entry of table 510, located at row 514a, column 512d); and the number of read IOPS for V2 455b is denoted as v2_r (e.g., entry of table 510, located at row 514c, column 512d). Following the step S2, a step S3 can be performed.

In the step S3, processing can be performed to calculate site, system or appliance level metrics and node level metrics relative to sites A1 and A2, where such calculations omit or subtract out all read IOPS of the stretched volumes such as the stretched volume A in this example. The stretched volume read IOPs are subtracted from particular node-level metrics based on the node affinity of stretched volume. In this example, the stretched volume A1 configured from the local resources or local volumes V1 of site A1 and V2 of site A2 are affined to nodes N1 (of site A1) and N3 (of site A2).

The step S3 can include a first substep S3a to calculate revised node level metrics without read IOPS of the stretched volume A. The substep S3a can include determining revised node level metrics for the nodes N1 464a, N2 464b, N3 464c and N4 464d, where any relevant read IOPS of stretched volume(s) are subtracted from the current node level metrics as denoted in table 520.

The substep S3a can include determining n1_r' denoting the revised read IOPS of node N1 without the stretched volume A's read IOPS. For node N1, the stretched volume A is affined to N1. For node N1, the local resource V1 (configured as stretched volume A) and its associated read IOPS, v1_r, is relevant, where n1_r' can be calculated as represented in EQUATION 7 as follows:

$$n1\_r' = n1\_r - v1\_r \qquad \text{EQUATION 7}$$

where:
n1_r denotes the total read IOPS of node N1 across all volumes affined to N1 (e.g. n1_r is included in the entry of table 520, located in row 524a, at column 522c); and
v1_r denotes the read IOPS of V1 configured as the stretched volume A in the site A1, where V1, and thus the stretched volume A, is affined to node N1.

The substep S3a can include determining n2_r' denoting the revised read IOPS of node N2 without the stretched volume A's read IOPS. For node N2, the stretched volume A is not affined to node N2 so that n2_r' can be calculated as represented in EQUATION 8 as follows:

$$n2\_r' = n2\_r \qquad \text{EQUATION 8}$$

where:
n2_r denotes the total read IOPS of node N2 across all volumes affined to N2 (e.g. n2_r is included in the entry of table 520, located in row 524b, at column 522c).

The substep S3a can include determining n3_r' denoting the revised read IOPS of node N3 without the stretched volume A's read IOPS. For the node N2, the stretched volume A is affined to node N3. For node N3, the local resource V2 (configured as the stretched volume A) and its associated read IOPS, v3_r, is relevant, where n3_r' can be calculated as represented in EQUATION 9 as follows:

$$n3\_r' = n3\_r - v2\_r \qquad \text{EQUATION 9}$$

where:
n3_r denotes the total read IOPS of node N3 across all volumes affined to N3 (e.g. n3_r is included in the entry of table 520, located in row 524c, at column 522c); and
v2_r denotes the read IOPS of V2 configured as the stretched volume A in the site A2, where V2, and thus the stretched volume A, is affined to node N3.

The substep S3a can include determining n4_r' denoting the revised read IOPS of node N4 without the stretched volume A's read IOPS. For node N4, the stretched volume A is not affined to node N4 so that n4_r' can be calculated as represented in EQUATION 10 as follows:

$$n4\_r' = n4\_r \qquad \text{EQUATION 10}$$

where:
n4_r denotes the total read IOPS of node N4 across all volumes affined to N4 (e.g. n4_r is included in the entry of table 520, located in row 524*d*, at column 522*c*).

Following the substep S3*a*, a second substep S3*b* can be performed. The substep S3*b* can include calculating revised appliance, site or system level metrics without read IOPS of the stretched volume A. The substep S3*b* can include determining revised appliance, site or system level metrics for the appliances, systems or sites A1 460 and A2 462, where any relevant read IOPS of stretched volume(s) are subtracted from the current appliance, system or level metrics as denoted in table 530.

The substep S3*b* can include determining a1_r' denoting the revised read IOPS of site A1 460 without the stretched volume A's read IOPS. For site A1 which includes nodes N1 and N2, the corresponding revised node level metrics of such nodes as expressed using EQUATIONS 7 and 8 are relevant. The metric a1_r' can be calculated as represented in EQUATION 11 as follows:

$$a1\_r' = n1\_r' + n2\_r' \qquad \text{EQUATION 11}$$

where:
n1_r' denotes the revised total read IOPS of node N1 without the read IOPS of the stretched volume A (e.g., n1_r' can be calculated as in EQUATION 7); and
n2-r' denotes the revised total read IOPS of node N2 without the read IOPS of the stretched volume A (e.g., n2_r' can be calculated as in EQUATION 8).

The substep S3*b* can include determining a2_r' denoting the revised read IOPS of site A2 462 without the stretched volume A's read IOPS. For site A2 which includes nodes N3 and N4, the corresponding revised node level metrics of such nodes as expressed using EQUATIONS 9 and 10 are relevant. The metric a2_r' can be calculated as represented in EQUATION 12 as follows:

$$a2\_r' = n3\_r' + n4\_r' \qquad \text{EQUATION 12}$$

where:
n3_r' denotes the revised total read IOPS of node N3 without the read IOPS of the stretched volume A (e.g., n3_r' can be calculated as in EQUATION 9); and
n4_r' denotes the revised total read IOPS of node N4 without the read IOPS of the stretched volume A (e.g., n4_r' can be calculated as in EQUATION 10).

Following the step S3*b* and thus the step S3, a step S4 can be performed. The step S4 can determine the optimal appliance, site or system to handle read IOPS for the stretched volume, such as the stretched volume A, in accordance with the revised appliance level read IOPS metrics (as calculated in the substep S3*b* using EQUATIONS 11 and 12 above) and with the appliance level write IOPS metrics (as included in the column 532*c* of table 530).

In at least one embodiment, the step S4 performs processing including comparing available resources on the two systems, sites or appliances A1 and A2, in order to determine which of the foregoing has more available resources and is therefore better able to service the read IOPS of the stretched volume A.

With the two appliances, systems or sites A1 and A2 having different hardware resources, different hardware configurations, and/or different I/O workloads (e.g., different I/O workload characteristics), it can be difficult to determine whether A1 or A2 has more free resources available for a particular task often due to the complexity of the particular task. For example, if the particular task is processing of write IOPS associated with a particular volume, such a determination regarding free or available resources for performing write IOPS processing can be difficult due to the complexity associated with write I/Os. For example, relevant processing for write IOPS can include flushing recorded writes from a write log and associated background operations (e.g., including those associated with log-based or log-structured systems such as garbage collection). However, it can be simpler to model and predict resources needed for read IOPS, as opposed to write IOPS, since servicing read IOPS does not require the foregoing flushing and other associated background operations that can be relevant for write I/Os.

In at least one embodiment, if new or additional workload to be added to an appliance, site or system as in connection with the step S4 is only read I/O workload, the method and associated model described in the following paragraphs can be utilized to qualitatively determine which of the two appliances, systems or sites A1 or A2 is better equipped or able to service the additional read IOPS of the stretched volume, such as the stretched volume A in this example.

It should be noted that the method and model described in the following paragraphs performed in the step S4 to select a single one of A1 or A2 to service the read IOPS of the one or more stretched volumes, such as stretched volume A, provides an estimation and a relative comparison between the A1 and A2 to determine which one of A1 or A2 has more free or available resources than the other to support servicing the additional read IOPS of the stretched volume A.

In at least one embodiment, I/O resource availability of the two appliances, sites or systems A1 and A2 with different hardware and different I/O workloads can be compared by performing the following substeps in the step S4:

S4*a*) Calculate a first quantity Q1 denoting the current normalized total IOPS of a given workload for A1.

S4*b*) Calculate a second quantity Q2 which is an estimate of the maximum normalized total IOPS of a given workload that A1 is capable of supporting.

S4*c*) Determine a difference between Q2 and Q1, where the difference denotes the additional normalized total IOPS that A1 can support.

S4*d*) Repeat the substeps S4*a-c* for the second appliance, system or site A2. Thus after completing S4*d*, there is a first difference D1 as determined by step S4*c* for site A1, and a second difference D2 as determined by step S4*c* for site A2.

S4*e*) Compare D1 associated with A1 with D2 associated with A2, where if D1>D2, then A1 has a greater additional normalized total IOPS than A2 and thus A1 has more free resources than A2 available to service the read IOPS of the stretched volume(s), such as stretched volume A. Otherwise, if D2>D1, then A2 has a greater additional normalized total IOPS than A1 and thus A2 has more free resources than A1 available to service the read IOPS of the stretched volume(s), such as stretched volume A.

S4f) Select A1 or A2 in accordance with the comparison of the substep S4e. Accordingly in at least one embodiment, if D1>D2, then A1 can be selected in the substep S4f, and otherwise A2 can be selected. As a variation in at least one embodiment, if D2>D1, then A2 can be selected in the substep S4f, and otherwise A1 can be selected.

The step S4 and its substeps will now be further illustrated by continuing with the above-noted example and configuration in connection with FIGS. 7B and 8.

Processing of the substeps S4a, S4b, and S4c can be performed in the step S4 with respect to the appliance, system or site A1 460 to determine in the substep S4c the additional normalized total IOPS that A1 can support. In at least one embodiment, the quantities Q1 and Q2 computed for a site such as A1 in accordance with the respective substeps S4a and S4b are for modeling purposes in accordance with the techniques herein. When such quantities Q1 and Q2 are subtracted as in the substep S4c discussed below to determine a difference, error which may be introduced in each individual value of Q1 and Q2 may be canceled out due to the further calculation of the difference therebetween in the substep S4c.

To perform the foregoing for the appliance, system or site A1, or more generally any appliance, system or site, the following information can be input or provided to the step S4 processing:

Input 1. A type, platform or model identifier (ID) denoting the particular hardware configuration, platform and/or type of the appliance, system or site under consideration. The type, platform or model can identify a particular hardware configuration and amount of various hardware resources (e.g., number of processors or CPUs, number of processor cores, an amount of cache, amount of memory, and the like) configured in a particular type of appliance, system or site. For example, the type or model can be one of multiple predefined types or models each associated with a different corresponding hardware configuration of a particular appliance or system provided by a particular vendor or manufacturer.

Input 2. The current appliance, system or site I/O workload specified using current read IOPS and current write IOPS along with respective I/O sizes of read and write I/Os.

Input 3. IOPS normalization constants or coefficients for the specified type or model (as identified by the type or model of input 1 above) denoting the hardware configuration and/or type. The IOPS normalization constants can include a first constant or coefficient A used in normalizing read IOPS; and a second constant or coefficient B used in normalizing write IOPS. In at least one embodiment, values for A and B can vary with the particular type, platform or model ID of input 1 denoting the hardware configuration and hardware resources of the system, site or appliance under consideration. To further illustrate, there can be 3 different defined hardware configurations specified as EX1, EX2 and EX3. A first pair of constants or coefficients (A1, B1) can be specified as the IOPS normalization constants for EX1; a second pair of constants or coefficients (A2, B2) can be specified as the IOPS normalization constants for EX2; and a third pair of constants or coefficients (A3, B3) can be specified as the IOPS normalization constants for EX3. A particular one of the foregoing 3 pairs can be selected for use in accordance with the particular type or model under consideration.

In at least one embodiment, the particular pair of IOPS normalization constants, A, B, can be based, at least in part, on the specified type or model of input 1 above denoting the hardware configuration and/or type. Additionally, the particular pair of IOPS normalization constants, A, B, can based, at least in part, on the specified type or model in combination with a particular normalized or standardized I/O size. Thus, for example, considering a scenario with 3 hardware or model types EX1, EX2 and EX3 as noted above. A first set of 3 pairs of constants or coefficients can be specified as noted above for use with the different hardware or model types when standardizing or normalizing to a 4 KB I/O size; and a second set of 3 pairs of constants and coefficients can be specified as noted above for use with the different hardware or model types when standardizing or normalizing to an 8 KB I/O size. More generally, a different set of 3 pairs of constants or coefficients can be specified for a particular standardized or normalized I/O size. In this manner, a pair of constants or coefficients (A, B) can be selected based, at least in part, on the hardware type or model of the system, site or appliance under consideration in combination with the particular standardized or normalized I/O size. In some embodiments, a pair of constants or coefficients (A, B) can be selected based, at least in part, on 1) the hardware type or model of the system, site or appliance under consideration; 2) the particular standardized or normalized I/O size; and also 3) the I/O workload of the system, site or appliance under consideration. In at least one embodiment, the cost incurred for I/Os of the same type but of different sizes may not scale linearly such that, for example, there may be some fixed overhead incurred for any size read I/O. For a larger size read I/Os, the same fixed overhead can be incurred along with a variable cost or amount of resources in accordance with the read I/O size.

In at least one embodiment, values for the coefficients A and B may be established, for example, by running I/O load tests with various I/O sizes and observing when the system reaches its maximum I/O throughput or IOPS rate for each of the various sizes.

Generally, a current IO workload "iops1" with I/Os of size "iosize1" can be further normalized or standardized to IOPS of size "$iosize_{norm}$" on the same system as expressed in EQUATION 13 below (e.g., (e.g., put another way, (iops1, iosize1) may denote a point to be normalized):

$$iops_{norm} = iops1(iosize1/iosize_{norm})^{CONST} \qquad \text{EQUATION 13}$$

where:
$iops_{norm}$ as expressed using EQUATION 13 denotes an equivalent normalized IOPS value for iops1;
iops1 denotes an I/O rate per second of I/Os each of size "iosize1";
$iosize_{norm}$ denotes the base size or standard size used for normalization to scale the point (iops1, iosize1) to a normalized corresponding point ($iops_{norm}$, $iosize_{norm}$), where $iops_{norm}$ may be determined using EQUATION 13; and
CONST denotes the constant or coefficient used an exponent in EQUATION 13, where CONST can be the constant A (described above) if iops1 and iosize1 correspond to read IOPS and read I/O size, and where CONST can be the constant B (described above) if iops and iosize1 correspond to write IOPS and write I/O size.

To further illustrate, assume the iosize$_{norm}$=4K bytes. In this case, EQUATION 13 may be used to normalize any IOPS value, iops1, for I/Os of iosize1 to an equivalent normalized IOPS value, iops$_{norm}$. Using EQUATION 13 with the same base size or standard size, iosize$_{norm}$, for multiple input IOPS values of different I/O sizes provides for scaling or normalizing the input IOPS values using the same base or standard size where such normalized IOPS values can then be used as normalized units for comparison purposes and use with the techniques herein for load balancing.

Based on the above, EQUATION 13 denotes a general IOPS normalization equation that can be further customized in EQUATION 13A below for use with calculating "R4KB" denoting normalized read IOPS of the particular size 4 KB; and can be further customized in EQUATION 13B below for use with calculating "W4KB" denoting in normalized write IOPS of the particular size 4 KB.

$$R4KB = RIOPS * (r\_sz/4)^A \qquad \text{EQUATION 13A}$$

where
RIOPS denotes the original read IOPS value being normalized;
r_sz denotes the read I/O size of each read I/O included in RIOPS;
4 denotes the normalized read I/Os size, in KB; and
A denotes the read constant or coefficient determined in accordance with the particular normalized I/O size of 4 KB, and in accordance with the particular type, platform or configuration related to the hardware (e.g., provided as input 1 above) for the site, system or appliance under consideration.

$$W4KB = WIOPS * (w\_sz/4)^B \qquad \text{EQUATION 13B}$$

where
WIOPS denotes the original write IOPS value being normalized;
w_sz denotes the write I/O size of each write I/O included in WIOPS;
4 denotes the normalized write I/Os size, in KB; and
B denotes the write constant or coefficient determined in accordance with the particular normalized I/O size of 4 KB, and in accordance with the particular type, platform or configuration related to the hardware (e.g., provided as input 1 above) for the site, system or appliance under consideration.

The read and write IOPS are both normalized to the same standard or normal size, such as 4 KB, noted above. More generally, any suitable standard or normalized size can be selected where 4 KB is selected herein for purposes of illustration and should not be construed as a limitation.

Input 4. "RMAX@4 KB" denoting the maximum read IOPS rate or throughput of 4 KB reads supported by, or capable of being processed by, the specified type, platform or configuration related to the hardware (e.g., provided as input 1 above). More generally, input 4 denotes the maximum read IOPS rate or throughput of read I/Os of the normalized or standard size selected for a particular hardware type, platform or configuration. In at least one embodiment, a different RMAX@4 KB value can be specified for each of the possible different types, platforms or configurations related to the hardware. For example, if there are 3 defined hardware types, models, platforms or configuration such as EX1, EX2 and EX3 noted above there can be 3 different RMAX@4 KB values, one for each of the 3 types (EX1, EX2 and EX3). Thus, values for RMAX@4 KB used for A1 and A2 can vary with the particular hardware type or model of each such site, system or appliance. Furthermore, if a different normalized I/O size other than 4 KB is used, the associated RMAX value of input 4 can also vary since the particular RMAX value can depend, at least in part, on the normalized I/O size used and also the particular hardware type or model of the site under consideration.

Input 5. "WMAX@4 KB" denoting the maximum write IOPS rate or throughput of 4 KB writes supported by, or capable of being processed by, the specified type, platform or configuration related to the hardware (e.g., provided as input 1 above). More generally, input 5 denotes the maximum write IOPS rate or throughput of write I/Os of the normalized or standard size selected for a particular hardware type, platform or configuration. In at least one embodiment, a different WMAX@4 KB value can be specified for each of the possible different types, platforms or configurations related to the hardware. For example, if there are 3 defined hardware types, models, platforms or configuration such as EX1, EX2 and EX3 noted above there can be 3 different WMAX@4 KB values, one for each of the 3 types (EX1, EX2 and EX3). Thus, values for WMAX@4 KB used for A1 and A2 can vary with the particular hardware type or model of each such site, system or appliance. Furthermore, if a different normalized I/O size other than 4 KB is used, the associated WMAX value of input 4 can also vary since the particular WMAX value can depend, at least in part, on the normalized I/O size used and also the particular hardware type or model of the site under consideration.

In at least one embodiment, values for RMAX and WMAX used for a selected normal or standard I/O size may be established, for example, by running I/O load tests with various I/O sizes and observing when the system reaches its maximum I/O throughput or IOPS rate for each of the various sizes.

Input 6. A read I/O vs write I/O cost factor. For reads and writes of the selected normalized or standard I/O size such as 4 KB, the cost factor can provide a general relative cost comparison in terms of system resources expended to process a 4 KB read vs. a 4 KB write. The cost factor can vary with one or more other conditions or factors and can vary with embodiment. For example, the cost factor can vary, at least in part, based on any one or more of the following: the selected normalized I/O size (e.g., 4 KB); the particular type, platform or configuration related to the hardware (e.g., provided as input 1 above) for the site, system or appliance under consideration; and possibly one or more other suitable conditions or factors. In at least one embodiment, the read I/O vs write I/O cost factor can be "2" for a 4 KB read and write I/O size, where a 4 KB write I/O can cost about twice or two times as much as a single 4 KB read I/O for the system to process.

In connection with input 2 above, input 2 can include read related inputs used in connection with the above-noted EQUATION 13A for normalizing read IOPS. The read related inputs can include RIOPS and r_sz, where RIOPS denotes the read IOPS for the appliance, system or site under consideration, and where r_sz denotes the size of each read I/O in RIOPS. RIOPS can be the revised read workload or IOPS for the site A1 or A2 under consideration. For A1, RIOPS can be a1_r' as calculated using EQUATION 11. For A2, RIOPS can be a2_r' as calculated using EQUATION 12.

In connection with input 2 above, input 2 can include write related inputs used in connection with the above-noted EQUATION 13B for normalizing write IOPS. The write related inputs can include WIOPS and w_sz, where WIOPS denotes the write IOPS for the appliance, system or site under consideration, and where w_sz denotes the size of each write I/O in WIOPS. WIOPS can be the write workload or IOPS for the site A1 or A2 under consideration. For A1, WIOPS can be a1_w as included in the column 532c of the row 534a of the table 530. For A2, WIOPS can be a2_w as included in the column 532c of the row 534b of the table 530.

It should be noted that various inputs to the step S4 noted above can be determined in any suitable manner. For example, the constants or coefficients of input 3 can vary with the particular types and configurations in an embodiment and can be determined through testing, from a manufacturer or vendor, or other suitable means. The constants or coefficients of input 3 that can be used in at least one embodiment are described in more detail, for example, in U.S. Pat. No. 11,561,700, Issued Jan. 24, 2023, "Techniques for Workload Balancing", Dar, et al., which is incorporated by reference herein. As another example, the maximum values provided as inputs 4 and 5 noted above can be determined, for example through testing, from a manufacturer or vendor, or other suitable means.

Returning now to our example and, for the appliance, system or site A1, the substep S4a can be performed to calculate the first quantity Q1 denoting the current normalized total IOPS of a given workload for A1.

The substep S4a for A1 can utilize EQUATION 13A, which determines R4KB for A1, and EQUATION 13B, which determines W4KB for A1. The EQUATION 13A can be used with the revised appliance, system or site revised read workload, a1_r', which is determined using EQUATION 11. In particular, the revised read workload a1_r' (calculated using EQUATION 11) can be substituted as the particular value of "RIOPS" in EQUATION 13A, and the current read I/O size of read I/Os in the read workload a1_r' can be substituted as the particular value for "r_sz" in EQUATION 13A. As a result of the foregoing, EQUATION 13A can be used to calculate the particular value of R4KB for site A1 in accordance with A1's revised read workload a1_r' (without the read I/O workload of the stretched volume A) and its associated read I/O size (e.g., "r_sz" in EQUATION 13A).

The EQUATION 13B can be used with the A1's appliance, system or site write workload, a1_w, which can be obtained from collected metrics as included in the entry of the table 530 located in row 534a and column 532c. In particular, the write workload a1_w for the site A1 can be substituted as the particular value of "WIOPS" in EQUATION 13B, and the current write I/O size of write I/Os in the write workload a1_w can be substituted as the particular value for "w_sz" in EQUATION 13B. As a result of the foregoing, EQUATION 13B can be used to calculate the particular value of W4KB for site A1 in accordance with A1's current write workload a1_w (as included in the table 530) and its associated write I/O size (e.g., "w_sz" in EQUATION 13B).

The substep S4a for A1 can also calculate the normalized workload read ratio as in EQUATION 14 below:

$$\text{read ratio} = R4KB/(R4KB + W4KB) \quad \text{EQUATION 14}$$

where
R4KB is determined with respect to site A1 using EQUATION 13A as discussed above; and
W4KB is determined with respect to site A1 using EQUATION 13B as discussed above.

The substep S4a can calculate "Q1" denoting the normalized total IOPS for a given workload of A1 using EQUATION 15 below:

$$Q1 = (R4KB * \text{read ratio}) + ((1 - \text{read ratio}) * W4KB) * 2) \quad \text{EQUATION 15}$$

where
R4KB is determined with respect to site A1 using EQUATION 13A as discussed above;
W4KB is determined with respect to site A1 using EQUATION 13B as discussed above;
read ratio is determined with respect to site A1 using EQUATION 14 as discussed above;
"1−read ratio" denotes the write ratio with respect to site A1; and
"2" denotes the write cost factor as described in connection with input 6 to the step S4 processing discussed above, where each write I/O costs twice as much as a single read I/O.

Thus generally in EQUATION 15, the term "(R4KB*read ratio)" denotes the normalized read workload (or read workload cost) of A1 without read workload of the stretched volume A; and the term "((1−read ratio)*W4KB)*2)" denotes the normalized write workload (or wrote workload cost) of A1.

Following the substep S4a for A1, processing of the step S4b for A1 can be performed. The step S4b for A1 can calculate the second quantity Q2 which is an estimate of the maximum normalized total IOPS of a given workload that A1 is capable of supporting.

The substep S4b for A1 can include calculating "S" denoting the average service time per I/O as expressed in EQUATION 16 below:

$$S = (\text{read ratio}/R\text{MAX}@4KB) + [(1 - \text{read ratio})/W\text{MAX}@4KB] \quad \text{EQUATION 16}$$

where
read ratio is determined with respect to A1 using EQUATION 14 discussed above;
RMAX@4 KB as described above in connection with input 4 to the step S4 (e.g., RMAX@4 KB value used here can be determined in accordance with the particular type of hardware, platform, configuration or model of the site A1); and
WMAX@4 KB as described above in connection with input 5 to the step S4 (e.g., WMAX@4 KB value used here can be determined in accordance with the particular type of hardware, platform, configuration or model of the site A1).

The substep S4b for A1 can include calculating "M" denoting the maximum supported IOPS for a given workload as expressed in EQUATION 17 below:

$$M = 1/S \quad \text{EQUATION 17}$$

where
- S is the service time as described above in connection with EQUATION 16. Thus, M is calculated in EQUATION 17 as the multiplicative inverse of the service time, S, of EQUATION 16.

The substep S4*b* for A1 can include calculating the second quantity Q2 which is an estimate of the maximum normalized total IOPS of a given workload that A1 is capable of supporting as expressed in EQUATION 18 below:

$$Q2 = (M * \text{read ratio}) + ((1 - \text{read ratio}) * M * 2) \quad \text{EQUATION 18}$$

where
- M is as calculated using EQUATION 17;
- read ratio is as calculated using EQUATION 14; and
- "2" denotes the write cost factor as described in connection with input 6 to the step S4 processing discussed above, where each write I/O costs twice as much as a single read I/O.

Following the substep S4*b* for A1, the substep S4*c* for A1 can be performed. The substep S4*c* for A1 can include determining a difference D1 between Q2 and Q1 as determined for A1 in the steps S4*a* and S4*b*, where the difference D1 for A1 denotes the additional normalized total IOPS that A1 can support. In particular, the substep S4*c* can determine D1 for A1 as expressed in EQUATION 19 below:

$$D1 = Q2 - Q1 \quad \text{EQUATION 19}$$

where
- Q2 is calculated as in EQUATION 18; and
- Q1 is calculated as in EQUATION 15.

Subsequently, after calculating D1 for A1, the step S4 can include performing the substeps S4*a*, S4*b* and S4*c* for the remaining appliance, system or site A2. The substep S4*a*) can be performed to calculate the first quantity Q1 denoting the current normalized total IOPS of a given workload for A2.

The substep S4*a* for A2 can utilize EQUATION 13A, which determines R4KB for A2, and EQUATION 13B, which determines W4KB for A2. The EQUATION 13A can be used with the revised appliance, system or site revised read workload, a2_r', which is determined using EQUATION 12. In particular, the revised read workload a2_r' (calculated using EQUATION 12) can be substituted as the particular value of "RIOPS" in EQUATION 13A, and the current read I/O size of read I/Os in the read workload a2_r' can be substituted as the particular value for "r_sz" in EQUATION 13A. As a result of the foregoing, EQUATION 13A can be used to calculate the particular value of R4KB for site A2 in accordance with A2's revised read workload a2_r' (without the read I/O workload of the stretched volume A) and its associated read I/O size (e.g., "r_sz" in EQUATION 13A).

The EQUATION 13B can be used with the A2's appliance, system or site write workload, a2_w, which can be obtained from collected metrics as included in the entry of the table 530 located in row 534*b* and column 532*c*. In particular, the write workload a2_w for the site A2 can be substituted as the particular value of "WIOPS" in EQUATION 13B, and the current write I/O size of write I/Os in the write workload a2_w can be substituted as the particular value for "w_sz" in EQUATION 13B. As a result of the foregoing, EQUATION 13B can be used to calculate the particular value of W4KB for site A2 in accordance with A2's current write workload a2_w (as included in the table 530) and its associated write I/O size (e.g., "w_sz" in EQUATION 13B).

The substep S4*a* for A2 can also calculate the normalized workload read ratio for A2 using EQUATION 14 noted above where
- R4KB is determined with respect to site A2 using EQUATION 13A as discussed above; and
- W4KB is determined with respect to site A2 using EQUATION 13B as discussed above.

The substep S4*a* can calculate "Q1" denoting the normalized total IOPS for a given workload of A2 using EQUATION 15 noted above where
- R4KB is determined with respect to site A2 using EQUATION 13A as discussed above;
- W4KB is determined with respect to site A2 using EQUATION 13B as discussed above;
- read ratio is determined with respect to site A2 using EQUATION 14 as discussed above;
- "1−read ratio" denotes the write ratio with respect to site A2; and
- "2" denotes the write cost factor as described in connection with input 6 to the step S4 processing discussed above, where each write I/O costs twice as much as a single read I/O.

Following the substep S4*a* for A2, processing of the substep S4*b* for A12 can be performed. The substep S4*b* for A2 can calculate the second quantity Q2 for A2 which is an estimate of the maximum normalized total IOPS of a given workload that A2 is capable of supporting.

The substep S4*b* for A2 can include calculating "S" denoting the average service time per I/O as expressed in EQUATION 16 noted above where
- read ratio is determined with respect to A2 using EQUATION 14 discussed above;
- RMAX@4 KB as described above in connection with input 4 to the step S4 (e.g., RMAX@4 KB value used here can be determined in accordance with the particular type of hardware, platform, configuration or model of the site A2); and
- WMAX@4 KB as described above in connection with input 5 to the step S4 (e.g., WMAX@4 KB value used here can be determined in accordance with the particular type of hardware, platform, configuration or model of the site A2).

The substep S4*b* for A2 can include calculating "M" denoting the maximum supported IOPS for a given workload as expressed in EQUATION 17 where
- S is the service time as described above in connection with EQUATION 16 and determined for A2.

The substep S4*b* for A2 can include calculating the second quantity Q2 which is an estimate of the maximum normalized total IOPS of a given workload that A2 is capable of supporting as expressed in EQUATION 18 where
- M is as calculated in accordance with A2 using EQUATION 17;
- read ratio is as calculated in accordance with A2 using EQUATION 14; and
- "2" denotes the write cost factor as described in connection with input 6 to the step S4 processing discussed above, where each write I/O costs twice as much as a single read I/O.

Following the substep S4*b* for A2, the substep S4*c* for A2 can be performed. The substep S4*c* for A2 can include determining a difference D2 between Q2 and Q1 as determined for A2 in the steps S4a and S4b, where the difference D2 for A2 denotes the additional normalized total IOPS that A2 can support. In particular, the substep S4c can determine D2 for A2 as expressed in EQUATION 20 below:

$$D2 = Q2 - Q1 \qquad \text{EQUATION 20}$$

where
Q2 is calculated for A2 using EQUATION 18 discussed above; and
Q1 is calculated for A2 using EQUATION 15 discussed above.

As will be apparent to those skilled in the art, EQUATION 20 is similar to EQUATION 19 noted above with the difference that EQUATION 20 calculates a different named variable, D2, rather than D1 as in EQUATION 19 for purposes of discussion to distinguish between the difference D1 computed for A1, and the different D2 computed for D2.

Subsequently, after calculating D2 for A2 (and thus completing the substep S4d), the step S4 can include performing the substeps S4e and S4f.

In the substep S4e, processing can compare D1 (as calculated using EQUATION 19 for A1) with D2 (as calculated using EQUATION 20 for A2), where if D1>D2, then A1 has a greater additional normalized total IOPS than A2 and thus A1 has more free resources than A2 available to service the read IOPS of the stretched volume(s), such as stretched volume A. Otherwise, if D2>D1, then A2 has a greater additional normalized total IOPS than A1 and thus A2 has more free resources than A1 available to service the read IOPS of the stretched volume(s), such as stretched volume A. Following the substep S4e, the substep S4f can be performed.

In the substep S4f, processing can select A1 or A2 in accordance with the comparison of the substep S4e. Accordingly in at least one embodiment, if D1>D2, then A1 can be selected in the substep S4f, and otherwise A2 can be selected. As a variation in at least one embodiment, if D2>D1, then A2 can be selected in the substep S4f, and otherwise A1 can be selected.

Continuing with the example and subsequent processing, assume that the step S4 is completed and that the substep S4f results in selecting the appliance, system or site A1 as the optimal appliance to handle the read I/O workload for the stretched volume A. Following the step S4, a step S5 can be performed.

In the step S5, processing can be performed to determine the total read IOPS for the stretched volumes by adding all read IOPS for all stretched volumes across both A1 and A2. In this example, there is a single stretched volume A configured from V1 455a and V2 455b. The total read IOPS for volume A can be determined by adding the read IOPS for V1 455a on A1 and V2 455b on A2. With reference to FIG. 8, the step S5 can determine the total read IOPS for the stretched volume A by adding v1_r and v2_r from the table 510 (e.g., v1_r is included in the entry located in row 514a, column 512d; and v2_r is included in the entry located in row 514c, column 512d). EQUATION 21 below denotes the calculation performed in the step S5 to determine the total read IOPS for volume A:

$$\text{total read } IOPS \text{ for volume } A = v1\_r \text{ and } v2\_r \qquad \text{EQUATION 21}$$

where
v1_r denotes the read I/O workload of V1 (configured as volume A) on A1; and
v2_r denotes the read I/O workload of V2 (configured as volume A) on A2.

Following the step S5, a step S6 can be performed.

In the step S6, the appliance, site or system level metrics can be updated in accordance with the step S4 resulting in selection of A1 to receive and service all read IOPS of volume A, and generally resulting in selection of A1 to receive all I/Os, including read and writes, directed to volume A. The step S6 can generally include modeling the shifting all read I/O workload of the stretched volume A to the selected site A1 where no read I/O workload of volume A is presumed or modeled in the workload of site A2. In at least one embodiment, the calculation of step S6 can be performed as expressed using EQUATION 22 below:

$$a1\_r\_updated = a1\_r' + \text{total read } IOPS \text{ for volume } A \qquad \text{EQUATION 22}$$

where
a1_r_updated denotes the modeled read I/O workload of A1 assuming the entire read I/O workload of the stretched volume A will be sent to site A1;
a1_r' denotes the read I/O workload of A1 without the read I/O workload of V1, or generally without including any read I/O workload of the stretched volume A (e.g., a1_r' can be as calculated using EQUATION 11 discussed above); and
total read IOPS for volume A can be as calculated using EQUATION 21 discussed above.

Following the step S6, a step S7 can be performed to consistently model the node level and appliance, system or site level metrics. In the step S7, processing can be performed to adjust the node level metrics to model the same assumption as in S6 where the total read I/O workload of the stretched volume A is directed to only A1. The step S7 can accordingly update the affected node level metrics. In this example, the current node affinity for the stretched volume A is determined which includes node N1 of A1 and N3 of A2. To model shifting of the total read I/O workload of volume A to site A1, the step S7 can include adding the total read IOPS for volume A to n1_r' as expressed in EQUATION 23 below:

$$n1\_r\_updated = n1\_r' + \text{total read } IOPS \text{ of volume } A \qquad \text{EQUATION 23}$$

where
n1_r_updated denotes the updated modeled read I/O workload of N1 assuming the total read I/O workload of volume A is sent to N1;
n1_r' denotes N1 read I/O workload without the stretched volume A's read workload (e.g., n1_r' can be calculated as in EQUATION 7 discussed above); and
total read IOPS of volume A denotes the total read I/O workload of stretched volume A as calculated using EQUATION 21.

At this point after completion of the step S7, read I/O workload metrics at the node level and system, site or appliance level have been adjusted to model or account for an ALUA path state change or change in node affinity with respect to the stretched volume A. In particular, the change in node affinity and ALUA path state with respect to the stretched volume A is that volume A is affined to only N1 such that only path 454a is AO with respect to volume A. The path 454c is modeled as transitioning from AO to ANO with respect to volume A. In at least one embodiment, volume A can be exposed over the remaining paths 454b and 454d where such paths remain as ANO with respect to the volume A.

The site, system or appliance level metrics modeling the shift in the total read I/O workload of volume A to only site A1 can be denoted by: a1_r_updated as in EQUATION 22; and a2_r' as in EQUATION 12.

The node level metrics modeling the shift in the total read I/O workload of volume A to only site A1, and thus only node N1 of site A1, can be denoted by: n1_r_updated as in EQUATION 23 (N1 modeled read workload); n2_r' as in EQUATION 8 (N2 modeled read I/O workload); n3_r' as in EQUATION 9 (N3 modeled read I/O workload); and n4_r' as in EQUATION 10 (N4 modeled read I/O workload). It should be noted that in this example, only nodes N1 and N3 have modified or updated modeled read I/O workloads since no read I/O workload of volume A was directed to nodes N2 and N4.

Following the step S7, a step S8 can be performed. The step S8 can include obtaining read and write IOPS or workload information for all non-stretched volumes. Thus, the step S8 can include, for example, obtaining read and write IOPS or workload information for regular non-stretched volumes X, Y and Z as specified, respectively, in lines 514d, 514e and 514b of table 510 of FIG. 8.

Following the step S8, a step S9 can be performed. In at least one embodiment, the step S9 can include performing workload balancing among the nodes of the selected site, system or appliance A1 to which the additional read I/O workload is added by the above-noted modeling in the steps S5, S6 and S7. In at least one embodiment, the step S9 can also include performing workload balancing among the nodes of the remaining site, appliance, or system A2 which is modeled as having no read I/O workload of stretched volumes, such as no read I/O workload of stretched volume A.

In at least one embodiment, workload balancing of A1's workload among the nodes N1 and N2 of A1 can use relevant ones of the above-noted metrics from the steps S6, S7 and/or S8. In at least one embodiment, workload balancing of A2's workload among the nodes N3 and N4 of A2 can use relevant ones of the above-noted metrics from the steps S6, S7 and/or S8. Generally, an embodiment can use any suitable node balancing technique to balance the workload of the site A1 among its nodes N1 and N2; and/or balance the workload of site A2 among its node N3 and N4. In at least one embodiment, the techniques described in U.S. Pat. No. 11,561,700, which is incorporated by reference herein and noted above, can be used to perform node level workload balancing between nodes of a single site, system or appliance, such as for site A1 and also site A2.

Continuing with the above example where A1 is selected to receive and service the total read I/O workload of the stretched volume A, the step S9 can include performing workload balancing among the node N1 and N2. In the modeled total read I/O workload shift of volume A to node N1 in the example configuration of FIG. 7B, the modeled read and write workloads of N1 includes the total read and write I/O workloads of the stretched volume A and regular or non-stretched volume Z. However, the node N2 in this example configuration can be idle and can have no I/O workload (e.g., since no volume, stretched or regular is affined to N2 in this example). Thus, the workload balancing can detect a large difference in relative or respective workloads of N1 and N2 resulting in a workload imbalance between N1 and N2.

In at least one embodiment, the node level read and write I/O workloads for N1 and N2 can be normalized in terms of both size and also associated costs in terms of resource usage. Normalizing read and write workloads in terms of both size and cost allow for combining such normalized units or values determined for both read and write I/O workloads. In at least one embodiment, normalized total IOPS for a given workload, such as for each of the nodes N1 and N2, can be determined as described, for example, in connection with EQUATIONS 13A, 13B, 14 and 15 discussed elsewhere herein. In this manner, a first workload W1 can be determined denoting the normalized total IOPS for N1's workload based on a combination of N1's modeled read and write I/O workloads. A second workload W2 can be determined denoting the normalized total IOPS for N2's workload based on a combination of N2's modeled read and write I/O workloads. In at least one embodiment, workload balancing among the nodes N1 and N2 of A1 can use relevant site, node and volume level the above-noted metrics from the steps S6, S7 and/or S8 to determine the normalized node level workloads W1 of node N1 and W2 of node N2. Workload balancing of the step S9 for A1 can include comparing W1 and W2, or determining a different DIFF1 between W1 and W2, where DIFF1 can denote the absolute value of the difference obtained by subtracting W2 from W1 as expressed in EQUATION 24 below:

$$DIFF1 = |W1 - W2| \qquad \text{EQUATION 24}$$

In at least one embodiment, if DIFF1 exceeds a specified threshold difference, processing can be performed to model shifting workload between N1 and N2 to eliminate or at least alleviate or reduce the workload imbalance between N1 and N2. For example, DIFF1 can exceed a specified threshold difference and processing can be performed to shift the total (read and write) I/O workload of volume Z of site A1 from node N1 to node N2. As a result of the foregoing, none of stretched volume A's workload may be directed to N2 of A1 where N1 can service all read I/Os directed to volume A; and all of volume Z's workload can be directed to N2.

For purposes of illustration, assume that workload balancing detects the above-noted workload imbalance between the nodes N1 and N2 of site A1; performs the foregoing modeling to shift volume Z's workload from the node N1 to the node N2; and determines that the modeling of the foregoing shift in Z's workload to node N2 at least reduces or alleviates the workload imbalance (e.g., reduces DIFF1). In this case, the workload balancing can determine an action to be taken is to implement the shift in volume Z's workload from the node N1 to the node N2. In at least one embodiment with reference to FIG. 7B, the workload balancing action can be implemented by changing the node affinity for volume Z from the node N1 to the node N2, whereby processing can be performed to transition path 454b for volume Z from ANO to AO; and to transition the path 454a for volume Z from AO to ANO. As a result, following the step S9, processing can be performed in the step S10 to implement the node affinity change for the impacted one or more volumes such as volume Z noted above. In at least one embodiment, implementing the node affinity change can be performed automatically by the site, system or appliance A1 and can include notifying the host 452 of the change in path states for path 454a to ANO and path 454b to AO.

As an alternative to the foregoing action that shifts volume Z's workload from N1 to N2, an alternative action that can be taken to alleviate the workload imbalance between nodes N1 and N2 of site A1 can include shifting the total I/O workload of the stretched volume A from the node N1 to N2 such that the stretched volume A would be affined to node N2 rather than node N1. In this alternative scenario, there may be no change in node affinity and path states with respect to the regular or non-stretched volume Z. Rather in this alternative scenario, the action taken with respect to site A1 is to transition the stretched volume A's node affinity from node N1 to node N2, and thus the associated path state changes can transition path 454a from AO to ANO, and transition path 454b from ANO to AO for the stretched volume A. Consistent with other discussion herein, the paths 454c-d of site A2 are ANO with respect to the stretched volume A in both this alternative action scenario and also the foregoing action scenario noted above.

In this example, assume that workload balancing determines that there is no imbalance or difference in workloads of N3 and N4 of A2. More generally, it can be determined, such as by applying EQUATION 24 with respect to N3 and N4 of A2, that the resulting difference in node level workloads (e.g., normalized in terms of size and cost) for site A2 does not exceed an acceptable threshold level of difference. As a result, there may be no change in path states and node affinities for volumes X and Y of A2.

In at least one embodiment, the workload balancing between nodes in the step S9 can include determining not to perform any shifting or movement of workload among the nodes if, for example, A1's total normalized workload across nodes N1 and N2 does not exceed a specified minimum. In at least one embodiment, the workload balancing can utilize criteria including multiple conditions that have to met in order to perform an action to shift workload between nodes of a site, such as to shift workload between N1 and N2 of site A1. For example, in at least one embodiment, the criteria can require that 1) A1's total normalized workload across nodes N1 and N2 exceed a minimum; and that 2) DIFF1 as determined using EQUATION 24 exceeds a threshold level of difference in order to trigger taking any action in connection with shifting workload among the nodes N1 and N2 of A1.

In at least one embodiment after partitioning or assigning workloads of volumes among the nodes of A1 and A2 in accordance with determined node and volume affinements, processing may be performed in an ongoing continuous manner to measure the workload on the nodes of the sites A1 and A2. Consistent with discussion herein, one or more trigger conditions or conditions can evaluate to true to denote an I/O workload imbalance between nodes of the same site and thereby triggering processing to rebalance the workload of the volumes among the nodes of the site. The rebalancing of the workload may include moving or shifting the I/O workload for one or more of the volumes from a first busy node to a second non-busy peer node by modifying the ALUA path states of the one or more volumes. In particular, the processing may modify the preferred path state of the one or more of the volumes from the first busy node to the second non-busy node, where paths to the first busy node for the one or more volumes may be modified from preferred to non-preferred paths, and where paths to the second non-busy node for the one or more volumes may be modified from non-preferred to preferred paths.

Generally, responsive to ALUA path state changes for one or more volumes, the host from which the paths originate may be notified by the site, system or appliance regarding the path state changes. The notification may be characterized in one aspect as a hint regarding the path status changes for the one or more volumes. In at least one embodiment, the host may use preferred paths for a volume rather than non-preferred paths to send I/Os to the volume. In this manner, the I/O workload for one or more volumes may be shifted from a busy node to a non-busy node by modifying the path states for the volumes to the busy node from preferred to non-preferred, and by modifying the path states for the volumes to the non-busy node from non-preferred to preferred. Selecting the particular one or more volumes whose workload is shifted from the busy node to the non-busy node may be performed using any suitable technique.

In at least one embodiment, the host may use the current states of paths for a particular volume to select a path over which to send I/Os directed to the particular volume. In at least one embodiment, the host may select a path for a volume designated as preferred over another path designated as non-preferred. If there are multiple preferred paths, the host may use any suitable technique to select one of the available multiple preferred paths for sending an I/O to the particular volume. If no preferred paths are active or available or use, the host may select a non-preferred path for sending the I/O to the particular volume. Thus, the site, system or appliance can perform ALUA path state changes for one or more volumes, and then provide notification regarding the path state changes for the volumes to an impacted host.

In at least one embodiment, the foregoing processing steps S1 through S10 can be periodically repeated, for example, such as at defined fixed intervals. Generally, the first or initial time a stretched volume is processed using the techniques of the present disclosure as in the initial configuration described in FIG. 7B, the stretched volume such as volume A can have AO paths to both sites A1 and A2. Subsequently, after performing the techniques of the present disclosure a first time, a single one of the sites A1 or A2 is selected to receive all I/Os directed to stretched volume A, and processing can select at least one node of the selected site as affined to volume A. The techniques of the present disclosure can be performed a second time in a second iteration. In this second iteration, processing can select either site A1 or A2 to receive all I/Os directed to volume A, and processing can select at least one node of the selected site as affined to volume A. In at least one embodiment in this second iteration, selecting one of the sites A1 or A2 for volume A can use current site level and node level workload metrics which do not include read I/O workload directed to the stretched volume A. Additionally, as a result of any workload balancing among nodes of each single site, node affinities can change for corresponding volumes (both regular and stretched). Such workload balancing among nodes of each single site can used revised workload metrics which model shifting of volume A's read I/O workload to the single selected site A1 or A2.

What will now be described are flowcharts of processing steps that can be performed in at least one embodiment in accordance with the techniques of the present disclosure. The steps of the flowcharts of FIGS. 9, 10A, 10B, 11A and 11B summarize processing discussed above.

Figure 9:
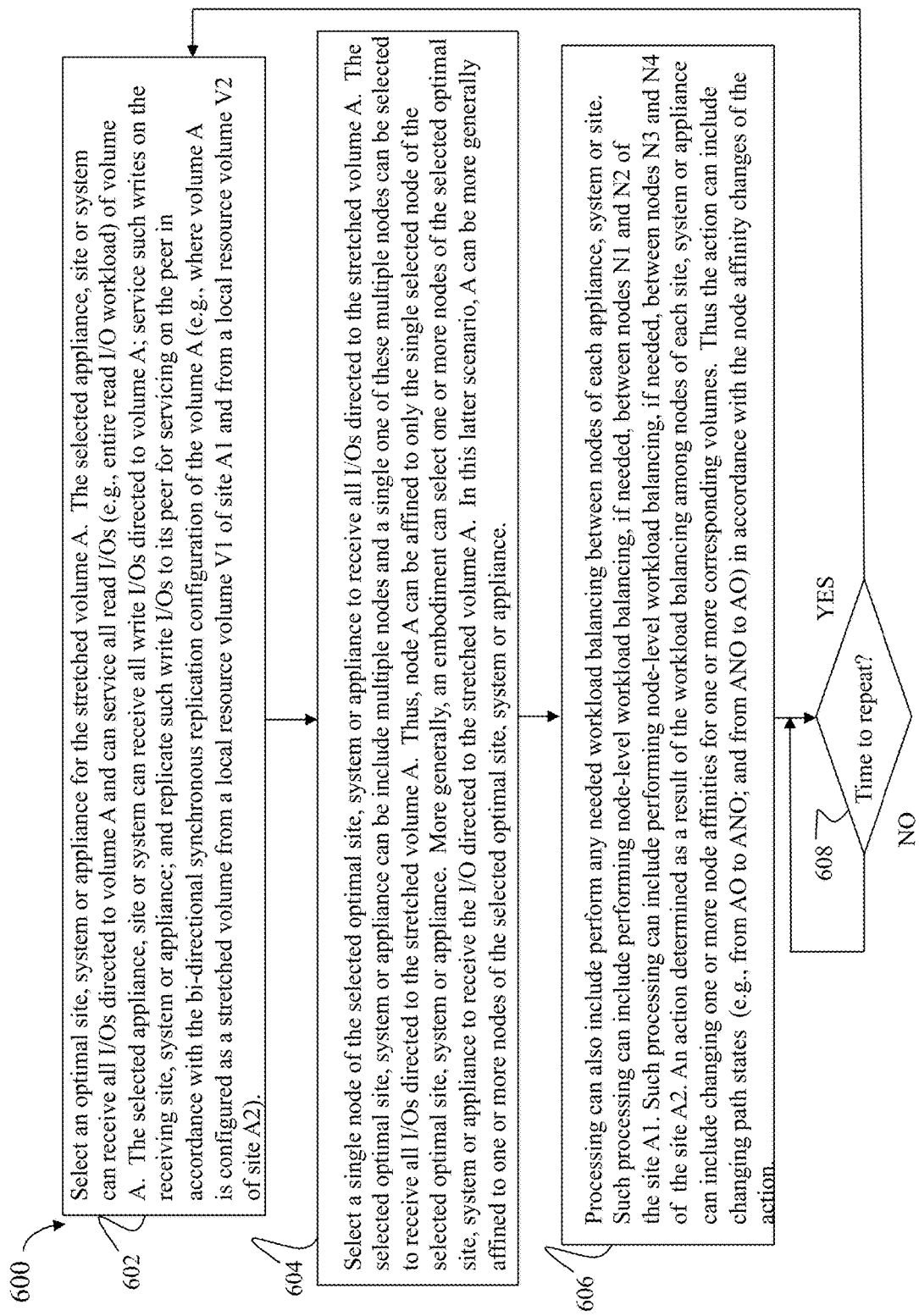
FIGS. 9, 10A, 10B, 11A and 11B are flowcharts of processing steps that can be performed in at least one embodiment in accordance with the techniques of the present disclosure.

Referring to FIG. 9, shown is a first flowchart 600 of processing steps that can be performed in at least one embodiment in accordance with the techniques of the present disclosure.

At the step 602, processing can be performed to select an optimal site, system or appliance for the stretched volume A. The selected appliance, site or system can receive all I/Os directed to volume A and can service all read I/Os (e.g., entire read I/O workload) of volume A. The selected appliance, site or system can receive all write I/Os directed to volume A; service such writes on the receiving site, system or appliance; and replicate such write I/Os to its peer for servicing on the peer in accordance with the bi-directional synchronous replication configuration of the volume A (e.g., where volume A is configured as a stretched volume from a local resource volume V1 of site A1 and from a local resource volume V2 of site A2). From the step 602, control proceeds to the step 604.

At the step 604, processing can be performed to select a single node of the selected optimal site, system or appliance to receive all I/Os directed to the stretched volume A. The selected optimal site, system or appliance can be include multiple nodes and a single one of these multiple nodes can be selected to receive all I/Os directed to the stretched volume A. Thus, node A can be affined to only the single selected node of the selected optimal site, system or appliance. More generally, an embodiment can select one or more nodes of the selected optimal site, system or appliance to receive the I/O directed to the stretched volume A. In this latter scenario, A can be more generally affined to one or more nodes of the selected optimal site, system or appliance. From the step 604, control proceeds to the step 606. In at least one embodiment, it should be noted that the step 606 can be optionally performed and if performed, can utilize any suitable technique.

The step 606 can include performing any needed workload balancing between nodes of each appliance, system or site. Such processing can include performing node-level workload balancing, if needed, between nodes N1 and N2 of the site A1. Such processing can include performing node-level workload balancing, if needed, between nodes N3 and N4 of the site A2. An action determined as a result of the workload balancing among nodes of each site, system or appliance can include changing one or more node affinities for one or more corresponding volumes. Thus the action can include changing path states (e.g., from AO to ANO; and from ANO to AO) in accordance with the node affinity changes of the action. From the step 606, control proceeds to the step 608.

At the step 608, processing can determine whether it is time to repeat the processing of FIG. 9. If the step 608 evaluates no, control remains at step 608. If the step 608 evaluates to yes, control proceeds to the step 602.

In at least one embodiment, the processing of the techniques of the present disclosure can be performed periodically. In this case, the step 608 can evaluate to yes periodically such as at each occurrence of a defined periodical interval. In at least one embodiment, one or more additional conditions can be specified which can also result in repeating the processing of the steps of the present disclosure. For example, the one or more additional conditions can indicate to repeat the processing (and thus result in step 608 evaluating to yes) in response to a specified configuration change in the system hardware which could impact I/O workload. The one or more additional conditions can indicate to repeat the processing on demand such as in response to a request from a user. An embodiment can generally defined any one or more suitable additional conditions which, if true, cause step 608 to evaluate to yes.

In at least one embodiment, the processing of the techniques of the present disclosure can be performed periodically. In this case, the processing as described herein such as summarized in FIG. 9 can be perform periodically such as at each occurrence of a defined periodical interval. In at least one embodiment, one or more additional conditions can be specified which can also result in repeating the processing of the steps of the present disclosure such as outlined in FIG. 9. For example, the one or more additional conditions can indicate to repeat the processing in response to a specified configuration change in the system hardware which could impact I/O workload of site A1 and/or site A2. The one or more additional conditions can indicate to repeat the processing on demand such as in response to a request from a user. An embodiment can generally defined any one or more suitable additional conditions which, if true, cause repeated processing of the techniques of the present disclosure as in FIG. 9.

Figure 10A:
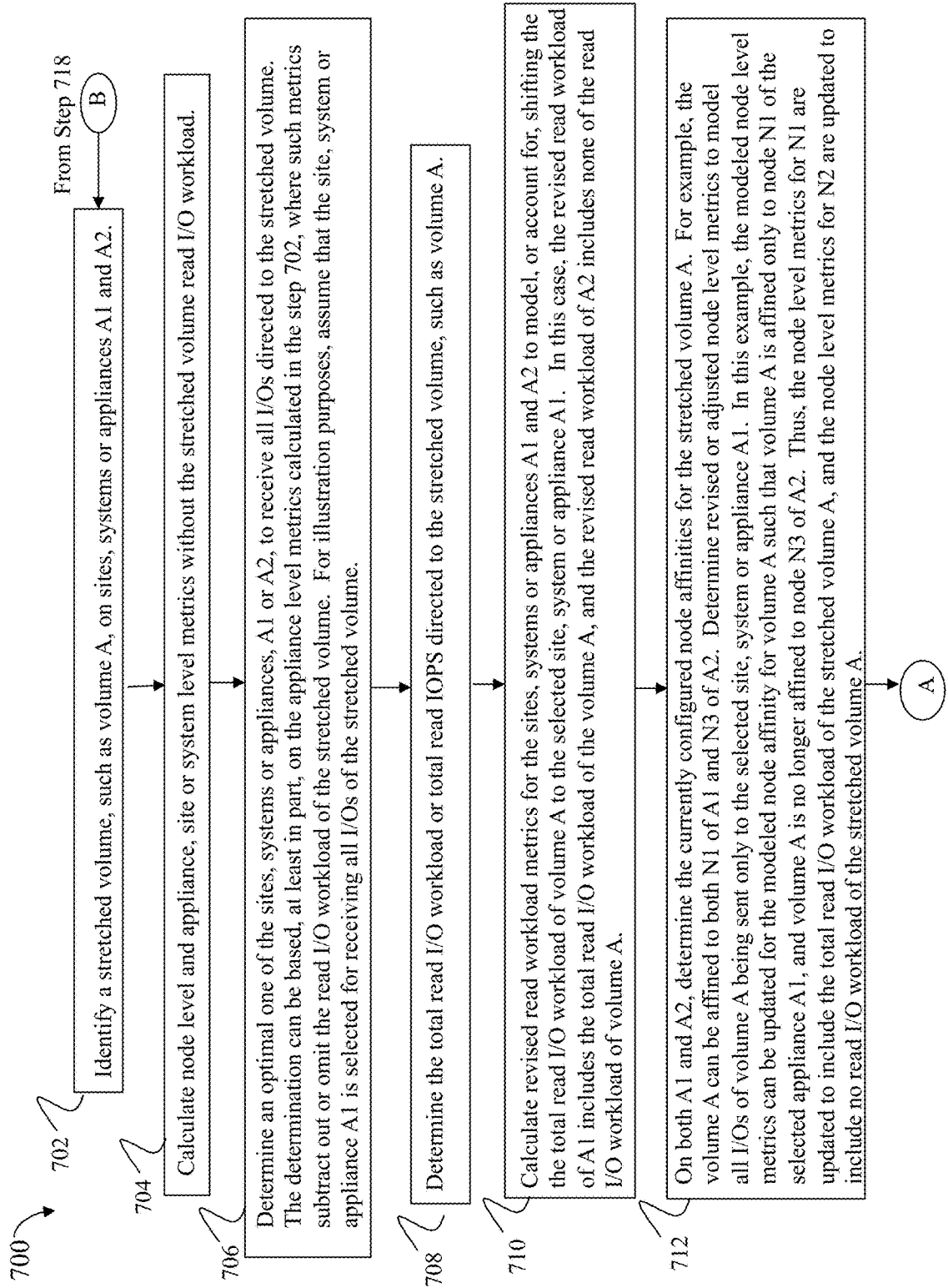
Figure 10B:
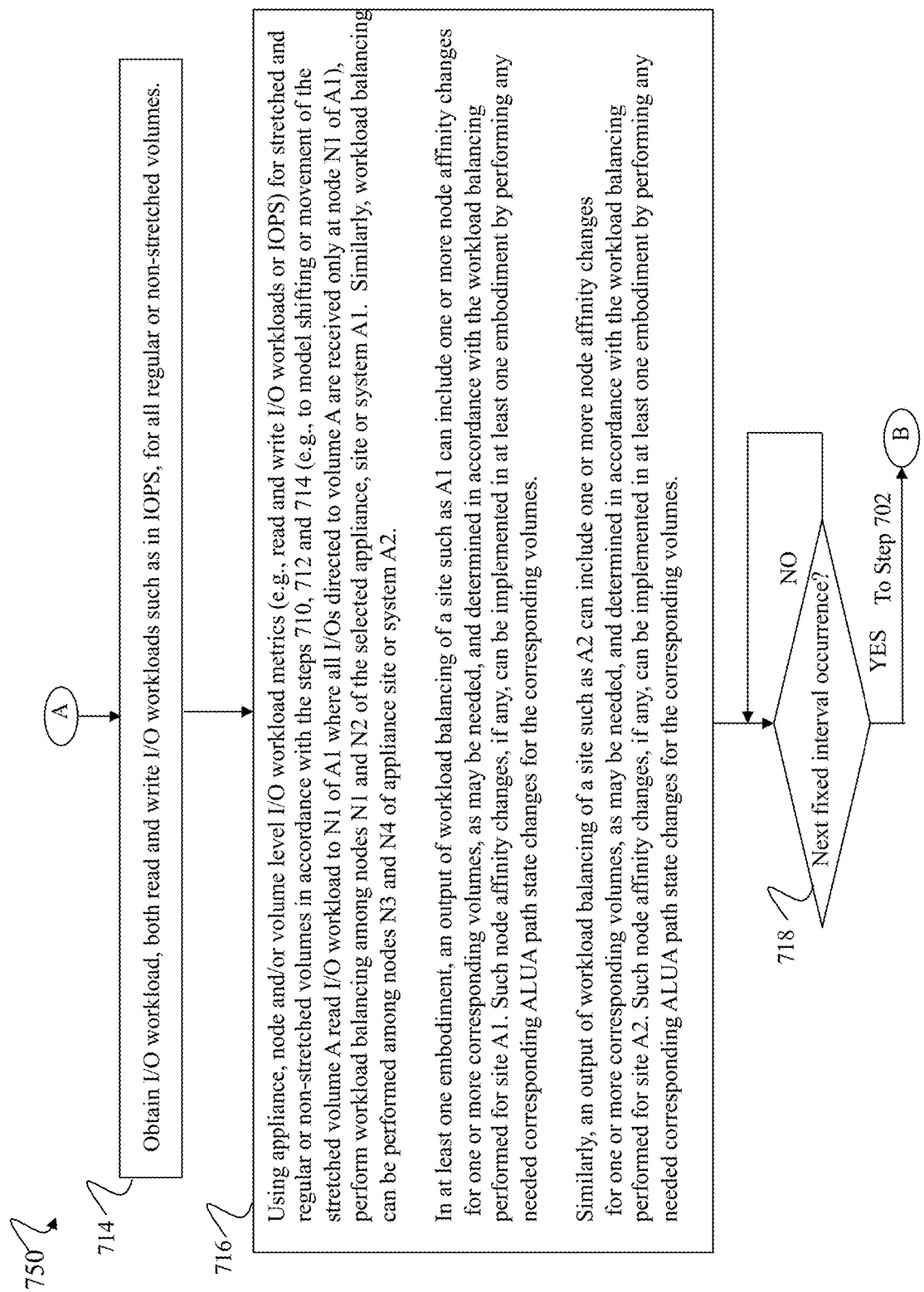

Referring to FIGS. 10A and 10B, shown is a second flowchart 700, 750 of processing steps that can be performed in at least one embodiment in accordance with the techniques of the present disclosure. The FIGS. 10A and 10B provide further detail of processing described in connection with FIG. 9.

At the step 702, processing can identify a stretched volume, such as volume A, on sites, systems or appliances A1 and A2. From the step 702, control proceeds to the step 704.

At the step 704, processing can calculate node level and appliance, site or system level metrics without the stretched volume read I/O workload. From the step 704, control proceeds to the step 706.

At the step 706, processing can determine an optimal one of the sites, systems or appliances, A1 or A2, to receive all I/Os directed to the stretched volume A. The determination can be based, at least in part, on the appliance level metrics calculated in the step 702, where such metrics subtract out or omit the read I/O workload of the stretched volume A. For illustration purposes, assume that the site, system or appliance A1 is selected for receiving all I/Os of the stretched volume A. From the step 706, control proceeds to the step 708.

At the step 708, processing can determine the total read I/O workload or total read IOPS directed to the stretched volume A. From the step 708, control proceeds to the step 710.

At the step 710, processing can calculate revised read workload metrics for the sites, systems or appliances A1 and A2 to model, or account for, shifting the the total read I/O workload of volume A to the selected site, system or appliance A1. In this case, the revised read workload of A1 includes the total read I/O workload of the volume A, and the revised read workload of A2 includes none of the read I/O workload of volume A. From the step 710, control proceeds to the step 712.

At the step 712, processing can determine the currently configured node affinities for the stretched volume A. For example, the volume A can be affined to both N1 of A1 and N3 of A2. The step 712 can include determining revised or adjusted node level metrics to model all I/Os of volume A being sent only to the selected site, system or appliance A1 (as selected in the step 706). In connection with the step 712 and the particular example described above, the modeled node level metrics can be updated to model the revised node affinity for volume A such that volume A is affined only to node N1 of the selected appliance A1, and volume A is no longer affined to node N3 of A2. Thus, the node level metrics for N1 are updated to include the total read I/O workload of the stretched volume A, and the node level metrics for N2 are updated to include no read I/O workload of the stretched volume A.

At this point after completing the step 712, the revised or updated metrics for the nodes and sites, systems or appliances have been adjusted to account for the above-noted modeled node affinity and associated path state changes for the stretched volume A. Consistent with other discussion herein, there is no adjustment to the node and site, system or appliance level metrics to account for any shift or change in write I/O workload associated with the stretched volume A due to the bi-directional synchronous replication configuration of the stretched volume A. In particular, each write I/O received at either of the sites is automatically replicated to the peer site. Therefore each write I/O directed to the stretched volume A, whether the write I/O is received at site A1 or site A2, is added to the write I/O workloads of both site A1 and A2. In this manner, the total write I/O workload of site A1 is equal to the total write I/O workload of site A2, where each of the foregoing is the total IOPS received collectively at both sites A1 and A2. In accordance with the techniques of the present disclosure, all I/Os directed to the stretched volume A are directed to the selected site A1 such that the total read I/O workload of volume A is on A1, no read I/O workload of volume A is on A2 (since no read I/Os of volume A are received and serviced by site A2), and the write I/O workload of volume A on sites A1 is the same as on site A2. The write I/O workload of volume A on site A1 is equal to the total write IOPS received by site A1, where such write I/O workload of volume A is then replicated to site A2. Following the step 712, control proceeds to the step 714.

At the step 714, processing can be performed to obtain I/O workload metrics, such as both read and write I/O workloads in IOPS, for all regular or non-stretched volumes. From the step 714, control proceeds to the step 716.

At the step 716, using appliance, node and/or volume level I/O workload metrics (e.g., read and write I/O workloads or IOPS) for stretched and regular or non-stretched volumes in accordance with the steps 710, 712 and 714 (e.g., to model shifting or movement of the stretched volume A read I/O workload to N1 of A1 where all I/Os directed to volume A are received only at node N1 of A1), processing can be performed for workload balancing among nodes N1 and N2 of appliance, site or system A1. Similarly, workload balancing can be performed among nodes N3 and N4 of appliance site or system A2.

In at least one embodiment, an output of workload balancing of a site such as A1 can include one or more node affinity changes for one or more corresponding volumes, as may be needed, and determined in accordance with the workload balancing performed for site A1. Such node affinity changes, if any, can be implemented in at least one embodiment by performing any needed corresponding ALUA path state changes for the corresponding volumes.

Similarly, an output of workload balancing of a site such as A2 can include one or more node affinity changes for one or more corresponding volumes, as may be needed, and determined in accordance with the workload balancing performed for site A2. Such node affinity changes, if any, can be implemented in at least one embodiment by performing any needed corresponding ALUA path state changes for the corresponding volumes.

In at least one embodiment, it should be noted that processing of the steps 714 and 716 can be optionally performed. In at least one embodiment, processing of step 714 can be omitted and workload balancing among nodes of the sites A1 and A2 can be omitted. In such an embodiment, the node affinity changes and associated path state changes implemented can correspond to those associated with the modelling of the configuration as described at the completion of the step 712. For example, in one such embodiment, only the node affinity for the stretched volume A is modified such that volume A is only affined to N1 and no longer affined to N3 in accordance with the selected single site A1. From the step 716, control proceeds to the step 718.

At the step 718, a determination can be made as to whether the next fixed time interval occurrence has occurred. Consistent with other discussion herein, the processing of FIGS. 10A-10B can be performed periodically such as at each occurrence of a predetermined fixed time interval. If the step 718 evaluates to no, control remains at the step 718. If the step 718 evaluates to yes, control proceeds to the step 702.

Figure 11A:
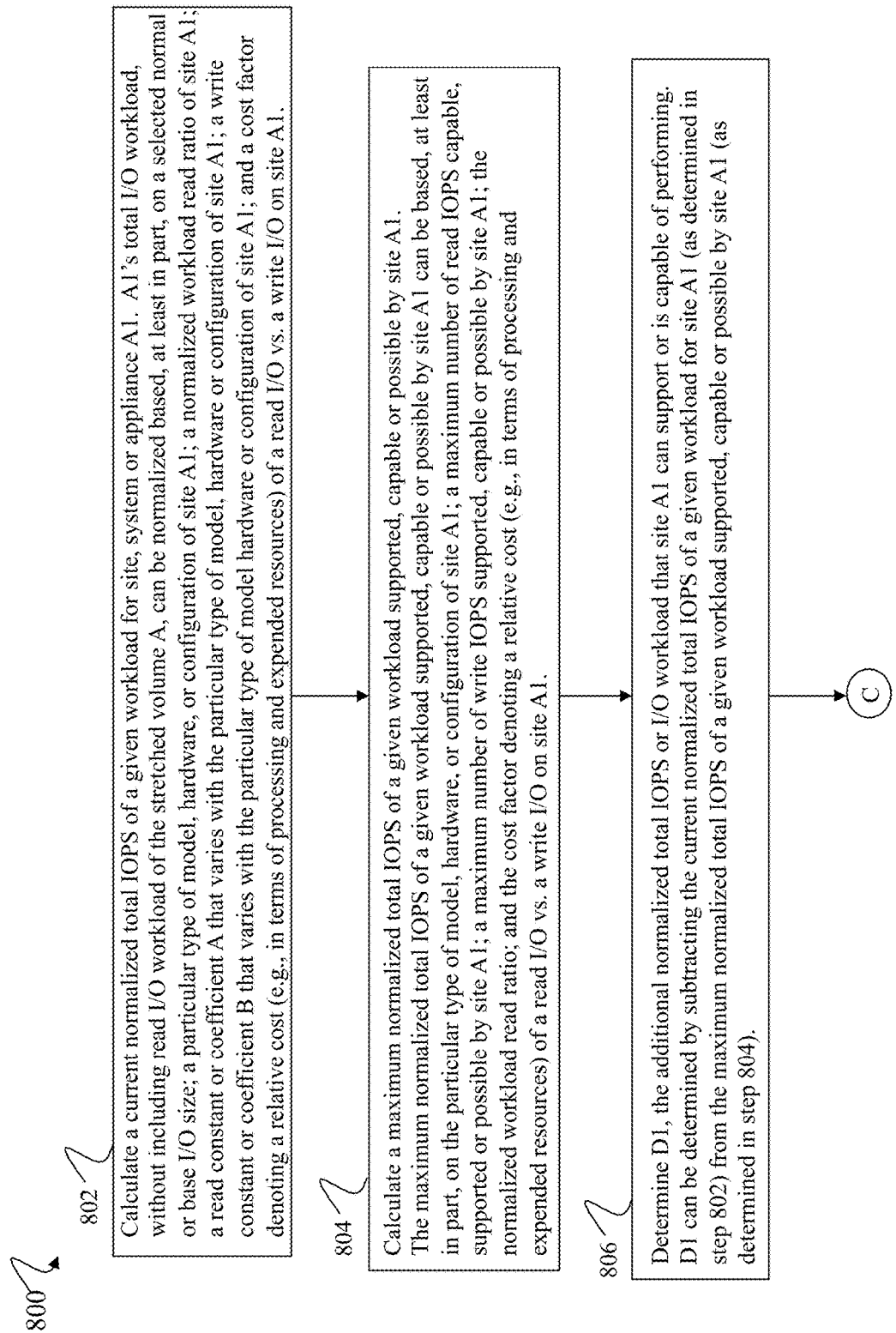
Figure 11B:
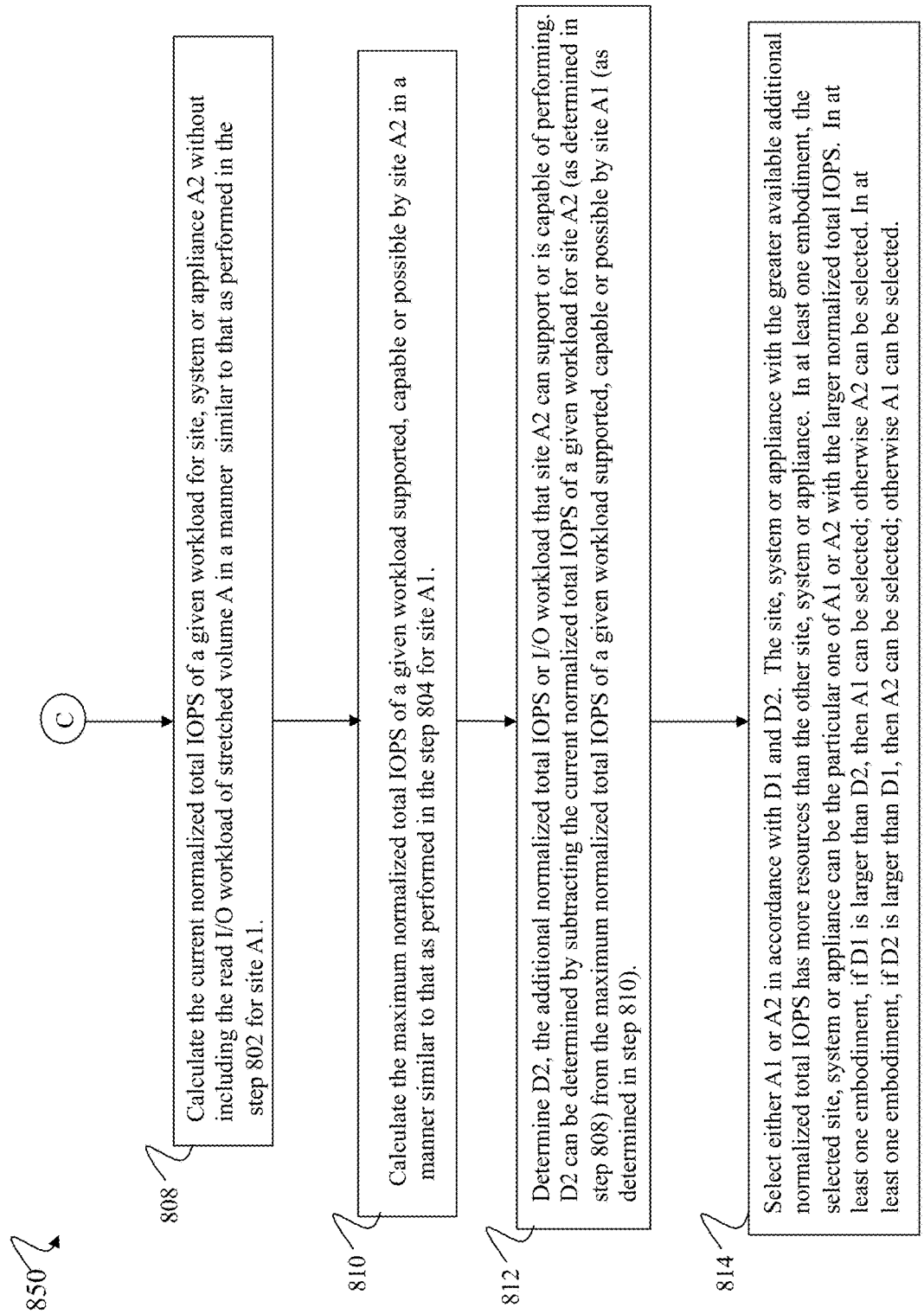

Referring to FIGS. 11A and 11B, shown is a third flowchart 800, 850 of processing steps that can be performed in at least one embodiment in accordance with the techniques of the present disclosure. The steps of FIGS. 11A and 11B provide further detail regarding processing of the step 706 of FIG. 10A and the step S4 described above in at least one embodiment.

At the step 802, processing can be performed to calculate a current normalized total IOPS of a given workload for site, system or appliance A1. A1's total I/O workload, without including read I/O workload of the stretched volume A, can be normalized based, at least in part, on a selected normal or base I/O size; a particular type of model, hardware, or configuration of site A1; a normalized workload read ratio of site A1; a read constant or coefficient A that varies with the particular type of model, hardware or configuration of site A1; a write constant or coefficient B that varies with the particular type of model hardware or configuration of site A1; and a cost factor denoting a relative cost (e.g., in terms of processing and expended resources) of a read I/O vs. a write I/O on site A1. From the step 802, control proceeds to the step 804.

At the step 804, processing can be performed to calculate a maximum normalized total IOPS of a given workload supported, capable or possible by site A1. The maximum normalized total IOPS of a given workload supported, capable or possible by site A1 can be based, at least in part, on the particular type of model, hardware, or configuration of site A1; a maximum number of read IOPS capable, supported or possible by site A1; a maximum number of write IOPS supported, capable or possible by site A1; the normalized workload read ratio; and the cost factor denoting a relative cost (e.g., in terms of processing and expended resources) of a read I/O vs. a write I/O on site A1. From the step 804, control proceeds to the step 806.

At the step 806, processing can be performed to determine D1, the additional normalized total IOPS or I/O workload that site A1 can support or is capable of performing. D1 can be determined by subtracting the current normalized total IOPS of a given workload for site A1 (as determined in step 802) from the maximum normalized total IOPS of a given workload supported, capable or possible by site A1 (as determined in step 804). From the step 806, control proceeds to the step 808.

At the step 808, processing can calculate the current normalized total IOPS of a given workload for site, system or appliance A2, without including the read I/O workload of stretched volume A, in a manner similar to that as performed in the step 802 for site A1. From the step 808, control proceeds to the step 810.

At the step 810, processing can be performed to calculate the maximum normalized total IOPS of a given workload supported, capable or possible by site A2 in a manner similar to that as performed in the step 804 for site A1. From the step 810, control proceeds to the step 812.

At the step 812, processing can determine D2, the additional normalized total IOPS or I/O workload that site A2 can support or is capable of performing. D2 can be determined by subtracting the current normalized total IOPS of a given workload for site A2 (as determined in step 808) from the maximum normalized total IOPS of a given workload supported, capable or possible by site A1 (as determined in step 810). From the step 812, control proceeds to the step 814.

At the step 814, processing can be performed to select either A1 or A2 in accordance with D1 and D2. The site, system or appliance with the greater available additional normalized total IOPS has more resources than the other site, system or appliance. In at least one embodiment, the selected site, system or appliance can be the particular one of A1 or A2 with the larger normalized total IOPS. In at least one embodiment, if D1 is larger than D2, then A1 can be selected; otherwise A2 can be selected. In at least one embodiment, if D2 is larger than D1, then A2 can be selected; otherwise A1 can be selected.

In at least one embodiment, processing for selecting an optimal site, system or appliance selection for a stretched volume can run periodically along with node-level workload balancing within each single site, system or appliance.

In at least one embodiment, upon stretch volume creation, a stretched volume can be configured and initially service I/Os with AO paths to both appliances, sites or systems A1 and A2 in accordance with multiple node affinities for the stretched volume on both A1 and A2. For example, an initial configuration is described and illustrated in FIG. 7B above for the stretched volume A initially configured with affinity to nodes N1 and N3 which can be implemented using ALUA path states as follows for volume A: paths 454a and 454c are AO paths for volume A; and path 454b and 454d are ANO for volume A. Subsequently, processing of the techniques of the present disclosure can be performed as described herein. In particular, after completing processing of the step S4 described above corresponding to the step 706 of FIG. 10A (e.g., where the processing of FIGS. 11A and 11B provide further detail regarding the step S4 and step 706), the site A1 can be selected as the single site for receiving I/Os for volume A.

In at least one embodiment, path changes and node affinity changes can be made in accordance with selecting site A1 as the single site to receive I/Os for volume A where site A1 is the single site service the total read I/O workload or read IOPS for volume A. For example, as described in connection with the example of FIG. 7B, volume A can be affined to both N1 and N3 before the change in affinement and path states in accordance with selection of site A1. After selecting site A1 for receiving all I/Os directed to volume A, volume A can be affined to only node N1 of A1 whereby N3 transitions from affined to unaffined with respect to volume A. In at least one embodiment in accordance with the ALUA path states, path 454c can transition from AO to ANO with respect to volume A and the transition of N3 to being unaffined with respect to volume A. In at least one embodiment, remaining paths 454b and 454d will also be ANO with respect to volume A both before and after selection of A1 for receiving all I/Os directed to volume A.

Subsequent to selecting A1 for the stretched volume A, workload balancing can be performed at the node level in one or more of the sites A1 and A2. Such workload balancing can be performed as may be needed and/or desired. Such workload balancing can further result in implementing one or more actions to further change node affinities and corresponding path states for corresponding volumes to eliminate, or at least reduce or alleviate, a detected node-level workload imbalance with respect to nodes in each site, system or appliance. Thus in at least one embodiment, such workload balancing of nodes in each of the single systems A1 and A2 can be optionally performed. In an embodiment in which there is no further workload balancing performed among nodes of each site, processing can be performed to implement the node affinement and path change noted above where, after selecting site A1 for receiving all I/Os directed to volume A, volume A can be affined to only node N1 of A1, where N3 transitions from affined to unaffined with respect to volume A and where path 454c can transition from AO to ANO with respect to volume A and the transition of N3 to being unaffined with respect to volume A.

Although examples described herein illustrate the techniques of present disclosure with respect to a single stretched volume A, the techniques of the present disclosure can more generally be performed with respect to one or more stretched volumes. In at least one embodiment, the processing can be performed using the techniques of the present disclosure to select one of the sites A1 or A2 for each stretched volume. For example, in at least one embodiment, the techniques of the present disclosure can be performed to make a first selection of one of the sites A1 or A2 to receive all I/Os for a first stretched volume, and select one or more nodes of the selected site which are affined to the first stretched volume and receive the I/Os directed to the first stretched volume. I/O workloads of the sites and nodes thereof can be updated based on the foregoing first selection. Subsequently, the techniques of the present disclosure can be performed to make a second selection of one of the sites A1 or A2 to receive all I/Os for a second stretched volume, and select one or more nodes of the selected site which are affined to the second stretched volume and receive the I/Os directed to the second stretched volume.

Although the techniques of the present disclosure are illustrated with respect to a stretched volume or LUN, the techniques can be used in embodiments more generally with stretched resources of any suitable type. For example, the technique of the present disclosure can be used in connection with one or more stretched resources each of which is one of multiple defined resource types. The defined resource types can include one or more of: a volume, a logical device; a file; a file system; a sub-volume portion; a virtual volume used by a virtual machine; a portion of a virtual volume used by a virtual machine; and a portion of a file system.

What will now be provided is further discussion for completeness regarding selection and determination of the constants, CONST, A and B as used respectively in EQUATIONS 13, 13A and 13B discussed above. Consistent with other discussion herein and as in U.S. Pat. No. 11,561,700, the inverse relationship between the maximum IOPS capable by a particular type of hardware, model or configuration for various I/O sizes of a particular type (read or write), and thus any IOPS values and I/O sizes, may be modeled as expressed in EQUATION A1 below. The foregoing maximum IOPS of a particular I/O type (which can vary with the particular type of hardware, model or configuration and can vary with I/O size) can correspond, for example, to the different values of RMAX and WMAX used in connection with inputs 4 and 5 of the step S4 discussed herein.

$$IOPS = C/(I/O \text{ Size})^D \quad \text{EQUATION A1}$$

where

IOPS denotes the I/O throughput rate in IOPS;

I/O size denotes the size or data payload of the I/O operation; and

C and D are constants or coefficients selected in accordance with the characteristics of the I/Os of the IOPS.

The coefficients C and D may depend on, and vary with, the characteristics including the I/O type and the system configuration. In some embodiments, the coefficients C and D may depend on, and vary with, the characteristics including the I/O type and the system configuration as well as the state of the workload of the system. To further illustrate, consider use of the EQUATION A1 based on IOPS associated with 2 nodes in a single system. In this case, there is only a single configuration for all IOPS. In this example, further assume that there are read and write I/Os of two different sizes, such as 4K bytes and 8K bytes. In this example for a single type of hardware, model or configuration, a first set of values (C1, D1) may be specified respectively as the values for the coefficients C and D for read IOPS of size 4K; a second set of values (C2, D2) may be specified respectively as the values for the coefficients C and D for read IOPS of size 8K; a third set of values (C3, D3) may be specified respectively as the values for the coefficients C and D for write IOPS of size 4K; and a fourth set of values (C4, D4) may be specified respectively as the values for the coefficients C and D for write IOPS of size 8K. In this manner, EQUATION A1 may be used to express the inverse relationship between IOPS and I/O size where the IOPS value includes I/Os of a particular I/O type, a particular size and associated with a particular system configuration in which the I/Os are serviced or processed by selecting particular values for the coefficients C and D based on the particular I/O type, I/O size and system configuration associated with the I/Os comprising the IOPS.

In at least one embodiment, C and D may be regression constants or coefficients. The pairs of values for the coefficients C and D of EQUATION A1 may be established by running I/O load tests with various I/O sizes and observing when the system reaches its maximum I/O throughput or IOPS rate for each of the various sizes.

EQUATION A1 may be used to further normalize IOPS in accordance with any specified base I/O size, denoted as $iosize_{norm}$. For example, assume that iops1 denotes the IOPS rate for a given I/O size, iosize1. Based on EQUATION A1, the following relationship exists between iops1 and iosize1:

$$iops1 = C/(iosize1)^D$$

To normalize iops1 of iosize1 to IOPS of size $iosize_{norm}$ on the same system then the following follows:

$$iops_{norm} = C/iosize_{norm}^D \quad \text{EQUATION A2}$$
$$iops_{norm}/iops1 = (C/iosize_{norm}^D)/(C/iosize1^D)$$
$$iops_{norm} = iops1(iosize1/iosize_{norm})^D$$

Thus, $iops_{norm}$ as expressed using EQUATION A2 denotes an equivalent normalized IOPS value for iops1. Put another way, (iops1, iosize1) may denote a point to be normalized where iops1 denotes an I/O rate per second of I/Os of size iosize1. $Iosize_{norm}$ denotes the base size or standard size used for normalization to scale the point (iops1, iosize1) to a normalized corresponding point ($iops_{norm}$, $iosize_{norm}$), where $iops_{norm}$ may be determined using EQUATION A2. To further illustrate, assume the $iosize_{norm}$=4K bytes. In this case, EQUATION A2 may be used to normalize any IOPS value, iops1, for I/Os of iosize1 to an equivalent normalized IOPS value, $iops_{norm}$. Using EQUATION A2 with the same base size or standard size, $iosize_{norm}$, for multiple input IOPS values of different I/O sizes provides for scaling or normalizing the input IOPS values using the same base or standard size where such normalized IOPS values may then be used as normalized units for comparison purposes and use with the techniques herein for load balancing.

It can thus be noted that when normalizing IOPS on the same system or appliance, the coefficient C has no impact since the configuration is the same. The foregoing as discussed in connection with EQUATIONS A1 and A2 are equally applicable to any configuration, (e.g. EX1-EX5), but with specific values for the coefficients C and D for each configuration. Further, there can be multiple sets of values for coefficients for each single type of hardware configuration or model.

It can be seen that EQUATION A2 noted above is similar to EQUATIONS 13, 13A and 13B discussed elsewhere herein. In at least one embodiment, for read I/O workload or IOPS, the exponent "CONST" of EQUATION 13 and the exponent "A" of EQUATION 13A can both correspond to a particular value for the exponent "D" as used in EQUATIONS A1 and A2 for the normalized read I/O workload of a particular I/O size on a particular type of hardware configuration or model. In at least one embodiment, for write I/O workload or IOPS, the exponent "CONST" of EQUATION 13 and the exponent "B" of EQUATION 13A can both correspond to a particular value for the exponent "D" as used in EQUATIONS A1 and A2 for the normalized write I/O workload of a particular I/O size on a particular type of hardware configuration or model.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A computer-implemented method comprising:
   establishing a synchronous replication configuration for a stretched resource, wherein the first resource is configured from a first local resource of the first site and a second local resource of the second site, wherein the first local resource of the first site and the second local resource of the second site are configured to have a same first resource identity as presented to a host, wherein the stretched resource is exposed to the host over a first path and a second path, wherein the first path is between the host and the first site, and the second path is between the host and the second site, wherein the host issues write I/Os directed to the stretched resource over the first path which are replicated by the first site to the second site in accordance with the synchronous replication configuration, wherein the host issues write I/Os directed to the stretched resource over the second path which are replicated by the second site to the first site in accordance with the synchronous replication configuration, and wherein the host issues read I/Os directed to the stretched resource over both the first path to the first site and the second path;

calculating a first current normalized total I/O workload of the first site without including a first portion of a read I/O workload of the stretched resource received at, and serviced by, the first site;

calculating a first maximum normalized total I/O workload of which the first site is capable of performing;

determining a first difference between the first maximum normalized total I/O workload of the first site and the first current normalized total I/O workload of the first site;

calculating a second current normalized total I/O workload of the second site without including a second portion of the read I/O workload of the stretched resource received at, and service by, the second site;

calculating a second maximum normalized total I/O workload of which the second site is capable of performing;

determining a second difference between the second maximum normalized total I/O workload of the second site and the second current normalized total I/O workload of the second site; and selecting, in accordance with the first difference and the second difference, only one of the first site and the second site to receive and service subsequent read and write I/Os directed to the stretched resource.

2. The computer-implemented method of claim 1, wherein said selecting further includes:

determining whether the first difference is more than the second difference; and responsive to determining the first difference is more than the second difference, selecting the first site but not the second site to receive subsequent read and write I/Os directed to the stretched resource, and otherwise selecting the second site but not the first site to receive subsequent read and write I/Os directed to the stretched resource.

3. The computer-implemented method of claim 2, wherein the first path has a first path state of preferred prior to performing said selecting, and wherein the second path has a second path state of preferred prior to performing said selecting, wherein the host issues I/Os directed to the stretched resource over paths to the first site and the second site having an associated path state of preferred and wherein the host does not issue I/Os to the stretched resource over paths to the first site and the second site having an associated path state of non-preferred unless there is no path with a preferred path state available for sending I/Os to the stretched resource.

4. The computer-implemented method of claim 3, wherein the second site is selected by said selecting, and wherein the method further includes:

responsive to said selecting, changing the first path state of the first path between the host and the first site from preferred to non-preferred.

5. The computer-implemented method of claim 3, wherein the first site is selected by said selecting, and wherein the method further includes:

responsive to said selecting, changing the second path state of the second path between the host and the second site from preferred to non-preferred.

6. The computer-implemented method of claim 1, wherein said calculating the first current normalized total I/O workload of the first site without including the first portion of the read I/O workload further includes:

determining a revised current read I/O workload of the first site by subtracting the first portion of the read I/O workload from a current read I/O workload of the first site; and determining a normalized read I/O workload of the first site for the revised current read I/O workload of the first site based, at least in part, on: a selected normal or standard I/O size; a first hardware type, model, platform or configuration of the first site; and a read coefficient or constant for the first hardware type, model, platform or configuration of the first site.

7. The computer-implemented method of claim 6, wherein a current write I/O workload of the first site includes a first write I/O workload directed to the stretched resource for write I/Os collectively received at the first site and the second site.

8. The computer-implemented method of claim 7, wherein said calculating the first current normalized total I/O workload of the first site without including the first portion of the read I/O workload further includes:

determining a normalized write I/O workload of the first site for the current write I/O workload of the first site based, at least in part, on: the selected normal or standard I/O size; the first hardware type, model, platform or configuration of the first site; and a write coefficient or constant for the first hardware type, model, platform or configuration of the first site.

9. The computer-implemented method of claim 8, wherein said calculating the first current normalized total I/O workload of the first site without including the first portion of the read I/O workload of the stretched resource further includes:

determining a first normalized workload read ratio in accordance with the normalized read I/O workload of the first site and in accordance with the normalized write I/O workload of the first site; and calculating the first current normalized total I/O workload of the first site in accordance with the normalized read I/O workload of the first site, the normalized write I/O workload of the first site, the first normalized workload read ratio, and a cost factor denoting a relative cost of a read I/O relative to a write I/O.

10. The computer-implemented method of claim 9, wherein said calculating the first maximum normalized total I/O workload of which the first site is capable of performing further includes:

receiving a first read maximum RMAX1 denoting a maximum throughput or rate of read I/Os of the selected normal or standard I/O size which the first site is capable of supporting;

receiving a first write maximum WMAX1 denoting a maximum throughput or rate of write I/Os of the selected normal or standard I/O size which the first site is capable of supporting;

calculating S1, the average service time per I/O on the first site, in accordance with the first normalized workload read ratio, RMAX1, and WMAX1;
calculating M1, denoting a maximum supported I/O rate for a given workload, as a multiplicative inverse of S1; and
calculating the first maximum normalized total I/O workload of the first site in accordance with M1, the first normalized workload read ratio, and the cost factor.

11. The computer-implemented method of claim 1, wherein said calculating the second current normalized total I/O workload of the second site without including the second portion of the read I/O workload of the stretched resource further includes:
determining a revised current read I/O workload of the second site by subtracting the second portion of the read I/O workload from a current read I/O workload of the first site; and
determining a normalized read I/O workload of the second site for the revised current read I/O workload of the second site based, at least in part, on: a selected normal or standard I/O size; a second hardware type, model, platform or configuration of the second site; and a read coefficient or constant for the second hardware type, model, platform or configuration of the second site.

12. The computer-implemented method of claim 11, wherein a current write I/O workload of the second site includes a first write I/O workload directed to the stretched resource for write I/Os collectively received at the first site and the second site.

13. The computer-implemented method of claim 12, wherein said calculating the second current normalized total I/O workload of the second site without including the second portion of the read I/O workload of the stretched resource further includes:
determining a normalized write I/O workload of the second site for the current write I/O workload of the second site based, at least in part, on: the selected normal or standard I/O size; the second hardware type, model, platform or configuration of the second site; and a write coefficient or constant for the second hardware type, model, platform or configuration of the second site.

14. The computer-implemented method of claim 13, wherein said calculating the second current normalized total I/O workload of the second site without including the second portion of the read I/O workload of the stretched resource further includes:
determining a first normalized workload read ratio in accordance with the normalized read I/O workload of the second site and in accordance with the normalized write I/O workload of the second site; and
calculating the second current normalized total I/O workload of the second site in accordance with the normalized read I/O workload of the second site, the normalized write I/O workload of the second site, the first normalized workload read ratio, and a cost factor denoting a relative cost of a read I/O relative to a write I/O.

15. The computer-implemented method of claim 14, wherein said calculating the second maximum normalized total I/O workload of which the second site is capable of performing further includes:
receiving a second read maximum RMAX2 denoting a maximum throughput or rate of read I/Os of the selected normal or standard I/O size which the second site is capable of supporting;
receiving a second write maximum WMAX2 denoting a maximum throughput or rate of write I/Os of the selected normal or standard I/O size which the second site is capable of supporting;
calculating S2, the average service time per I/O on the second site, in accordance with the first normalized workload read ratio, RMAX2, and WMAX2;
calculating M2, denoting a maximum supported I/O rate for a given workload, as a multiplicative inverse of S2; and
calculating the second maximum normalized total I/O workload of in accordance with M2, the first normalized workload read ratio, and the cost factor.

16. The computer-implemented method of claim 1, wherein the stretched resource is one of a plurality of defined resource types including one or more of: a volume, a logical device; a file; a file system; a sub-volume portion; a virtual volume used by a virtual machine; a portion of a virtual volume used by a virtual machine; and a portion of a file system.

17. The computer-implemented method of claim 1, wherein the selected one of the first site and the second site selected by said selecting includes a plurality of processing nodes, and wherein the method further includes:
selecting one or more of the plurality of processing nodes to receive and service I/Os directed to the stretched resource in accordance with workload balancing among nodes of the selected one site.

18. The computer-implemented method of claim 1, wherein the synchronous replication configuration for the stretched resource is equidistant with respect to the host where a first I/O response time and a second response time are determined to be within a specified threshold or tolerance of one another, and wherein the first I/O response time denotes an average I/O response time for the stretched resource between the first site and the host, and wherein the second I/O response time denotes an average I/O response time for the stretched resource between the second site and the host.

19. A system comprising:
one or more processors; and
one or more memories comprising code stored thereon that, when executed, perform a method comprising:
establishing a synchronous replication configuration for a stretched resource, wherein the first resource is configured from a first local resource of the first site and a second local resource of the second site, wherein the first local resource of the first site and the second local resource of the second site are configured to have a same first resource identity as presented to a host, wherein the stretched resource is exposed to the host over a first path and a second path, wherein the first path is between the host and the first site, and the second path is between the host and the second site, wherein the host issues write I/Os directed to the stretched resource over the first path which are replicated by the first site to the second site in accordance with the synchronous replication configuration, wherein the host issues write I/Os directed to the stretched resource over the second path which are replicated by the second site to the first site in accordance with the synchronous replication configuration, and wherein the host issues read I/Os directed to the stretched resource over both the first path to the first site and the second path;
calculating a first current normalized total I/O workload of the first site without including a first portion of a read I/O workload of the stretched resource received at, and service by, the first site;

calculating a first maximum normalized total I/O workload of which the first site is capable of performing;

determining a first difference between the first maximum normalized total I/O workload of the first site and the first current normalized total I/O workload of the first site;

calculate a second current normalized total I/O workload of the second site without including a second portion of the read I/O workload of the stretched resource received at, and serviced by, the second site;

calculating a second maximum normalized total I/O workload of which the second site is capable of performing;

determining a second difference between the second maximum normalized total I/O workload of the second site and the second current normalized total I/O workload of the second site; and selecting, in accordance with the first difference and the second difference, only one of the first site and the second site to receive and service subsequent read and write I/Os directed to the stretched resource.

20. A non-transitory computer readable medium comprising code stored thereon that, when executed, performs a method comprising:

establishing a synchronous replication configuration for a stretched resource, wherein the first resource is configured from a first local resource of the first site and a second local resource of the second site, wherein the first local resource of the first site and the second local resource of the second site are configured to have a same first resource identity as presented to a host, wherein the stretched resource is exposed to the host over a first path and a second path, wherein the first path is between the host and the first site, and the second path is between the host and the second site, wherein the host issues write I/Os directed to the stretched resource over the first path which are replicated by the first site to the second site in accordance with the synchronous replication configuration, wherein the host issues write I/Os directed to the stretched resource over the second path which are replicated by the second site to the first site in accordance with the synchronous replication configuration, and wherein the host issues read I/Os directed to the stretched resource over both the first path to the first site and the second path;

calculating a first current normalized total I/O workload of the first site without including a first portion of a read I/O workload of the stretched resource received at, and serviced by, the first site;

calculating a first maximum normalized total I/O workload of which the first site is capable of performing;

determining a first difference between the first maximum normalized total I/O workload of the first site and the first current normalized total I/O workload of the first site;

calculate a second current normalized total I/O workload of the second site without including a second portion of the read I/O workload of the stretched resource received at, and serviced by, the second site;

calculating a second maximum normalized total I/O workload of which the second site is capable of performing;

determining a second difference between the second maximum normalized total I/O workload of the second site and the second current normalized total I/O workload of the second site; and selecting, in accordance with the first difference and the second difference, only one of the first site and the second site to receive and service subsequent read and write I/Os directed to the stretched resource.

\* \* \* \* \*